United States Patent
Fan et al.

(10) Patent No.: US 10,796,178 B2
(45) Date of Patent: Oct. 6, 2020

(54) METHOD AND DEVICE FOR FACE LIVENESS DETECTION

(71) Applicants: BEIJING KUANGSHI TECHNOLOGY CO., LTD., Beijing (CN); MEGVII (BEIJING) TECHNOLOGY CO., LTD., Beijing (CN)

(72) Inventors: Haoqiang Fan, Beijing (CN); Keqing Chen, Beijing (CN)

(73) Assignees: BEIJING KUANGSHI TECHNOLOGY CO., LTD., Beijing (CN); MEGVII (BEIJING) TECHNOLOGY CO., LTD., Beijing (CN)

( * ) Notice: Subject to any disclaimer, the term of this patent is extended or adjusted under 35 U.S.C. 154(b) by 93 days.

(21) Appl. No.: 15/840,863

(22) Filed: Dec. 13, 2017

(65) Prior Publication Data

US 2018/0173980 A1    Jun. 21, 2018

(30) Foreign Application Priority Data

Dec. 15, 2016 (CN) .......................... 2016 1 1162606
Mar. 17, 2017 (CN) .......................... 2017 1 0161685
Jun. 29, 2017 (CN) .......................... 2017 1 0518028

(51) Int. Cl.
*G06K 9/00* (2006.01)
*G06K 9/20* (2006.01)

(52) U.S. Cl.
CPC ..... *G06K 9/00906* (2013.01); *G06K 9/00255* (2013.01); *G06K 9/00912* (2013.01); *G06K 9/2027* (2013.01)

(58) Field of Classification Search
CPC ........... G06K 9/00906; G06K 9/00255; G06K 9/2027; G06K 9/00912
See application file for complete search history.

(56) References Cited

U.S. PATENT DOCUMENTS

2012/0281874 A1* 11/2012 Lure .................. G06K 9/00248
                                                                  382/103
2014/0254891 A1*  9/2014 Lee .................... G06K 9/00255
                                                                  382/118

(Continued)

FOREIGN PATENT DOCUMENTS

CN    103020600    4/2013
CN    105117695    12/2015

(Continued)

OTHER PUBLICATIONS

First Chinese Office Action, issued in the corresponding Chinese patent application No. 201611162606.0, dated Jan. 9, 2019, 36 pages.

(Continued)

*Primary Examiner* — Menatoallah Youssef
(74) *Attorney, Agent, or Firm* — Hamre, Schumann, Mueller & Larson, P.C.

(57) ABSTRACT

A method for face liveness detection and a device for face liveness detection. The method for face liveness detection includes: performing an illumination liveness detection and obtaining an illumination liveness detection result; and determining whether or not a face to be verified passes the face liveness detection at least according to the illumination liveness detection result. Performing of the illumination liveness detection and obtaining of the illumination liveness detection result includes: acquiring a plurality of illumination images of the face to be verified, in which the plurality of illumination images are captured in a process of dynamically changing mode of illumination light irradiated on the face to be verified and are respectively corresponding to various modes of the illumination light; and obtaining the illumination liveness detection result according to a light (Continued)

reflection characteristic of the face to be verified in the plurality of illumination images.

23 Claims, 18 Drawing Sheets

(56) References Cited

U.S. PATENT DOCUMENTS

| | | | | |
|---|---|---|---|---|
| 2015/0310259 A1* | 10/2015 | Lau | ............ | G07C 9/00 |
| | | | | 382/118 |
| 2016/0196475 A1* | 7/2016 | Martin | ............... | G06K 9/00906 |
| | | | | 382/117 |
| 2017/0053174 A1 | 2/2017 | Fan et al. | | |
| 2017/0286788 A1 | 10/2017 | Fan et al. | | |

FOREIGN PATENT DOCUMENTS

| | | |
|---|---|---|
| CN | 105488495 | 4/2016 |
| CN | 105518711 | 4/2016 |
| CN | 105868693 | 8/2016 |
| CN | 105912986 | 8/2016 |
| CN | 105989263 | 10/2016 |
| CN | 106203305 | 12/2016 |
| CN | 106407914 | 2/2017 |

OTHER PUBLICATIONS

First Chinese Office Action, issued in the corresponding Chinese patent application No. 201710218218.8, dated Apr. 29, 2019, 24 pages.

\* cited by examiner

METHOD AND DEVICE FOR FACE LIVENESS DETECTION

CROSS-REFERENCE TO RELATED APPLICATIONS

The application claims priority to the Chinese patent application No. 201611162606.0 filed on Dec. 15, 2016, the Chinese patent application No. 201710161685.1 filed on Mar. 17, 2017, and the Chinese patent application No. 201710518028.8 filed on Jun. 29, 2017, the entire disclosures of the above-mentioned Chinese patent applications are incorporated herein by reference as part of the present application.

TECHNICAL FIELD

Embodiments of the present disclosure relate to face recognition field, in particular relate to a method for face liveness detection and a device for face liveness detection.

BACKGROUND

Face-based authentication systems have been widely applied currently. Along with the popularization of the face-based authentication systems, methods for maliciously attacking the face-based authentication systems are emerged.

For initial versions of face-based authentication system, an authentication result is obtained by comparing a face photo captured during an authentication process and a pre-stored face photo. However, for an authentication system based on face photo comparison, successful authentication can be realized in a case that a photo of a person being counterfeited is placed in front of a camera of the authentication system based on face photo comparison. In other words, malicious users can use the photo of the person being counterfeited for malicious attack (namely photo attack), and the authentication system based on face photo comparison cannot counteract photo attack.

SUMMARY

At least one embodiment of the present disclosure provides a method for face liveness detection, which comprises: performing an illumination liveness detection and obtaining an illumination liveness detection result; and determining whether or not a face to be verified passes the face liveness detection at least according to the illumination liveness detection result. Performing of the illumination liveness detection and obtaining of the illumination liveness detection result comprise: acquiring a plurality of illumination images of the face to be verified, in which the plurality of illumination images are captured in a process of dynamically changing mode of illumination light irradiated on the face to be verified and are respectively corresponding to various modes of the illumination light; and obtaining the illumination liveness detection result according to a light reflection characteristic of the face to be verified in the plurality of illumination images.

For example, for the method for face liveness detection provided by at least one embodiment of the present disclosure, acquiring of the plurality of illumination images of the face to be verified comprises: dynamically changing the mode of the illumination light irradiated on the face to be verified, and capturing the plurality of illumination images, which are respectively corresponding to the various modes of the illumination light, of the face to be verified; obtaining of the illumination liveness detection result according to the light reflection characteristic of the face to be verified in the plurality of illumination images comprises: analyzing the plurality of illumination images, acquiring the light reflection characteristic of the face to be verified in the plurality of illumination images, and obtaining the illumination liveness detection result according to the light reflection characteristic; and dynamically changing the mode of the illumination light irradiated on the face to be verified comprises: dynamically changing color and/or position of the illumination light.

For example, for the method for face liveness detection provided by at least one embodiment of the present disclosure, light emitted from a display screen is used as the illumination light irradiated on the face to be verified; and a mode of the light emitted from the display screen is dynamically changed by changing contents displayed on the display screen, so that the mode of the illumination light irradiated on the face to be verified is dynamically changed.

For example, for the method for face liveness detection provided by at least one embodiment of the present disclosure, the method for face liveness detection further comprises: performing an action liveness detection before determining whether or not the face to be verified passes the face liveness detection. Performing of the action liveness detection comprises: outputting an action instruction used for notifying the face to be verified to execute an action corresponding to the action instruction; acquiring an action image of the face to be verified; detecting the action executed by the face to be verified on the basis of the action image, so as to obtain an action detection result; and obtaining an action liveness detection result according to the action detection result and the action instruction. Determining of whether or not the face to be verified passes the face liveness detection at least according to the illumination liveness detection result comprises: determining whether or not the face to be verified passes the face liveness detection according to both of the illumination liveness detection result and the action liveness detection result.

For example, for the method for face liveness detection provided by at least one embodiment of the present disclosure, number of times for performing the action liveness detection is increased by one for each performance of the action liveness detection, so as to obtain the number of times for performing the action liveness detection; and after the action liveness detection result is obtained and in a case that the action liveness detection result indicates that the face to be verified fails to pass the action liveness detection, the method further comprises: outputting first error information used for notifying a failure of the action liveness detection; determining whether or not the number of times for performing the action liveness detection is greater than a first counting threshold; and determining whether or not the face to be verified passes the face liveness detection at least according to the illumination liveness detection result in a case that the number of times for performing the action liveness detection is greater than the first counting threshold, and performing the action liveness detection again in a case that the number of times for performing the action liveness detection is not greater than the first counting threshold, or performing the illumination liveness detection again in a case that the illumination liveness detection is performed before the action liveness detection and the number of times for performing the action liveness detection is not greater than the first counting threshold.

For example, for the method for face liveness detection provided by at least one embodiment of the present disclosure, the method for face liveness detection further comprises: determining whether or not a preset requirement of an image acquisition condition of the face to be verified is satisfied before performing the illumination liveness detection, so as to perform the illumination liveness detection in a case that the preset requirement of the image acquisition condition is satisfied, in which the image acquisition condition at least comprises one or more selected from a position of the face to be verified, a pose of the face to be verified and a size of the face to be verified in a real-time image acquired by an image acquisition device.

For example, for the method for face liveness detection provided by at least one embodiment of the present disclosure, the image acquisition condition further comprises a blurriness of the real-time image and a shielding state of the face to be verified in the real-time image.

For example, for the method for face liveness detection provided by at least one embodiment of the present disclosure, determining of whether or not the preset requirement of the image acquisition condition of the face to be verified is satisfied comprises: adopting the image acquisition device to acquire the real-time image of the face to be verified; displaying a reference part of the face to be verified in the real-time image and a reference region in real time; and determining whether or not the preset requirement of the image acquisition condition is satisfied at least according to whether or not the reference part of the face to be verified in the real-time image falls within the reference region.

For example, for the method for face liveness detection provided by at least one embodiment of the present disclosure, the reference part of the face to be verified in the real-time image and the reference region are respectively the face to be verified in the real-time image and the face preview region; or the reference part of the face to be verified in the real-time image and the reference region are respectively a specific facial part of the face to be verified in the real-time image and a targeted part region.

For example, for the method for face liveness detection provided by at least one embodiment of the present disclosure, determining of whether or not the preset requirement of the image acquisition condition is satisfied at least according to whether or not the reference part of the face to be verified in the real-time image falls within the reference region comprises: determining that the preset requirement of the image acquisition condition is satisfied in a case that the reference part of the face to be verified in the real-time image falls within the reference region; and determining that the preset requirement of the image acquisition condition is not satisfied in a case that the reference part of the face to be verified in the real-time image fails to fall within the reference region.

For example, for the method for face liveness detection provided by at least one embodiment of the present disclosure, determining of whether or not the preset requirement of the image acquisition condition is satisfied at least according to whether or not the reference part of the face to be verified in the real-time image falls within the reference region comprises: determining that the preset requirement of the image acquisition condition is satisfied in a case that the reference part of the face to be verified in the real-time image falls within the reference region and a ratio of a size of the reference part of the face to be verified to a size of the real-time image is greater than a ratio threshold; and determining that the preset requirement of the image acquisition condition is not satisfied in a case that the reference part of the face to be verified in the real-time image fails to fall within the reference region or the ratio of the size of the reference part of the face to be verified to the size of the real-time image is less than or equal to the ratio threshold.

For example, for the method for face liveness detection provided by at least one embodiment of the present disclosure, determining of whether or not the preset requirement of the image acquisition condition of the face to be verified is satisfied further comprises: acquiring posture information of the image acquisition device; determining whether or not the image acquisition device is vertically placed according to the posture information; and determining that the preset requirement of the image acquisition condition is not satisfied in a case that the image acquisition device is not vertically placed.

For example, for the method for face liveness detection provided by at least one embodiment of the present disclosure, the method for face liveness detection further comprises: outputting adjustment prompt information in a case that the preset requirement of the image acquisition condition is not satisfied, in which the adjustment prompt information is used for notifying the face to be verified to make adjustment allowing the preset requirement of the image acquisition condition to be satisfied.

For example, for the method for face liveness detection provided by at least one embodiment of the present disclosure, outputting of the adjustment prompt information in the case that the preset requirement of the image acquisition condition is not satisfied comprises: outputting the adjustment prompt information in a case that there is no face to be verified in the real-time image, so as to notify a person having the face to be verified to move toward a direction allowing the face to be verified to be in the real-time image; outputting the adjustment prompt information in a case that the position of the face to be verified in the real-time image is deviated from a face preview region, so as to notify the person having the face to be verified to move towards a direction opposite to a deviation direction; outputting the adjustment prompt information in a case that a blurriness of the real-time image exceeds a preset blurriness threshold, so as to notify user to clean the image acquisition device; outputting the adjustment prompt information in a case that the pose of the face to be verified in the real-time image is in a face upward state, so as to notify the person having the face to be verified to lower his/her head; outputting the adjustment prompt information in a case that the pose of the face to be verified in the real-time image is in a face downward state, so as to notify the person having the face to be verified to raise his/her head; outputting the adjustment prompt information in a case that the pose of the face to be verified in the real-time image is tilting to the left or the right, so as to notify the person having the face to be verified to look straight ahead; outputting the adjustment prompt information in a case that the size of the face to be verified in the real-time image is less than a first threshold, so as to notify the person having the face to be verified to be closer to the image acquisition device; outputting the adjustment prompt information in a case that the size of the face to be verified in the real-time image is greater than a second threshold, so as to notify the person having the face to be verified to be away from the image acquisition device; and outputting the adjustment prompt information in a case that a specific facial part of the face to be verified in the real-time image is shielded by an occlusion, so as to notify the person having the face to be verified to remove the occlusion and to expose the specific facial part.

For example, for the method for face liveness detection provided by at least one embodiment of the present disclosure, determining of whether or not the preset requirement of the image acquisition condition of the face to be verified is satisfied comprises: adopting the image acquisition device to acquire the real-time image of the face to be verified; displaying a simulated face region changing along with the face to be verified in real time according to the image acquisition condition, in which the face to be verified is displayed in the simulated face region; displaying in real time a targeted face region, which is used for indicating an alignment of the face to be verified; and determining whether or not the simulated face region is aligned with the targeted face region, in which it is determined that the preset requirement of the image acquisition condition of the face to be verified is satisfied in a case that the simulated face region is aligned with the targeted face region, and it is determined that the preset requirement of the image acquisition condition of the face to be verified is not satisfied in a case that the simulated face region is not aligned with the targeted face region.

For example, for the method for face liveness detection provided by at least one embodiment of the present disclosure, determining of whether or not the simulated face region is aligned with the targeted face region comprises: determining that the simulated face region is aligned with the targeted face region in a case that the simulated face region is within the targeted face region and a ratio of a size of the simulated face region to a size of the real-time image is greater than a first preset ratio; and determining that the simulated face region is not aligned with the targeted face region in a case that the simulated face region is not within the targeted face region or the ratio of the size of the simulated face region to the size of the real-time image is less than or equal to the first preset ratio.

For example, for the method for face liveness detection provided by at least one embodiment of the present disclosure, determining of whether or not the simulated face region is aligned with the targeted face region comprises: determining that the simulated face region is aligned with the targeted face region in a case that the simulated face region is within the targeted face region and a ratio of a size of the simulated face region to a size of the targeted face region is greater than a second preset ratio; and determining that the simulated face region is not aligned with the targeted face region in a case that the simulated face region is not within the targeted face region or the ratio of the size of the simulated face region to the size of the targeted face region is less than or equal to the second preset ratio.

For example, for the method for face liveness detection provided by at least one embodiment of the present disclosure, the method for face liveness detection further comprises: outputting first prompt information during and/or before acquiring the real-time image of the face to be verified with the image acquisition device, in which the first prompt information is used for notifying the face to be verified to be directly opposite to the image acquisition device and to be closer to the image acquisition device.

For example, for the method for face liveness detection provided by at least one embodiment of the present disclosure, the method for face liveness detection further comprises: outputting second prompt information during and/or before acquiring the illumination images, in which the second prompt information is used for notifying the face to be verified to keep still within a preset time period of the illumination liveness detection.

For example, for the method for face liveness detection provided by at least one embodiment of the present disclosure, determining whether or not the preset requirement of the image acquisition condition of the face to be verified is satisfied again in a case that the face to be verified moves during acquiring the illumination images and a moving distance is beyond an allowable range.

For example, for the method for face liveness detection provided by at least one embodiment of the present disclosure, number of times for performing the illumination liveness detection is increased by one for each performance of the illumination liveness detection, so as to obtain the number of times for performing the illumination liveness detection; and after the illumination liveness detection result is obtained, and in a case that the illumination liveness detection result indicates that the face to be verified fails to pass the illumination liveness detection, the method further comprises: outputting second error information used for notifying a failure of the illumination liveness detection; determining whether or not the number of times for performing the illumination liveness detection is greater than a second counting threshold; and determining whether or not the face to be verified passes the face liveness detection at least according to the illumination liveness detection result in a case that the number of times for performing the illumination liveness detection is greater than the second counting threshold, and determining whether or not the preset requirement of the image acquisition condition of the face to be verified is satisfied or performing the illumination liveness detection again in a case that the number of times for performing the illumination liveness detection is not greater than the second counting threshold.

For example, for the method for face liveness detection provided by at least one embodiment of the present disclosure, a predetermined pattern is displayed on the display screen; and the contents displayed on the display screen is changed by changing color and/or position of the predetermined pattern.

For example, for the method for face liveness detection provided by at least one embodiment of the present disclosure, the mode of the illumination light irradiated on the face to be verified is dynamically changed according to a predetermined rule or randomly.

For example, for the method for face liveness detection provided by at least one embodiment of the present disclosure, at an initial moment of each face liveness detection process, a unique identifier corresponding to this face liveness detection is generated.

For example, for the method for face liveness detection provided by at least one embodiment of the present disclosure, the method for face liveness detection further comprises: generating a time-varying real number sequence according to the unique identifier; and dynamically changing the mode of the illumination light irradiated on the face to be verified according to the real number sequence.

For example, for the method for face liveness detection provided by at least one embodiment of the present disclosure, acquiring of the plurality of illumination images, which are respectively corresponding to the various modes of the illumination light, of the face to be verified comprises: recording a video including the plurality of illumination images.

For example, for the method for face liveness detection provided by at least one embodiment of the present disclosure, obtaining of the illumination liveness detection result according to the light reflection characteristic of the face to be verified in the plurality of illumination images comprises:

selecting same one part of the face to be verified in the plurality of illumination images; calculating light reflection characteristics of the one part of the face to be verified in the plurality of illumination images; and obtaining the illumination liveness detection result according to the light reflection characteristics of the one part of the face to be verified in the plurality of illumination images.

For example, for the method for face liveness detection provided by at least one embodiment of the present disclosure, obtaining of the illumination liveness detection result according to the light reflection characteristic of the face to be verified in the plurality of illumination images comprises: selecting parts located at same one position of the plurality of illumination images; calculating light reflection characteristics of the parts located at the one position of the plurality of illumination images; and obtaining the illumination liveness detection result according to the light reflection characteristics of the parts located at the one position of the plurality of illumination images.

For example, for the method for face liveness detection provided by at least one embodiment of the present disclosure, before selecting the parts located at the one position of the plurality of illumination images, the plurality of illumination images are aligned so that a position of the face to be verified in the plurality of illumination images is substantially same.

For example, for the method for face liveness detection provided by at least one embodiment of the present disclosure, obtaining of the illumination liveness detection result according to the light reflection characteristic of the face to be verified in the plurality of illumination images comprises: calculating a correlation between the plurality of illumination images and corresponding modes of the illumination light; and obtaining the illumination liveness detection result according to an calculation result of the correlation.

For example, for the method for face liveness detection provided by at least one embodiment of the present disclosure, the method for face liveness detection further comprises: determining whether or not the face to be verified is illuminated by bright light other than the illumination light during acquiring the plurality of illumination images based on the plurality of illumination images; and notifying user to find a location without the bright light to perform the face liveness detection if the face to be verified is illuminated by the bright light.

For example, for the method for face liveness detection provided by at least one embodiment of the present disclosure, the illumination liveness detection result is obtained by a pre-trained classifier after the light reflection characteristic of the face to be verified in the plurality of illumination images is acquired.

For example, for the method for face liveness detection provided by at least one embodiment of the present disclosure, obtaining of the action liveness detection result according to the action detection result and the action instruction comprises: determining that the face to be verified passes the action liveness detection in a case that an action, which is executed by the face to be verified and matched with the action instruction, is detected in the action image, which is acquired within a time period not greater than a preset time period of the action liveness detection, and determining that the face to be verified fails to passes the action liveness detection in a case that the action, which is executed by the face to be verified and matched with the action instruction, is not detected in the action image, which is acquired within the time period not greater than the preset time period of the action liveness detection.

For example, for the method for face liveness detection provided by at least one embodiment of the present disclosure, the method for face liveness detection further comprises: outputting first time prompt information during outputting the action instruction, in which the first time prompt information comprises count-down information corresponding to the preset time period of the action liveness detection.

For example, for the method for face liveness detection provided by at least one embodiment of the present disclosure, the first prompt information comprises one or more selected from voice information, image information and text information.

For example, for the method for face liveness detection provided by at least one embodiment of the present disclosure, the adjustment prompt information comprises one or more selected from voice information, image information and text information.

For example, for the method for face liveness detection provided by at least one embodiment of the present disclosure, the adjustment prompt information is displayed in an area above a face preview region.

For example, for the method for face liveness detection provided by at least one embodiment of the present disclosure, the second prompt information comprises count-down information corresponding to the preset time period of the illumination liveness detection.

For example, for the method for face liveness detection provided by at least one embodiment of the present disclosure, the method for face liveness detection further comprises: outputting a brightness control instruction during and/or before acquiring the real-time image of the face to be verified, in which the brightness control instruction is configured for setting a brightness of a display screen to be one of the following: to be a constant value which is greater than a preset brightness threshold but less than a maximum brightness of the display screen, to be a constant value which is equal to the maximum brightness of the display screen, and to be changed along with an intensity change of ambient light.

At least one embodiment of the present disclosure provides another method for face liveness detection, which comprises: determining whether or not a preset requirement of an image acquisition condition of a face to be verified is satisfied, wherein the image acquisition condition at least comprises one or more selected from a position of the face to be verified, a pose of the face to be verified and a size of the face to be verified, in a real-time image acquired by an image acquisition device; obtaining face images of the face to be verified in a case that the preset requirement of the image acquisition condition of the face to be verified is satisfied; and determining whether or not the face to be verified passes the face liveness detection according to the face images.

At least one embodiment of the present disclosure provides a device for face liveness detection, which comprises: a light source, an image acquisition device and a processing device, in which the light source is configured to dynamically change mode of illumination light irradiated on a face to be verified; the image acquisition device is configured to acquire a plurality of illumination images, which are respectively corresponding to various modes of the illumination light, of the face to be verified; and the processing device is configured to obtain an illumination liveness detection result according to a light reflection characteristic of the face to be verified in the plurality of illumination images, and is further configured to determine whether or not the face to be verified passes the face liveness detection at least according to the illumination liveness detection result.

For example, for the device for face liveness detection provided by at least one embodiment of the present disclosure, the device for face liveness detection further comprises an output device, in which the output device is configured to output an action instruction, in which the action instruction is used for notifying the face to be verified to execute an action corresponding to the action instruction; the image acquisition device is further configured to acquire an action image of the face to be verified; the processing device is further configured to obtain an action detection result by detecting the action executed by the face to be verified on the basis of the action image, and obtain an action liveness detection result according to the action detection result and the action instruction; and the processing device is further configured to determine whether or not the face to be verified passes the face liveness detection according to both of the illumination liveness detection result and the action liveness detection result.

For example, for the device for face liveness detection provided by at least one embodiment of the present disclosure, the device for face liveness detection further comprises: a condition determination device, in which the image acquisition device is further configured to acquire a real-time image; the condition determination device is configured to determine whether or not an preset requirement of the image acquisition condition of the face to be verified is satisfied before acquiring the illumination images; and the image acquisition condition at least comprises one or more selected from a position of the face to be verified, a pose of the face to be verified and a size of the face to be verified in the real-time image acquired by the image acquisition device.

For example, for the device for face liveness detection provided by at least one embodiment of the present disclosure, the light source is configured to dynamically change the mode of the illumination light irradiated on the face to be verified by dynamically changing color and/or position of the illumination light.

For example, for the device for face liveness detection provided by at least one embodiment of the present disclosure, the light source is a display screen; and the display screen is configured to dynamically change the mode of the illumination light irradiated on the face to be verified by changing contents displayed on the display screen.

For example, for the device for face liveness detection provided by at least one embodiment of the present disclosure, the display screen is configured to display a predetermined pattern and dynamically change color and/or position of the predetermined pattern.

For example, for the device for face liveness detection provided by at least one embodiment of the present disclosure, the light source is configured to dynamically change the mode of the illumination light irradiated on the face to be verified according to a predetermined rule or randomly.

For example, for the device for face liveness detection provided by at least one embodiment of the present disclosure, at an initial moment of each face liveness detection process, the processing device is further configured to generate a unique identifier corresponding to this face liveness detection.

For example, for the device for face liveness detection provided by at least one embodiment of the present disclosure, the processing device is further configured to generate a time-varying real number sequence according to the unique identifier, and dynamically change the mode of the illumination light irradiated on the face to be verified according to the real number sequence.

For example, for the device for face liveness detection provided by at least one embodiment of the present disclosure, the image acquisition device is configured to record a video so as to acquire the plurality of illumination images, which are respectively corresponding to the various modes of the illumination light, of the face to be verified.

For example, for the device for face liveness detection provided by at least one embodiment of the present disclosure, the processing device is further configured to select same one part of the face to be verified in the plurality of illumination images, calculate the light reflection characteristics of the one part of the face to be verified in the plurality of illumination images, and obtain the illumination liveness detection result according to the light reflection characteristics of the one part of the face to be verified in the plurality of illumination images.

For example, for the device for face liveness detection provided by at least one embodiment of the present disclosure, the processing device is further configured to select parts located at same one position of the plurality of illumination images, calculate light reflection characteristics of the parts located at the one position of the plurality of illumination images, and obtain the illumination liveness detection result according to the light reflection characteristics of the parts located at the one position of the plurality of illumination images.

For example, for the device for face liveness detection provided by at least one embodiment of the present disclosure, the processing device is further configured to align the plurality of illumination images before selecting the parts located at the one position of the plurality of illumination images, so that a position of the face to be verified in the plurality of illumination images is substantially same.

For example, for the device for face liveness detection provided by at least one embodiment of the present disclosure, the processing device is further configured to: calculate a correlation between the plurality of illumination images and corresponding modes of the illumination light, and obtaining the illumination liveness detection result according to an calculation result of the correlation.

For example, for the device for face liveness detection provided by at least one embodiment of the present disclosure, the processing device is further configured to determine whether or not the face to be verified is illuminated by bright light other than the illumination light during acquiring the plurality of illumination images based on the plurality of illumination images, and prompt user to find a location without the bright light to perform the face liveness detection if the face to be verified is illuminated by the bright light.

For example, for the device for face liveness detection provided by at least one embodiment of the present disclosure, the processing device is configured to obtain the illumination liveness detection result by a pre-trained classifier after the light reflection characteristic of the face to be verified in the plurality of illumination images is acquired.

At least one embodiment of the present disclosure further provides another device for face liveness detection, which comprises: a processor, a memory and computer program instructions stored in the memory; in which upon the processor running the computer program instructions, the device for face liveness detection performs a following method comprising: acquiring a plurality of illumination images of a face to be verified, in which the plurality of illumination images are captured in a process of dynamically changing mode of illumination light irradiated on the face to be verified and are respectively corresponding to various modes of the illumination light; obtaining an illumination liveness detection result according to a light reflection characteristic of the face to be verified in the plurality of illumination images; and determining whether or not the face to be verified passes the face liveness detection at least according to the illumination liveness detection result.

At least one embodiment of the present disclosure further provides further another device for face liveness detection, which comprises a light source, an image acquisition device, an information transmitter and receiver and a processing device. The light source is configured to dynamically change mode of illumination light irradiated on a face to be verified; the image acquisition device is configured to acquire a plurality of illumination images, which are respectively corresponding to various modes of the illumination light, of the face to be verified; the information transmitter and receiver is configured to send the plurality of illumination images of the face to be verified to a server, and receive an illumination liveness detection result, which is obtained according to a light reflection characteristic of the face to be verified in the plurality of illumination images, from the server; and the processing device is configured to determine whether or not the face to be verified passes the face liveness detection at least according to the illumination liveness detection result.

At least one embodiment of the present disclosure further provides still another device for face liveness detection, which comprises an information transmitter and receiver and a processing device. The information transmitter and receiver is configured to receive a plurality of illumination images of a face to be verified from a client; the processing device is configured to obtain an illumination liveness detection result according to a light reflection characteristic of the face to be verified in the plurality of illumination images; and the information transmitter and receiver is further configured to send the illumination liveness detection result, which is obtained by the processing device according to the light reflection characteristic of the face to be verified in the plurality of illumination images, to the client.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1A:
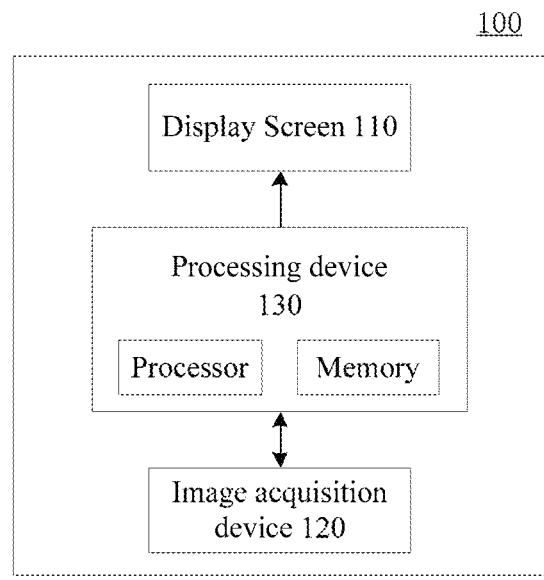
FIG. 1A is an illustrative block diagram of a device for face liveness detection provided by an embodiment of the present disclosure.

In order to make objects, technical details and advantages of the embodiments of the disclosure apparent, the technical solutions of the embodiments will be described in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The accompanying drawings are provided for better understanding of the embodiments of the present disclosure, and are part of the description. The accompanying drawings are used for illustrating the present disclosure together with the embodiments of the present disclosure, and are not intended to limit the present disclosure. In the accompanying drawings, same reference numerals generally represent same components or steps.

The authentication system based on face photo comparison can be improved for solving the problem of photo attack regarding the face-based authentication system. In an improved face-based authentication system, the above-mentioned photo attack can be coped effectively through determining whether or not a fine action on the face is detected. Moreover, the user can be asked to do specific action, so as to enhance resistance against the photo attack regarding the face-based authentication system. However, malicious users (i.e., malicious attackers) still can use tablet PCs, smart terminals and the like to play video or animation to counterfeit a face action of a person being counterfeited, so as to perform malicious attack (namely animation attack). The video or animation for counterfeiting the face action of the person being counterfeited can be synthesized by photos of the person being counterfeited or can be real videos of the person being counterfeited, obtained by attackers via various means. As a result, such video or animation is highly deceptive, and the authentication system based on face action is sometimes difficult to cope with such animation attack. Therefore, the industry is still looking for the method and device for performing more effective and convenient face liveness detection in face recognition processes.

For example, the embodiments of the present disclosure provide a method for face liveness detection and a device for face liveness detection. For example, the method and device for face liveness detection can determine whether or not a face to be verified passes the face liveness detection at least according to an illumination liveness detection result, and hence can effectively counteract malicious attack executed by malicious users by using photos or videos of the person being counterfeited. For example, the method and device for face liveness detection can be used in various authentication fields and similar fields (e.g., E-commerce, mobile payment and bank account opening).

At least one embodiment of the present disclosure provides a method for face liveness detection, which comprises: performing an illumination liveness detection and obtaining an illumination liveness detection result; and determining whether or not a face to be verified passes the face liveness detection (i.e., passes the face liveness authentication) at least according to the illumination liveness detection result. For example, performing of the illumination liveness detection and obtaining of the illumination liveness detection result comprise: acquiring a plurality of illumination images of the face to be verified; and obtaining the illumination liveness detection result according to a light reflection characteristic of the face to be verified in the plurality of illumination images. For example, the plurality of illumination images are captured in a process of dynamically changing mode of illumination light irradiated on the face to be verified and are respectively corresponding to various modes of the illumination light.

In one example, the illumination liveness detection result can be directly used as the final face liveness detection result. That is to say, if the illumination liveness detection result indicates that the face to be verified pass the illumination liveness detection, it is determined that the face to be verified passes the face liveness detection and the face to be verified belongs to a living body; and if the illumination liveness detection result indicates that the face to be verified fails to pass the illumination liveness detection, it is determined that the face to be verified fails to pass the face liveness detection and the face to be verified does not belong to a living body. This authentication method has advantages such as low calculation amount and high efficiency.

In another example, other face liveness detection methods or processes can be combined, such that whether or not the face to be verified passes the face liveness detection is determined based on the illumination liveness detection result and other liveness detection results obtained on the basis of other liveness detection methods or processes. This authentication method has advantages such as high accuracy.

At least one embodiment of the present disclosure provides a device for face liveness detection, which comprises: a processor, a memory and computer program instructions stored in the memory. Upon the processor running the computer program instructions, the device for face liveness detection performs a following method including: acquiring a plurality of illumination images of the face to be verified; obtaining an illumination liveness detection result according to a light reflection characteristic of the face to be verified in the plurality of illumination images; and determining whether or not the face to be verified passes the face liveness detection at least according to the illumination liveness detection result. The plurality of illumination images are captured in a process of dynamically changing mode of illumination light irradiated on the face to be verified and are respectively corresponding to various modes of the illumination light. In one example of the embodiment of the present disclosure, a plurality of pre-stored illumination images of the face to be verified can be acquired from the memory. In another example of the embodiment of the present disclosure, the plurality of illumination images of the face to be verified can also be received from other devices (e.g., received from the image acquisition device).

At least one embodiment of the present disclosure provides another device for face liveness detection, which can comprise components, devices, modules, sub-modules and/ or units for implementing the method for face liveness detection provided by the embodiments of the present disclosure. More specifically, the device for face liveness detection can comprise a light source, an image acquisition device and a processing device. The light source is configured to dynamically change mode of illumination light irradiated on a face to be verified; the image acquisition device is configured to acquire a plurality of illumination images, which are respectively corresponding to various modes of the illumination light, of the face to be verified; the processing device is configured to obtain an illumination liveness detection result according to a light reflection characteristic of the face to be verified in the plurality of illumination images, and is further configured to determine whether or not the face to be verified passes the face liveness detection at least according to the illumination liveness detection result.

In different embodiments, for example, the processing device can determine whether or not the face to be verified is a face of living human and can determine whether or not the face to be verified passes the face liveness detection only according to the illumination liveness detection result; for another example, according to specific implementation demands, the processing device can also determine whether or not the face to be verified is a face of living human and whether or not the face to be verified passes the face liveness detection on the basis of the illumination liveness detection result and the action liveness detection result. For example, the illumination liveness detection can be executed before the action liveness detection. For another example, the illumination liveness detection can also be executed after the action liveness detection. No specific limitation will be given here in the embodiment of the present disclosure.

For example, the device for face liveness detection can further comprise a condition determination device according to specific implementation demands. Thus, whether or not a preset requirement of the image acquisition condition of the face to be verified is satisfied can be determined by the condition determination device before performing the illumination liveness detection, and then the illumination liveness detection can be performed in a case that the condition determination device determines that the preset requirement of the image acquisition condition is satisfied. The image acquisition condition at least comprises one or more selected from a position of the face to be verified, a pose of the face to be verified and a size of the face to be verified, in a real-time image acquired by an image acquisition device.

For example, in different embodiments, for example, light-emitting devices such as at least partial areas of a display screen or a light source in a projector can be used as the light source. For another example, the light source can also be a special purpose light source (for example, one or more light-emitting diodes (LEDs) or laser diodes arranged according to a certain manner, or a flash lamp for a camera). For further another example, the light source can also be a combination of the at least partial areas of the display screen and the special purpose light source.

For example, the mode of the illumination light irradiated on the face to be verified can be dynamically changed by dynamically changing the color of the illumination light. For another example, the mode of the illumination light irradiated on the face to be verified can also be dynamically changed by dynamically changing the region, which is irradiated by the illumination light, of the face to be verified (namely by dynamically changing the position of the illumination light). For further another example, the mode of the illumination light irradiated on the face to be verified can also be dynamically changed by simultaneously and dynamically changing the color (i.e., wavelength) of the illumination light and the position of the illumination light.

For example, the position of the illumination light can be dynamically changed by changing a position of the light source. For another example, the position of the illumination light can also be dynamically changed by changing an angle of emitted light of the light source.

For example, the device for face liveness detection can have the function of obtaining the illumination liveness detection result according to videos and/or images of the face to be verified, such that whether or not the face to be verified is a face of living human can be determined (for example, the device for face liveness detection can determine whether or not the face to be verified is a face of living human at least based on the illumination liveness detection result). For another example, the device for face liveness detection can also send the videos and/or images of the face to be verified to an external device (for example, a server) and then receive the illumination liveness detection result and/or determination information, which is obtained at least according to the illumination liveness detection result, regarding whether or not the face to be verified is a face of living human from the external device. For further another example, the device for face liveness detection can receive the videos and/or images of the face to be verified (for example, the illumination images), obtain the illumination liveness detection result and/or determination information, which is obtained at least according to the illumination liveness detection result, regarding whether or not the face to be verified is a face of living human, and then send the illumination liveness detection result and/or determination information to the external device (e.g., a mobile terminal).

For example, the skin of a human face is a diffuse reflection material, and the human face is a three-dimensional (3D) object. In contrast, for example, a display screen of an LCD or an OLED display can be regarded as a self-luminous object and light exited from the display screen generally includes specular reflection component; for another example, photos and the like are generally a planar object and light exited from the photos and the like also generally include the specular reflection component. Furthermore, no matter the face to be verified is presented by the display screen or by the photo, an overall reflection characteristic is uniform and lack of the three-dimensional characteristic of the human face. Therefore, a light reflection characteristic of the human face is different from a light reflection characteristic of the display screen or the photo, and thus whether or not the face to be verified is a face of living human can be determined at least according to the light reflection characteristic of the face to be verified.

Nonrestrictive descriptions will be given below to different embodiments of the present disclosure and specific examples thereof with reference to the accompanying drawings. As described below, different features in the following concrete embodiments can be combined to obtain new embodiments in a case that no conflict is existed, and these embodiments shall also fall within the scope of the present disclosure.

Figure 1B:
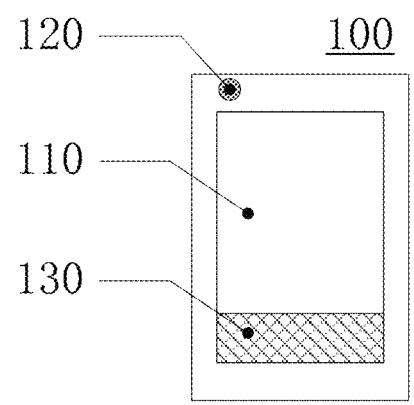
FIG. 1B is a schematic diagram of the device for face liveness detection as illustrated in FIG. 1A.

For example, FIG. 1A is an illustrative block diagram of a device for face liveness detection 100 provided by an embodiment of the present disclosure, and FIG. 1B is a schematic diagram of the device for face liveness detection 100 as illustrated in FIG. 1A. As illustrated in FIGS. 1A and 1B, the device for face liveness detection 100 comprises a display screen 110, an image acquisition device 120 and a processing device 130. For example, the image acquisition device 120 can be disposed at a periphery region (e.g., an upper side region) of the display screen 110. For example, the processing device 130 can be disposed at a side of the display screen 110 away from the light-emitting direction.

For example, the device for face liveness detection can be implemented into a variety of forms. No limitation will be given here in the embodiment of the present disclosure.

For example, the device for face liveness detection can be a special purpose device intended for the face liveness detection. For another example, the device for face liveness detection can also be a component of other electronic devices (e.g., a mobile phone, a tablet PC, a notebook computer or smart glasses); the device for face liveness detection can be, for example, a component of an entrance guard system or a component of equipment such as an ATM. In such a case, the device for face liveness detection 100 does not need an additional light source and hence the volume, the weight and the cost of the device for face liveness detection 100 can be reduced.

In one specific example, the device for face liveness detection 100 is a component of an electronic system (e.g., an authentication system or an electronic trading system); the processing device 130 is an independent server or server cluster separated from the face liveness detection 100; the display screen 110 and the image acquisition device 120 are respectively a display screen of a mobile terminal (e.g., a smart mobile phone or a tablet PC) and a front camera disposed on a same side with the display screen; and the processing device 130 is communicated with the mobile terminal by wired or wireless means.

In the embodiment, at least partial area of the display screen 110 can be used as the light source. For example, the display screen 110 can be configured to dynamically change mode of illumination light irradiated on a face to be verified by changing contents displayed on the display screen 110 (namely changing position and/or color of a luminous area of the display screen 110). For example, the display screen 110 can be configured to display a predetermined pattern and dynamically change color and/or position of the predetermined pattern. Description will be given below with reference to FIGS. 2-5 for illustrating how to dynamically change the position and/or the color of the illumination light irradiated on the face to be verified by changing the contents displayed on the display screen 110, so as to dynamically change the mode of the illumination light irradiated on the face to be verified.

Figure 2A:
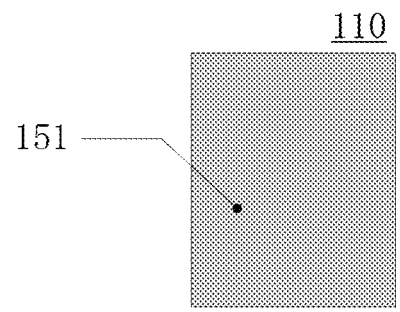
FIG. 2A is a schematic diagram to illustrate one configuration of a first area of a display screen of the device for face liveness detection provided by an embodiment of the present disclosure.
Figure 2B:
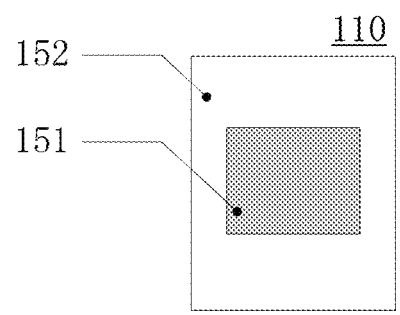
FIG. 2B is a schematic diagram to illustrate another configuration of the first area of the display screen of the device for face liveness detection provided by an embodiment of the present disclosure.
Figure 2C:
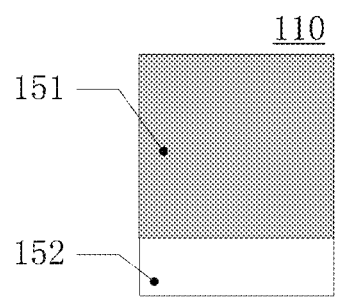
FIG. 2C is a schematic diagram to illustrate further another configuration of the first area of the display screen of the device for face liveness detection provided by an embodiment of the present disclosure.
Figure 2D:
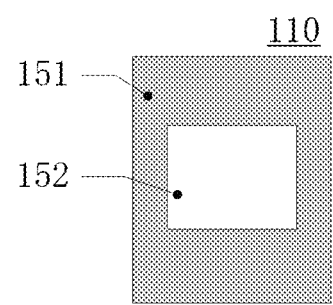
FIG. 2D is a schematic diagram to illustrate still another configuration of the first area of the display screen of the device for face liveness detection provided by an embodiment of the present disclosure.

FIGS. 2A-2D illustrate feasible configurations of the light source by the display screen 110. For example, the display screen 110 can include a first area 151 and a second area 152; at least partial area of the first area 151 is used as the light source; and the second area 152 of the display screen 110 can be used for displaying information helping the user to use the device for face liveness detection 100, e.g., prompt information for operating the device for face liveness detection. For example, a display brightness of the first area 151 can be significantly increased, or a ratio of light with short wavelength (e.g., blue light or green light) to light emitted by the first area 151 can be significantly increased. For example, as illustrated in FIG. 2A, the entire display screen 110 can be set to be the first area 151. For another example, as illustrated in FIG. 2B, the first area 151 can be disposed at a central area of the display screen 110. For further another example, as illustrated in FIG. 2C, the first area 151 can also be disposed at an upper area of the display screen 110. For still another example, as illustrated in FIG. 2D, the first area 151 can also be disposed on the periphery of the display screen 110. Obviously, a position and a shape of the first area 151 of the display screen 110, (i.e., the light source)

are not limited to the configurations as illustrated in FIGS. 2A-2D; the first area 151 (i.e., the light source), for example, can also be disposed at an upper area, a left area or a right area of the display screen 110; and the shape of the first area 151 (i.e., the light source) can also be circular, triangular, elliptical, etc. No limitation will be given here in the embodiment of the present disclosure.

Figure 3A:
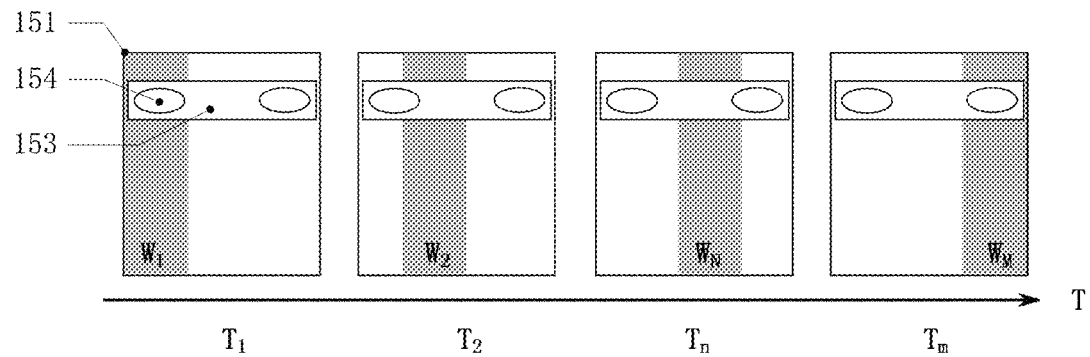
FIG. 3A is a schematic diagram to illustrate one method of dynamically changing position of illumination light irradiated on the face to be verified in an embodiment of the present disclosure.

FIG. 3A illustrates a method of dynamically changing the region, which is irradiated by the illumination light, of the face to be verified (dynamically changing the position of the illumination light) provided by an embodiment of the present disclosure. For example, the display screen 110 can further include a guide section 153, and the guide section 153 is used for guiding the user to align the eyes of the user with preset positions 154 of the guide section 153. For example, the position of the luminous area of the first area 151 can change with time. As illustrated in FIG. 3A, at time $T_1$, the luminous area of the first area 151 is disposed at a first position $[W_1]$, and the luminous area includes columns (or a column) of display pixels of the first area 151 at the first position; at time $T_2$, the luminous area of the first area 151 is disposed at a second position $[W_2]$; at time $T_n$, the luminous area of the first area 151 is disposed at the $N^{th}$ position $[W_N]$; and at time $T_m$, the luminous area of the first area 151 is disposed at the $M^{th}$ position $[W_M]$. That is to say, the luminous area can be dynamically changed along with time along a row direction of the first area 151. When the position of the luminous area of the first area 151 changes relative to the face to verified, the region, which is irradiated by the light emitted by the luminous area, of the face to be verified can also be changed correspondingly, therefore, the position of the illumination light can be dynamically changed, and hence the mode of the illumination light irradiated on the face to be verified can be dynamically changed.

Figure 3B:
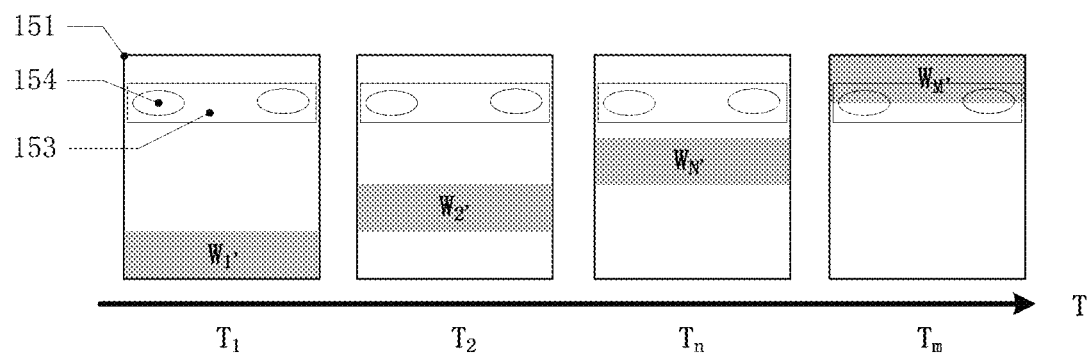
FIG. 3B is a schematic diagram to illustrate another method of dynamically changing the position of the illumination light irradiated on the face to be verified in an embodiment of the present disclosure.
Figure 3C:
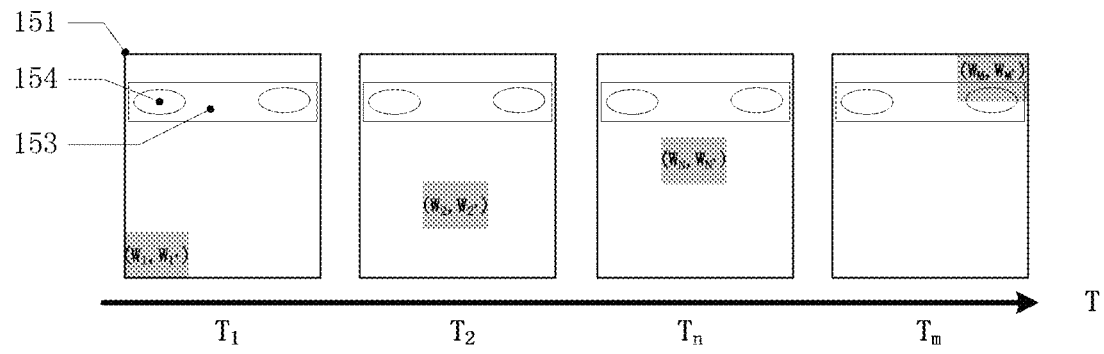
FIG. 3C is a schematic diagram to illustrate further another method of dynamically changing the position of the illumination light irradiated on the face to be verified in an embodiment of the present disclosure.

Obviously, the method to dynamically change the luminous area of the first area 151 along with time is not limited to the case as illustrated in FIG. 3A and can also be the case as illustrated in FIGS. 3B and 3C. For example, as illustrated in FIG. 3B, the luminous area includes rows (or a row) of display pixels of the first area 151 at the $N^{th}$ position $[W_N]$ at time $T_n$, so the luminous area can be dynamically changed along with time along a column direction of the first area 151. For another example, as illustrated in FIG. 3C, the luminous area includes display pixels of the first area 151 disposed at the $(N, N')^{th}$ position $[W_N, W_{N'}]$ at time $T_n$, so the luminous area can also be dynamically changed along with time along the row direction and the column direction of the first area 151. For example, a changing frequency of the position of the luminous area along the row direction and/or the column direction and the number of display pixels of the luminous area can be set according to specific implementation demands. No limitation will be given here in the embodiment of the present disclosure.

Figure 4:
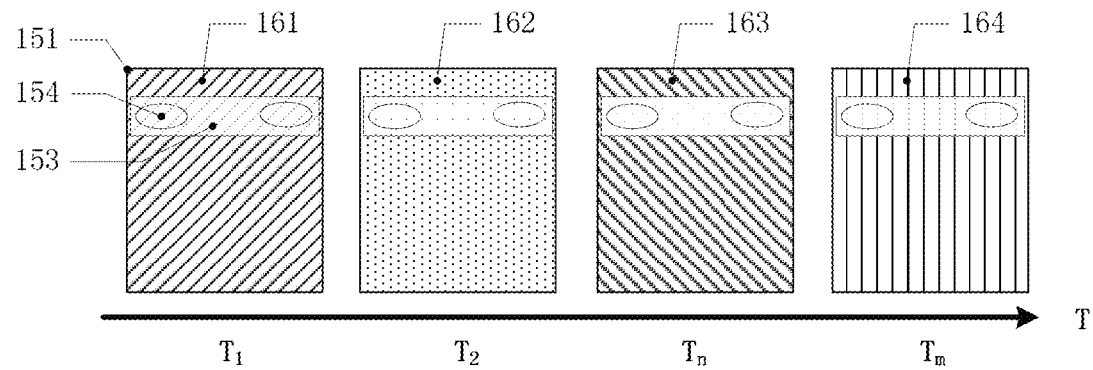
FIG. 4 is a schematic diagram to illustrate one method of dynamically changing color of the illumination light irradiated on the face to be verified in an embodiment of the present disclosure.

For example, FIG. 4 illustrates a method of dynamically changing the color of the illumination light irradiated on the face to be verified provided by an embodiment of the present disclosure. For example, the color of the first area 151 at time $T_1$ can be a first color 161; the color at time $T_2$ can be a second color 162; the color at time $T_n$ can be an $N^{th}$ color 163; and the color at time $T_m$ can be an $M^{th}$ color 164. That is to say, the color of the first area 151 can be dynamically changed along with time. The color of the illumination light can be dynamically changed by controlling the display screen 110 and allowing the color of the emitted light of the first area 151 to be dynamically changed with time, and hence the mode of the illumination light irradiated on the face to be verified can be dynamically changed. For example, a changing frequency of the color of the emitted light of the first area 151 and the size (or area) and the position of the luminous area of the first area 151 can be set according to specific implementation demands. No limitation will be given here in the embodiment of the present disclosure.

Figure 5A:
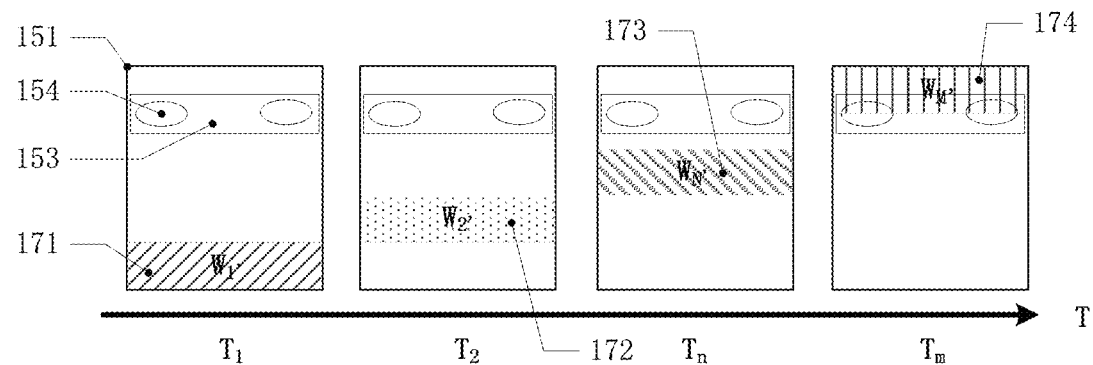
FIG. 5A is a schematic diagram to illustrate one method of dynamically changing the position and the color of the illumination light irradiated on the face to be verified in an embodiment of the present disclosure.

For example, FIG. 5A illustrates a method of dynamically changing the position and the color of the illumination light irradiated on the face to be verified. As illustrated in FIG. 5A, at time $T_1$, the luminous area of the first area 151 is disposed at the $W_{1'}$ position, and the color of the emitted light of the luminous area can be a first pattern color 171; at time $T_2$, the luminous area of the first area 151 is disposed at the $W_{2'}$ position, and the color of the emitted light of the luminous area can be a second pattern color 172; at time $T_n$, the luminous area of the first area 151 is disposed at the $W_{N'}$ position, and the color of the emitted light of the luminous area can be a $N^{th}$ pattern color 173; and at time $T_m$, the luminous area of the first area 151 is disposed at the $W_{M'}$ position, and the color of the emitted light of the luminous area can be a $M^{th}$ pattern color 174. That is to say, the position and the color of the emitted light of the luminous area are dynamically changed along with time. Therefore, the position and the color of the illumination light can be dynamically changed by controlling the display screen 110 and allowing the position and the color of the emitted light of the luminous area of the first area 151 to be dynamically changed along with time, and hence the mode of the illumination light irradiated on the face to verified can be dynamically changed. Obviously, the luminous area can also be dynamically changed along with time along the column direction of the first area 151, or along the row direction and the column direction of the first area 151. No further description will be given herein.

Figure 5B:
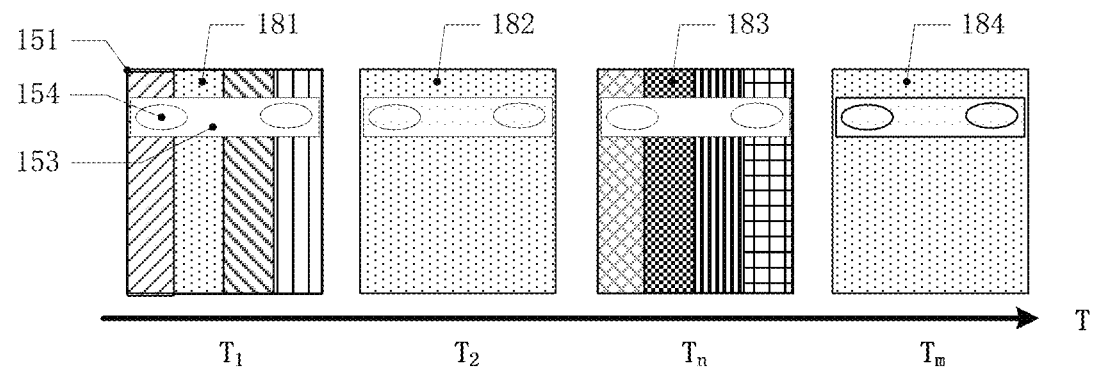
FIG. 5B is a schematic diagram to illustrate another method of dynamically changing the position and the color of the illumination light irradiated on the face to be verified in an embodiment of the present disclosure.

For example, FIG. 5B illustrates another method of dynamically changing the position and the color of the illumination light provided an embodiment of the present disclosure. As illustrated in FIG. 5B, the first area 151 displays a first pattern 181 at time $T_1$, displays a second pattern 182 at time $T_2$, displays an $N^{th}$ pattern 183 at time $T_n$, and displays an $M^{th}$ pattern 184 at time $T_M$. For example, the colors displayed at different positions of the first area 151 follow different color change rules. Therefore, the position and the color of the illumination light can be dynamically changed, and hence the mode of the illumination light irradiated on the face to be verified can be dynamically changed. For example, the color change rules at different positions can be set according to specific implementation demands. No specific limitation will be given here in the embodiment of the present disclosure.

For example, the rule followed by the display screen 110 in dynamically changing the mode of the illumination light irradiated on the face to be verified can be selected according to specific implementation demands, for example, can be selected from a plurality of pre-stored modes. No specific limitation will be given here in the embodiment of the present disclosure.

For example, the display screen 110 can change the mode of the illumination light irradiated on the face to be verified according to a predetermined rule. For example, the position of the luminous area of the first area 151 can be dynamically changed according to a rule of sequentially moving from leftmost of the display screen 110 to rightmost of the display screen 110. For another example, the color of the luminous area (i.e., the color of the emitted light of the luminous area) of the first area 151 can be dynamically changed according to a rule of sequentially displaying red, green and blue colors for respectively 20 times per minute.

For example, the display screen 110 can also randomly and dynamically change the mode of the illumination light irradiated on the face to be verified. Description will be given below to an illustrative method of randomly and dynamically changing the mode of the illumination light irradiated on the face to be verified by taking changing color as an example. The illustrative method of randomly and dynamically changing the mode of the illumination light irradiated on the face to be verified can comprise the following steps.

S1: acquiring a unique identifier. For example, the unique identifier can be acquired by the processing device 130 at an initial moment of each face liveness detection process. For example, the unique identifier can be acquired from an external device (e.g., a cloud server) separated from the device for face liveness detection 100, in such a case, the unique identifier can be acquired by a communication component controlled by the processing device 130. For another example, the unique identifier can also be generated by the processing device 130 of the device for face liveness detection 100. For example, the method of generating the unique identifier by the device for face liveness detection 100 can refer to random number generation technology, global unique identifier generation technology, etc. No limitation will be given here in the embodiment of the present disclosure. For example, the unique identifier can be invalidated immediately after a termination of each performance of the face liveness detection. For another example, the unique identifier can also be invalidated after the unique identifier has been generated for a period of time (e.g., 3 minutes) even though current face liveness detection has not ended.

S2: generating a real number sequence P[i] with a length of T according to the unique identifier. The real number sequence corresponds to images changing over time. For example, P[i] corresponds to the $i^{th}$ frame of image displayed by the display screen 110. The generation method of the real number sequence can refer to the conventional cryptographic algorithm, and no limitation will be given here in the embodiment of the present disclosure. For example, the real number sequence with the length of T can be generated by hash algorithm. For example, the length of the real number sequence can be set according to specific implementation demands, and no limitation will be given here. For example, the real number sequence P[i] can satisfy sum(P[i])=0, namely the value obtained by summing the real number sequence P[i] can be zero.

S3: obtaining at least two different colors. For example, the at least two different colors can be preset and stored in the device for face liveness detection 100. For example, in a coordinate system (R, G, B) of color space, supposing 0 is the minimum intensity and 255 is the maximum intensity, (0, 0, 255), (0, 255, 0), (255, 0, 0) and (128, 128, 128) can be specified as predetermined colors and stored in the device for face liveness detection 100. For another example, the at least two different colors can also be generated according to the unique identifier. The method of generating the at least two different colors according to the unique identifier can refer to the conventional cryptographic algorithm, and no further description will be given here. For further another example, the at least two different colors can also be randomly generated. The specific method can refer to random number generation technology, and no further description will be given here.

S4: the RGB value of colors displayed by the display screen 100 at different times is obtained according to the real number sequence and the at least two different colors. For example, taking a case of presetting or generating two colors (r1, g1, b1) and (r2, g2, b2) as an example, the color (r[i], g[i], b[i]) of the $i^{th}$ frame of image displayed by the display screen 110 can be as follows: r[i]=r1+(r2−r1)×P[i], g[i]=g1+(g2−g1)×P[i], b[i]=b1+(b2−b1)×P[i]. Therefore, the color of the illumination light irradiated on the face to be verified can be randomly and dynamically changed by performing the above-mentioned steps. The position of the illumination light irradiated on the face to be verified, or the color and the position of the illumination light irradiated on the face to be verified can also be randomly and dynamically changed by similar method. No further description will be given herein. Thus, the display screen 110 can randomly and dynamically change the mode of the illumination light irradiated on the face to be verified.

For example, the image acquisition device 120 can be configured to acquire a plurality of illumination images, which are respectively corresponding to various modes, of the face to be verified by recording videos or capturing (for example, continuously capturing) a plurality of images. For example, in a case of adopting the method of allowing the image acquisition device 120 to continuously capture the plurality of images, the image acquisition device 120 can be synchronized with the display device, so as to acquire the plurality of illumination images, which are respectively corresponding to various modes, of the face to be verified by means of capturing the plurality of images. For example, identification information such as time can be attached to each captured image so as to realize time alignment in a subsequent stage for verification processing. For example, a time length of the recorded video or a number of frames of the captured image can be set according to specific implementation demands. No limitation will be given herein.

For example, the image acquisition device 120 can be implemented into various types. For example, the image acquisition device 120 can include at least one camera, and the camera can include at least one selected from a complementary metal oxide semiconductor (CMOS) image sensor, a charge-coupled device (CCD) image sensor, and the like. For example, when the image acquisition device 120 includes two cameras, the two cameras can be the same or can also be different. For example, in a case that two cameras of the image acquisition device 120 are different, one camera can have a high resolution and the other camera can have a low resolution, or one camera can be a full-color camera and the other camera can be a black and white camera. The configurations of the image acquisition devices in other embodiments of the present disclosure are similar to the above-mentioned configurations of the image acquisition device 120.

Figure 6A:
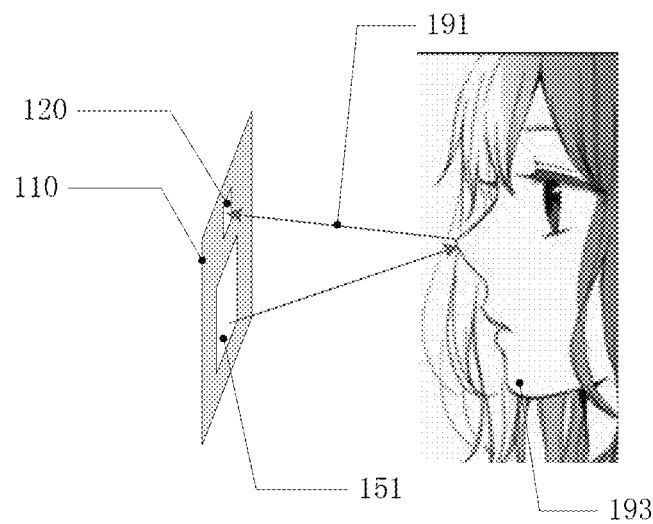
FIG. 6A is a schematic diagram to illustrate an illustrative scene of adopting an image acquisition device to acquire a plurality of illumination images, which are respectively corresponding to various modes, of the face to be verified in an embodiment of the present disclosure.
Figure 6B:
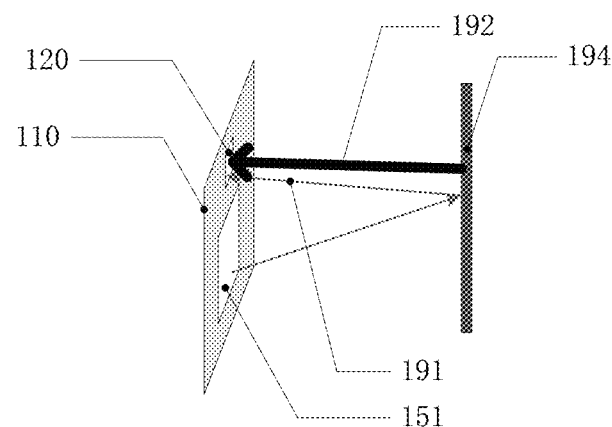
FIG. 6B is a schematic diagram to illustrate another illustrative scene of adopting the image acquisition device to acquire the plurality of illumination images, which are respectively corresponding to various modes, of the face to be verified in an embodiment of the present disclosure.

Description will be given below with reference to FIGS. 6A and 6B to illustrative methods of adopting the image acquisition device 120 to acquire the plurality of illumination images, which are respectively corresponding to various modes, of the face to be verified. For example, the face to be verified can be located at a light-emitting side of the display screen 110; and the face to be verified can be a face of living human 193, or a face image and/or video displayed by a second display screen 194 (namely a display screen used for malicious attack). FIGS. 6A and 6B respectively show illustrative methods of adopting the image acquisition device 120 to acquire the plurality of illumination images, which are respectively corresponding to various modes, of the face to be verified in a case that the face to be verified is the face of living human 193 and the face image and/or video displayed by the second display screen 194.

For example, at least partially light emitted by the luminous area of the first area 151 is irradiated on the face to be verified; the face to be verified at least partially reflects the illumination light irradiated on the face to be verified; and at least partially light reflected by the face to be verified is acquired by the image acquisition device 120. For example, the original video and/or image acquired by the image acquisition device 120 can be denoted as A[i], and i represents the numeral of images.

For example, FIG. 6A illustrates an illustrative scene of adopting the image acquisition device to acquire the plurality of illumination images, which are respectively corresponding to various modes, of the face to be verified in an embodiment of the present disclosure (namely the scene where the face to be verified is the face of living human 193). As illustrated in FIG. 6A, when the face to be verified is the face of living human 193, light acquired by the image acquisition device 120 comprises reflected light 191 of the face to be verified (i.e., the light reflected by the face to be verified) and ambient light (not shown in FIG. 6A). When the mode (the color and/or the position) of the illumination light irradiated on the face of living human 193 changes, the images, which are corresponding to various modes of the illumination light respectively and acquired by the image acquisition device 120, of the face of living human 193 can change correspondingly according to the change of the modes of the illumination light.

For example, FIG. 6B illustrates another illustrative scene of adopting the image acquisition device to acquire the plurality of illumination images, which are respectively corresponding to various modes, of the face to be verified in an embodiment of the present disclosure (namely the scene where the face to be verified is a face image and/or video displayed by the second display screen 194). As illustrated in FIG. 6B, when the face to be verified is the face image and/or video displayed by the second display screen 194, light acquired by the image acquisition device 120 comprises the reflected light 191 of the face to be verified, self-luminous light 192 of the second display screen 194, and ambient light (not shown in FIG. 6B). In the above-mentioned three kinds of light, only the self-luminous light 192 of the second display screen 194 can be used for forming a face image by the image acquisition device 120. The light reflected by the second display screen 194 (that is, the reflected light 191 of the face to be verified displayed by the second display screen 194) generally include specular reflection component and cannot be used for forming a face image by the image acquisition device 120; furthermore, the reflected light of the face to be verified displayed by the second display screen (i.e., the light reflected by the second display screen) exist in the form of the noise of the face image formed by the image acquisition device 120. Therefore, in a case of changing the mode (the color and/or the position) of the illumination light irradiated on the face of living human, even in a case that the light reflected by the second display screen 194 (that is, the reflected light 191 of the face to be verified displayed by the second display screen) are slightly changed, a light reflection characteristic of the face to be verified displayed by the second display screen 194 can be substantially unaffected. Thus, the face of living human 193 and the face image and/or video displayed by the second display screen 194 can be distinguished according to the light reflection characteristic of the face to be verified. That is to say, the illumination liveness detection result can be obtained according to the light reflection characteristic of the plurality of illumination images, which are respectively corresponding to various modes, of the face to be verified acquired by the image acquisition device 120, and therefore, whether or not the face to be verified is a face of living human can be determined at least according to the illumination liveness detection result.

For example, as illustrated in FIG. 1A, the processing device 130 can include a processor and a memory. The processor is, for example, a central processor (CPU), a microprocessor or a processor in other forms having data processing capability and/or instruction execution capability, and can be implemented by an X86 architecture or an ARM architecture. For example, the processor can be a general purpose processor and can also be a microcontroller, a microprocessor, a digital signal processor (DSP), a dedicated image processing chip, a field programmable logic array, etc. The processing devices in the following embodiments are similar to that in the embodiment. The memory, for example, can include a volatile memory and/or a non-volatile memory, for example, can include various types of storages or storage media such as a read-only memory (ROM), a hard disc or a flash memory. Correspondingly, the memory can be embodied as one or more computer program products; the computer program products can include computer readable storage media in various forms; and one or more computer program instructions can be stored on the computer readable storage medium. The processor can run the program instructions, so as to realize the following functions and/or other expected functions of the processor in the embodiment of the present disclosure. For example, the illumination liveness detection result can be obtained according to the light reflection characteristic of the face to be verified in the plurality of illumination images, and hence whether or not the face to be verified is a face of living human can be determined at least according to the illumination liveness detection result. The memory can also store various other applications (APPs) and data, for example, the plurality of illumination images, which are respectively corresponding to various modes, of the face to be verified acquired by the image acquisition device, and various data used and/or produced by the APPs.

For example, the processing device 130 can be configured to analyze the plurality of illumination images, to acquire the light reflection characteristic of the face to be verified in the plurality of illumination images, and hence to obtain the illumination liveness detection result. The processing device 130 can be further configured to determine whether or not the face to be verified passes the face liveness detection at least according to the illumination liveness detection result. That is to say, whether or not the face to be verified is a face of living human can be determined at least according to the light reflection characteristic of the face to be verified in the plurality of illumination images.

For example, the processing device 130 can determine whether or not the face to be verified is a face of living human only according to the illumination liveness detection result. For another example, the processing device 130 can also determine whether or not the face to be verified is a face of living human according to the illumination liveness detection result and the action liveness detection result. For clarity, description will be only given below to an example of adopting the processing device 130 to determine whether or not the face to be verified is a face of living human according to the illumination liveness detection result, and an example of determining whether or not the face to be verified is a face of living human according to the illumination liveness detection result and the action liveness detection result will be described later.

For example, the processing device 130 can be configured to select same one part of the face to be verified (for example, the cheek of the face to be verified) in the plurality of illumination images, calculate the light reflection characteristics of the one part of the face to be verified in the plurality of illumination images, and obtain the illumination liveness detection result (i.e., the result regarding whether or not the face to be verified passes the illumination liveness detection) according to the light reflection characteristics of the one part of the face to be verified in the plurality of illumination images. For another example, the processing device 130 can be further configured to select parts located at same one position of the plurality of illumination images (for example, at the center position of the plurality of illumination images), calculate light reflection characteristics of the parts located at the one position of the plurality of illumination images, and obtain the illumination liveness detection result (i.e., the result regarding whether or not the face to be verified passes the illumination liveness detection) according to the light reflection characteristics of the parts located at the one position of the plurality of illumination images, and thus whether or not the face to be verified is a face of living human can be determined. For example, the method of adopting the processing device 130 to determine whether or not the face to be verified is a face of living human can be selected according to specific implementation demands. No specific limitation will be given herein the embodiment of the present disclosure.

Figure 7:
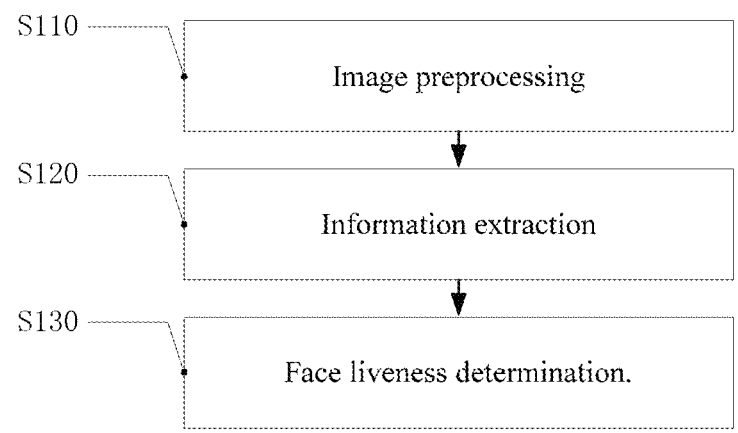
FIG. 7 is a flow diagram to illustrate an illustrative method of adopting a processing device to determine whether or not the face to be verified is a face of living human according to the light reflection characteristic of the face to be verified in the plurality of illumination images in an embodiment of the present disclosure.

For example, the processing device 130 can determine whether or not the face to be verified passes the illumination liveness detection according to the light reflection characteristic of the face to be verified in the plurality of illumination images with reference to the following steps as illustrated in FIG. 7.

S110: image preprocessing;
S120: information extraction;
S130: face liveness determination.

For example, the objective of the image preprocessing in the step S110 is to ensure the consistency of the size, the position and the quality of a target object. For example, according to specific implementation demands, the target object can be the entire face region of the face to be verified or partial area of the face to be verified. No specific limitation will be given here.

For another example, displacement can be occurred for the face to be verified in the process of recording the video or capturing the plurality of images, and the positions of the target object, in the plurality of face images, in each image can be consistent by means of alignment compensation. The consistency herein refers to that the positions of the target object in the plurality of frames of face images, in each image are substantially same (for example, the maximum value of the position deviation of the target object is less than a predetermined value), not requiring to have exactly same position.

For example, the target object can be aligned by the following alignment compensation algorithm. (1), a positioning image B[i] and a signal image C[i] are calculated according to an original video and/or image A[i]. For example, firstly, (r2−r1, g2−g1, b2−b1) can be normalized to a unit vector (u, v, w); secondly, the color (r', g', b') of pixels at corresponding positions in the positioning image B[i] is calculated according to the color (r, g, b) of each pixel in the original video and/or image A[i], in which r'=r−(r×u+g×v+b×w)×u, g'=g−(r×u+g×v+b×w)×v, b'=b−(r×u+g×v+b×w)×w; and finally, the color k of pixels at corresponding positions in the signal image C[i] is calculated, k=r×u+g×v+b×w. (2), the face region is extracted in B[0]. (3), a tracing algorithm (e.g., Lucas Kanade tracing algorithm) is applied to B[1] and later images (namely the first image and later images); face regions in B[1] and later images are aligned with a face region in B[0]; and an alignment parameter of each image is recorded. (4), the signal image C[i] is aligned by adoption of the same group of alignment parameters, and the value C[i, x, y] at the (x, y) position of the $i^{th}$ image in the aligned signal image C is acquired.

For example, although the step S110 can improve the efficiency and the reliability of determining whether or not the face to be verified passes the illumination liveness detection, the step S110 is not an indispensable step and can be adopted according to specific implementation demands. No specific limitation will be given here in the embodiment of the present disclosure.

For example, in order to extract the change information (signal) of the image of the target object, due to the change of the color and/or the position of the pattern displayed by the display screen 110, from the video or the plurality of images acquired by the image acquisition device 120, the information (signal) extraction in the step S120 can be performed. For example, the method of extracting change information (signal) of the image of the target object due to the change of the color and/or the position of the pattern displayed by the display screen 110 can be selected according to specific implementation demands. No limitation will be given here in the embodiment of the present disclosure. For example, information extraction can be realized by a method of calculating a correlation image S[x,y] (namely calculating the correlation between the plurality of illumination images and corresponding modes of the illumination light). For example, the correlation image can be calculated according to the aligned signal image C[i, x, y] and the real number sequence P[i], S[x,y]=sum(C[i,x,y]*P[i]). For example, the physical meaning of the correlation image is as follows: being a face image when the face to be verified is a face of living human; and being unable to generate corresponding face image when the face to be verified is the face image and/or video displayed by the second display screen 194. Signals (e.g., ambient light) which do not correlated with the mode of the illumination light irradiated on the face to be verified can be filtered out by calculation of the correlation between the aligned signal image C[i, x, y] and the real number sequence P[i]. In addition, if the real number sequence P[i] is generated according to the unique identifier in real time, the attacker cannot immediately generate a face animation sequence corresponding to the unique identifier, so the safety of the device for face liveness detection can be further improved.

For example, in order to ensure the reliability of the information (signal) extracted in the step S120 and the face liveness determination result, the reliability of the extracted signal can also be calculated before the step S130 (i.e., face liveness determination) and after the step of obtaining the correlation image S[x,y]. For example, the reliability of the extracted signal can be calculated by the following means.

(1) Calculating k1=sum(S[x,y]^2) according to the correlation image S[x,y].

(2) Calculating k2=k1/sum_{x,y} variance_i(C[i,x,y]) according to k1 and the aligned signal image C[i, x, y].

(3) Determining the reliability of the extracted signal according to preset thresholds and the values k1 and k2 obtained by calculation. For example, when the values k1 and k2 do not reach the preset thresholds (for example, can indicate that the image acquisition device 120 is illuminated by bright light other than the illumination light during acquiring the plurality of illumination images), the user can be prompted to change position (for example, finding a place without the bright light) and perform the face liveness detection again.

For example, the objective of the face liveness determination in the step S130 is to determine whether or not the change of the image of the target object extracted in the step S120 is in line with the change rule of a face of living human, and hence the illumination liveness detection result can be obtained. For example, the above-mentioned face liveness determination process can be realized by means of machine learning. For example, change information of the image of the target object extracted in the step S120 (e.g., the correlation image S[x,y] of the target object) can be inputted into a pre-trained classifier, and the classifier is adopted to determine whether or not the image, which is corresponding to the change information of the image of the target object (i.e., the correlation image S[x,y]), is an image obtained in the process of capturing photos of the face of living human (for example, obtained in the process of capturing photos of a three dimensional face), that is, the pre-trained classifier is adopted to determine whether or not the face to be verified passes the illumination liveness detection, and thus whether or not the face to be verified is the face of living human can be determined.

For example, the classifier can be a convolution neural network, a support vector machine or other applicable classifiers. No specific limitation will be given here in the embodiment of the present disclosure. For example, the classifier can be trained by the following method: firstly, adopting the device for face liveness detection 100 provided by the embodiment to acquire videos or a plurality of images from a large number of face of living humans and face images and/or videos displayed by the second display screen 194 during dynamically changing the mode of the illumination light irradiated on the face of living humans and the face images and/or videos displayed by the second display screen 194; secondly, acquiring a correlation image S[x,y] of the acquired face videos or the plurality of images through, for example, the above-mentioned method; and finally, the correlation image S[x,y] and information regarding whether or not corresponding image is an image obtained in the process of capturing the photos of the face of living human (for example, obtained in the process of capturing photos of a three dimensional face) are inputted into the classifier, and then the training of the classifier can be realized.

For example, the processing device 130 can also directly obtain the illumination liveness detection result by means of machine learning according to the light reflection characteristic of the face to be verified in the plurality of illumination images, such that whether or not the face to be verified is a face of living human can be determined. For example, the videos or the plurality of images acquired by the image acquisition device 120 and the unique identifier (or the real number sequence P[i]) can be inputted into the pre-trained classifier (e.g., a recurrent neural network (RNN)), and the classifier is adopted to determine whether or not the image is an image obtained in the process of capturing the photos of the face of living human (for example, obtained in the process of capturing photos of a three dimensional face).

Figure 8A:
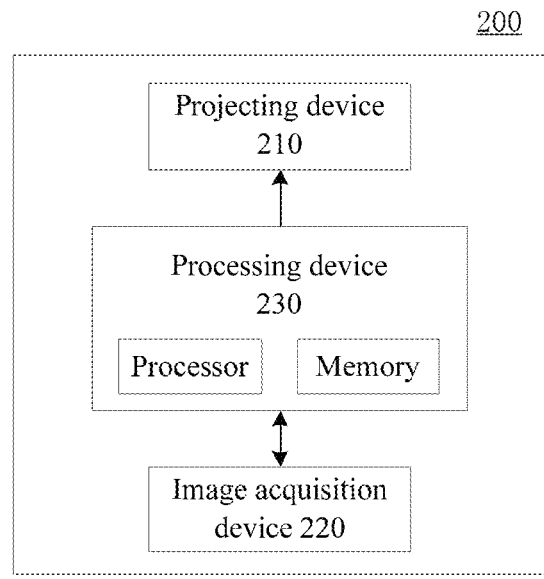
FIG. 8A is an illustrative block diagram of another device for face liveness detection provided by an embodiment of the present disclosure.
Figure 8B:
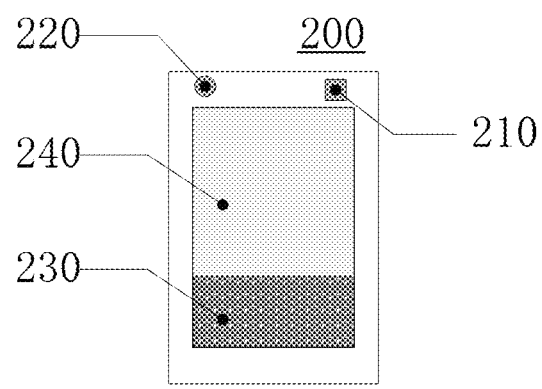
FIG. 8B is a schematic diagram of the device for face liveness detection as illustrated in FIG. 8A.

For example, FIG. 8A is an illustrative block diagram of another device for face liveness detection 200 provided by an embodiment of the present disclosure, and FIG. 8B is a schematic diagram of the device for face liveness detection 200 as illustrated in FIG. 8A. As illustrated in FIGS. 8A and 8B, the device for face liveness detection 200 comprises a projecting device 210 (e.g., a micro-projector), an image acquisition device 220 and a processing device 230. For example, the image acquisition device 220 and the projecting device 210 can be disposed at same side of the device for face liveness detection 200 (for example, a light-emitting side of the device for face liveness detection 200). For example, the device for face liveness detection 200 further comprises a display screen. The display screen can be configured to display relevant information helping the user to use the device for face liveness detection 200. For example, the image acquisition device 220 can be disposed at a periphery region (e.g., an upper side region) of the display screen. For example, the projecting device 210 can be disposed at a periphery region (e.g., an upper side region) of the display screen. For example, the processing device 230 can be disposed at an opposite side of the light-emitting side of the display screen. The device for face liveness detection 200 is, for example, can be embodied in various forms; for example, the device for face liveness detection 200 can be a special purpose device intended for the face liveness detection; for another example, the device for face liveness detection 200 can also be used as a component of an entrance guard system or a component of equipment such as an ATM; for further another example, the device for face liveness detection 200 can also be a component of other electronic devices (e.g., a mobile phone, a tablet PC, a notebook computer and smart glasses).

For example, in the embodiment, a light source in the projecting device 210 can be used as the light source of the device for face liveness detection 200. For example, the projecting device 210 can be configured to dynamically change the mode of illumination light irradiated on the face to be verified. For example, the position of the illumination light can be dynamically changed by changing a relative position between a projection region of the projecting device 210 and the face to be verified (namely changing an angle between light emitted by the light source of the projecting device 210 and the projecting device 210), and the projection region can be located at any position of the face to be verified according to specific implementation demands. For another example, the color of the illumination light can also be dynamically changed by changing the color of the emitted light of the light source of the projecting device 210. For further another example, the mode of the light emitted by the projecting device 210 can also be dynamically changed by changing the contents displayed by the projecting device 210 (namely the position of the projection region and/or the color presented by the projection region), and hence the mode of the illumination light irradiated on the face to be verified can be dynamically changed. For example, the method for changing the position of the projection region and/or the color presented by the projection region of the projecting device 210 can refer to relevant content of the projection display technology. No further description will be given herein.

For example, the image acquisition device 220 can be configured to acquire a plurality of illumination images, which are respectively corresponding to various modes, of the face to be verified. For example, the processing device 230 can be configured to determine whether or not the face to be verified passes the illumination liveness detection according to the light reflection characteristic of the face to be verified in the plurality of illumination images, such that whether or not the face to be verified is a face of living human can be determined. For example, the relevant content of the image acquisition device 220 and the processing device 230 can refer to the embodiment of the device for face liveness detection, which is illustrated in FIG. 1A. No further description will be given herein. For example, face liveness detection can be realized by the device for face liveness detection 200 and hence the safety of the device for face liveness detection can be improved.

Figure 9:
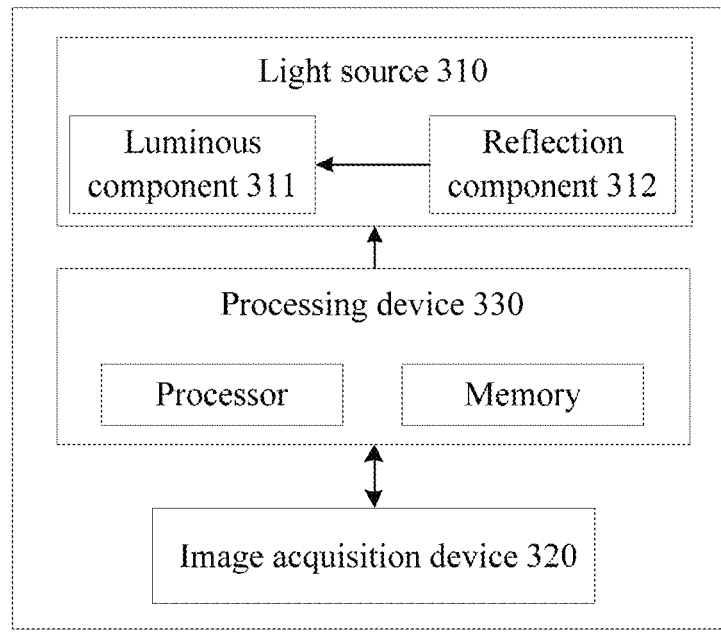
FIG. 9 is an illustrative block diagram of further another device for face liveness detection provided by an embodiment of the present disclosure.

For example, FIG. 9 is an illustrative block diagram of further another device for face liveness detection 300 provided by an embodiment of the present disclosure. As illustrated in FIG. 9, the device for face liveness detection 300 can comprise a light source 310, an image acquisition device 320 and a processing device 330. For example, the device for face liveness detection 300 can be a special purpose device intended for the face liveness detection; for another example, the device for face liveness detection 300 can also be used as a component of an entrance guard system or a component of equipment such as an ATM; for further another example, the device for face liveness detection 300 can also be a component of other electronic devices (e.g., a mobile phone, a tablet PC or a notebook computer).

For example, the light source 310 includes a luminous component 311 and a reflection component 312. The light source 310 can be configured to dynamically change the mode of illumination light irradiated on the face to be verified. The type, the emission wavelength (namely the color) and the number of the luminous components of the light source 310 can be selected according to specific implementation demands. No specific limitation will be given here in the embodiment of the present disclosure.

For example, the light source 310 can include red, green and blue LEDs. For example, the color of the emitted light of the light source 310 can be controlled by control of the luminous intensity of the red, green and blue LEDs, and hence the color and the mode of the illumination light irradiated on the face to be verified can be dynamically changed.

For example, the reflection component 312 can be configured to change the direction of emitted light of the luminous component 311 relative to the device for face liveness detection 300, and hence can dynamically change the position and the mode of the illumination light irradiated on the face to be verified. For example, the type of the reflection component 312 can be set according to specific implementation demands. No specific limitation will be given here in the embodiment of the present disclosure. For example, the reflection component 312 can be a spatial light modulator (e.g., a digital micro device (DMD) or a liquid crystal light valve) or a reflective mirror having angle adjustment function.

For example, the image acquisition device 320 can be configured to acquire a plurality of illumination images corresponding to various modes respectively. For example, the processing device 330 can be configured to determine whether or not the face to be verified passes the illumination liveness detection according to the light reflection characteristic of the face to be verified in the plurality of illumination images, such that whether or not the face to be verified is a face of living human can be determined. For example, the configurations of the image acquisition device 320 and the processing device 330 can refer to the embodiment of the device for face liveness detection, which is illustrated in FIG. 1A. No further description will be given herein. For example, face liveness detection can be realized by the device for face liveness detection 300 and hence the safety of the device for face liveness detection can be improved.

Figure 10:
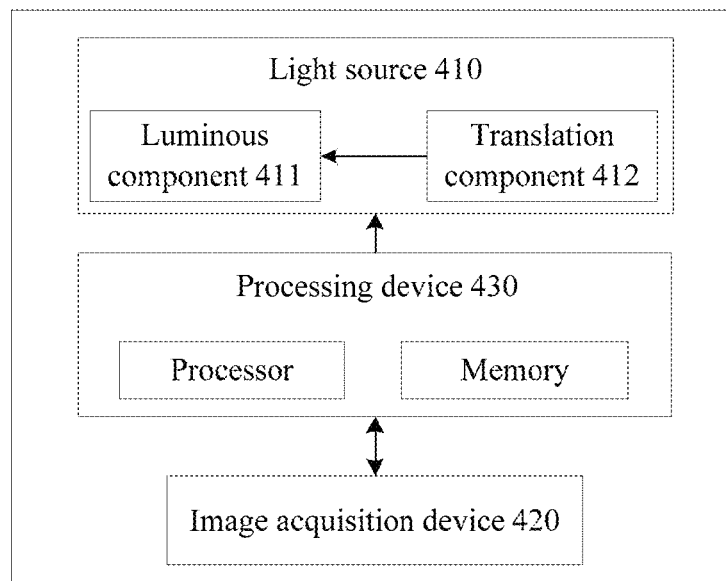
FIG. 10 is an illustrative block diagram of still another device for face liveness detection provided by an embodiment of the present disclosure.

For example, FIG. 10 is an illustrative block diagram of still another device for face liveness detection 400 provided by an embodiment of the present disclosure. As illustrated in FIG. 10, the device for face liveness detection 400 can comprise a light source 410, an image acquisition device 420 and a processing device 430. For example, the device for face liveness detection 400 can be a special purpose device intended for the face liveness detection; for another example, the device for face liveness detection 400 can also be used as a component of an entrance guard system or a component of equipment such as an ATM.

For example, the light source 410 includes a luminous component 411 and a translation component 412. The luminous component 411 is provided on the translation component 412. For example, the translation component 412 can be configured to change the position of the luminous component 411, and hence can dynamically change the position and the mode of illumination light irradiated on the face to be verified. For example, the type of the translation component 412 can be set according to specific implementation demands. No specific limitation will be given here in the embodiment of the present disclosure. For example, the translation component 412 can be implemented by a one-dimensional electric translation stage, a two-dimensional electric translation stage, a guide rail and the like, and for example, the translation component 412 can be driven by a stepping motor.

The relevant content regarding the light source 410, the image acquisition device 420 and the processing device 430 can refer to the embodiment of the device for face liveness detection, which is illustrated in FIG. 1A. No further description will be given herein. For example, face liveness detection can be realized by the device for face liveness detection 400 and hence the safety of the device for face liveness detection can be improved.

Figure 11:
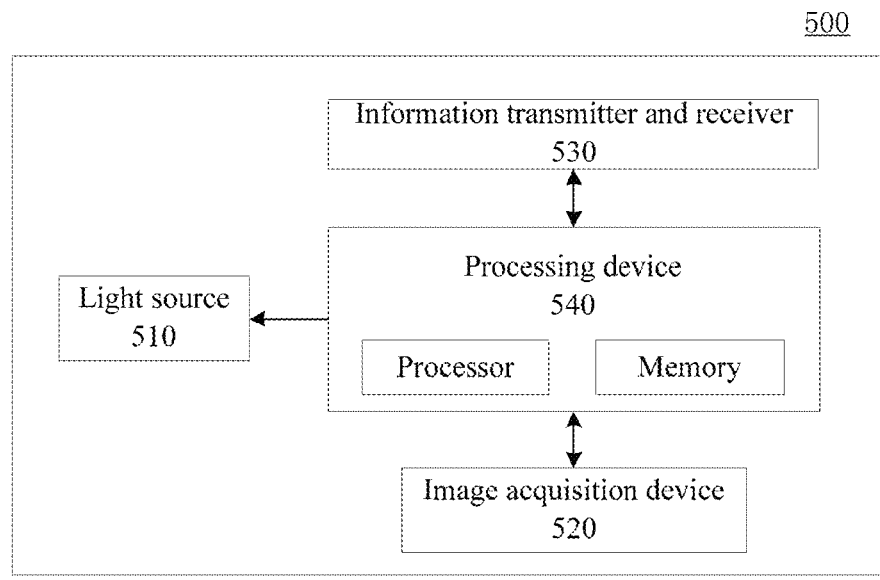
FIG. 11 is an illustrative block diagram of a device for face liveness detection provided by another embodiment of the present disclosure.

For example, FIG. 11 is an illustrative block diagram of a device for face liveness detection 500 provided by another embodiment of the present disclosure. As illustrated in FIG. 11, the device for face liveness detection 500 can comprise a light source 510, an image acquisition device 520, an information transmitter and receiver 530 and a processing device 540. For example, the device for face liveness detection 500 can be a component of other electronic devices (e.g., a mobile phone, a tablet PC or a notebook computer). For another example, the device for face liveness detection 500 can also be a special purpose device intended for the face liveness detection. For further another example, the device for face liveness detection 500 can also be used as a component of an entrance guard system or a component of equipment such as an ATM.

For example, the relevant content regarding the light source 510 and the image acquisition device 520 can refer to the embodiment of the device for face liveness detection illustrated in FIG. 1A. No further description will be given herein.

For example, the information transmitter and receiver 530 can be configured to send a plurality of illumination images of the face to be verified to a server, and then receive at least one of the following information from the server: the illumination liveness detection result determined according to the light reflection characteristic of the face to be verified in the plurality of illumination images; determination information, which is obtained at least according to the illumination liveness detection result, regarding whether or not the face to be verified is a face of living human. For example, the information transmitter and receiver 530 can send the plurality of illumination images of the face to be verified to the server via network or other technologies, and receive the determination information regarding whether or not the face to be verified is a face of living human (and/or the illumination liveness detection result) via network or other technologies. For example, the network can be Internet, wireless local area network (WLAN), mobile communication network and the like; for example, the other technologies can include Bluetooth communication technology, infrared communication technology, etc. For example, the server can be a general purpose server or a special purpose server and can be a virtual server, a cloud server, etc. For example, the information transmitter and receiver 530 can include a modem, a network adapter, a Bluetooth transceiver, an infrared transceiver and the like, and for example, the information transmitter and receiver 530 can also perform operations such as coding and decoding of the sent information or the received information.

For example, the processing device 540 can be configured to determine whether or not the face to be verified passes the face liveness detection (i.e., face liveness authentication) on the basis of the determination information regarding whether or not the face to be verified is a face of living human (and/or the illumination liveness detection result). Because the process of determining whether or not the face to be verified is a face of living human at least according to the light reflection characteristic of the face to be verified in the plurality of illumination images is performed by the server, computational resources of the processing device 540 can be saved. Thus, the requirements on the performances of the processing device 540 and the production cost of the device for face liveness detection 500 can be reduced, and therefore the user experience can be improved. For example, face liveness detection can be realized by the device for face liveness detection 500 and hence the safety of the device for face liveness detection 500 can be improved.

Figure 12:
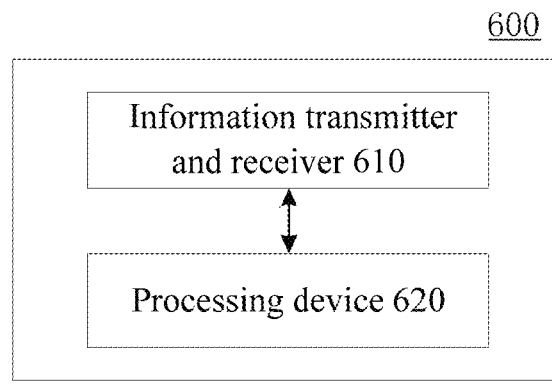
FIG. 12 is an illustrative block diagram of a device for face liveness detection provided by further another embodiment of the present disclosure.

For example, FIG. 12 is an illustrative block diagram of a device for face liveness detection 600 provided by further another embodiment of the present disclosure. As illustrated in FIG. 12, the device for face liveness detection 600 can comprise an information transmitter and receiver 610 and a processing device 620. For example, the function of the device for face liveness detection 600 can be realized by a server. The server can be a general purpose server or a special purpose server and can be a virtual server, a cloud server, etc. The information transmitter and receiver 610 can include a modem, a network adapter, a Bluetooth transceiver, an infrared transceiver and the like; for example, the information transmitter and receiver 610 can also performing operations such as coding and decoding of the sent information or the received information.

For example, the information transmitter and receiver 610 can be configured to receive a plurality of illumination images of the face to be verified from a client. For example, the processing device 620 can be configured to obtain the illumination liveness detection result according to the light reflection characteristic of the face to be verified in the plurality of illumination images; for example, the processing device 620 can be further configured to obtain determination information, which is obtained at least according to the illumination liveness detection result, regarding whether or not the face to be verified is a face of living human. For example, the information transmitter and receiver 610 can be further configured to send determination information regarding whether or not the face to be verified is a face of living human (and/or an illumination liveness detection result) to the client. The relevant content regarding the processing device 620 can refer to the embodiment of the device for face liveness detection illustrated in FIG. 1A. No further description will be given herein. For example, face liveness detection can be realized by the device for face liveness detection 600 and hence the safety of the device for face liveness detection 600 can be improved.

For example, the device for face liveness detection 500 as illustrated in FIG. 11 can be used as the client, the device for face liveness detection 600 as illustrated in FIG. 12 can be used as the server, and the device for face liveness detection 500 and the device for face liveness detection 600 can be cooperated with each other to form a face liveness detection system. The client and the server can be arranged at the same place or different places.

Figure 13:
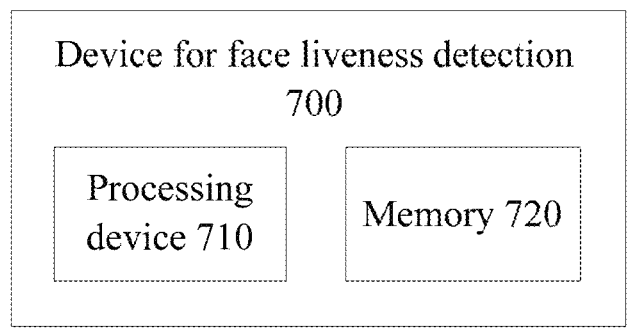
FIG. 13 is an illustrative block diagram of a device for face liveness detection provided by still another embodiment of the present disclosure.

For example, FIG. 13 is an illustrative block diagram of a device for face liveness detection 700 provided by still another embodiment of the present disclosure. As illustrated in FIG. 13, the device for face liveness detection 700 can comprise a processing device 710, a memory 720, and computer program instructions are stored in the memory 720. The computer program instructions execute the following steps when run by the processing device 710.

S710: acquiring a plurality of illumination images of a face to be verified, wherein the plurality of illumination images are captured in a process of dynamically changing mode of illumination light irradiated on the face to be verified and are respectively corresponding to various modes of the illumination light.

S720: obtaining an illumination liveness detection result according to a light reflection characteristic of the face to be verified in the plurality of illumination images; and S730: determining whether or not the face to be verified passes the face liveness detection at least according to the illumination liveness detection result.

For example, according to specific implementation demands, the device for face liveness detection 700 can further comprise a light source and an image acquisition device. For example, the light source is configured to dynamically change the mode of the illumination light irradiated on the face to be verified; and the image acquisition device is configured to acquire the plurality of illumination images, which are respectively corresponding to various modes, of the face to be verified. For example, the light source and the image acquisition device can be adopted to acquire the plurality of illumination images, which are respectively corresponding to various modes, of the face to be verified captured in the process of dynamically changing the mode of the illumination light irradiated on the face to be verified.

For example, the processing device 710 can be a CPU or a processor in other forms having data processing capability and/or instruction execution capability, and can be implemented by an X86 architecture or an ARM architecture. For example, the processing device 710 can be a general purpose processor and can also be a microcontroller, a microprocessor, a DSP, a dedicated image processing chip, a field programmable logic array, etc.

For example, the memory 720, for example, can include a volatile memory and/or a nonvolatile memory, for example, can include various types of storages or storage media such as an ROM, a hard disc and a flash memory. Correspondingly, the memory 720 can be embodied as one or more computer program products; the computer program products can include various forms of computer readable storage media; and one or more computer program instructions can be stored on the computer readable storage medium.

For example, the processing device 710 can run the program instructions, so as to realize the following functions and/or other expected functions of the device for face liveness detection in the embodiment of the present disclosure, for example, can determine whether or not the face to be verified passes the illumination liveness detection according to the light reflection characteristic of the face to be verified in the plurality of illumination images.

For example, the memory 720 can also store various other applications (APPs) and various data, for example, the plurality of illumination images, which are respectively corresponding to various modes, of the face to be verified acquired by the image acquisition device, and various data used and/or produced by the APPs.

For example, in the step S710, the mode of the illumination light irradiated on the face to be verified can be dynamically changed by dynamically changing the color and/or position of the illumination light (for example, the color and/or position of the illumination light can be dynamically changed through controlling of the light source with the processing device 710).

For example, when the light source is at least partial area of the display screen, the mode of light emitted by the display screen can be dynamically changed by changing the contents displayed on the display screen, and hence the mode of the illumination light irradiated on the face to be verified can be dynamically changed. For example, the contents displayed on the display screen can be changed by displaying a predetermined pattern on the display screen and changing the color and/or position of the predetermined pattern. For example, the position of a luminous area, which is used as the light source, of the display screen can be changed along with time along the row direction, along the column direction, or along the row direction and the column direction. Because the relative position between the luminous area of the display screen and the face to be verified can be changed, the region, which is irradiated by the light emitted by the luminous area, of the face to be verified can also be correspondingly changed, so the position of the illumination light can be dynamically changed, and hence the mode of the illumination light irradiated on the face to be verified can be dynamically changed.

For another example, when the light source is at least partial area of the display screen, the color of the luminous area, which is used as the light source, of the display screen can change along with time, and hence the mode of the illumination light irradiated on the face to be verified can be dynamically changed. Obviously, the position and the color of the luminous area, used as the light source, of the display screen can be simultaneously changed along with time, and hence the mode of the illumination light irradiated on the face to be verified can be dynamically changed.

For example, when the light source of the projecting device is used as the light source of the device for face liveness detection, the position and/or color of the illumination light can be dynamically changed by changing the relative position between the projection region of the projecting device and the face to be verified, and/or by changing the color presented by projection region (or the light emitted by the luminous area), and hence the mode of the illumination light irradiated on the face to be verified can be dynamically changed.

For example, when the light source includes special purpose luminous components, the position of the illumination light irradiated on the face to be verified can be dynamically changed by the method of adopting the reflection component to change the direction of the light emitted by the luminous component (for example, change the angle between the light emitted by the luminous component and the device for face liveness detection) and/or adopting the translation component to change the position of the luminous component.

For example, when the special purpose luminous components include red, green and blue LEDs or laser diodes, the color of the light source can be changed by changing the ratio of the luminous intensity of the red, green and blue LEDs, and hence the color of the illumination light irradiated on the face to be verified can be dynamically changed. For example, the mode of the illumination light irradiated on the face to be verified can be dynamically changed by dynamically changing the position and/or color of the illumination light irradiated on the face to be verified.

For example, the mode of the illumination light irradiated on the face to be verified can be dynamically changed according to a predetermined rule or randomly. For example, in a case of randomly and dynamically changing the mode of the illumination light irradiated on the face to be verified, at the initial moment of each the face liveness detection process, a unique identifier corresponding to this face liveness detection can be generated; subsequently, a real number sequence changing along with time (i.e., a time-varying real number sequence) is generated according to the unique identifier; and then the mode of the illumination light irradiated on the face to be verified can be dynamically changed on the basis of the real time sequence. For example, the unique identifier can be generated in the device for face liveness detection. For another example, the unique identifier can also be generated on a device (e.g., a cloud server) separated from the device for face liveness detection and transmitted to the device for face liveness detection. For example, the specific content of dynamically changing the mode of the illumination light irradiated on the face to be verified can be referred to the embodiment of the device for face liveness detection illustrated in FIG 1A. No further description will be given herein.

For example, in the process of dynamically changing the mode of the illumination light irradiated on the face to be verified, the image acquisition device, for example, can be adopted to acquire a plurality of illumination images, which are respectively corresponding to various modes, of the face to be verified. For example, for each mode of the illumination light irradiated on the face to be verified, the image acquisition device can capture at least one illumination image (for example, capture one illumination image or three illumination images for each mode of the illumination light). For example, the image acquisition device can record a video including the plurality of illumination images of the face to be verified or can also continuously capture a plurality of images.

For example, when the face to be verified is a face of living human, light acquired by the image acquisition device comprises reflected light of the face to be verified (i.e., the light reflected by the face of living human) and ambient light; when the mode (the color and/or position) of the illumination light irradiated on the face of living human is changed, the images, which are corresponding to various modes of the illumination light respectively and acquired by the image acquisition device, of the face of living human can be correspondingly changed according to the change of the modes of the illumination light.

For example, when the face to be verified is a face image and/or video displayed by a second display screen (a display screen used for malicious attack), light acquired by the image acquisition device comprises reflected light of the face to be verified (i.e., the light reflected by the second display screen), self-luminous light of the second display screen, and ambient light. Because the second display screen is a self-luminous object, among the three kinds of light acquired by the image acquisition device, only the self-luminous light of the second display screen can be used for forming a face image by the image acquisition device. The reflected light of the face to be verified displayed by the second display screen (i.e., the light reflected by the second display screen) generally includes specular reflection components and cannot be used for forming the face image by the image acquisition device; furthermore, the reflected light of the face to be verified displayed by the second display screen (i.e., the light reflected by the second display screen) exist in the form of the noise of the face image formed by the image acquisition device. Thus, when the mode (the color and/or position) of the illumination light irradiated on the face of living human changes, even in a case that the light reflected by the second display screen 194 (that is, the reflected light of the face to be verified displayed by the second display screen) are slightly changed, a light reflection characteristic of the face to be verified displayed by the second display screen can be substantially unaffected. Therefore, the face of living human and the face image and/or video displayed by the second display screen can be distinguished according to the light reflection characteristic of the face to be verified. That is to say, the illumination liveness detection result can be obtained according to the light reflection characteristic of the plurality of illumination images, which are respectively corresponding to various modes, of the face to be verified acquired by the image acquisition device, and therefore, whether or not the face to be verified is a face of living human can be determined.

For example, same one part of the face to be verified in the plurality of illumination images can be selected; subsequently, the light reflection characteristic of the one part of the face to be verified in the plurality of illumination images can be calculated; and then whether or not the face to be verified is a face of living human can be determined according to the light reflection characteristics of the one part of the face to be verified in the plurality of illumination images. For another example, parts located at same one position of the plurality of illumination images can also be selected; subsequently, the light reflection characteristic of the parts located at the one position of the plurality of illumination images can be calculated; and then the illumination liveness detection result can be obtained according to the light reflection characteristics of the parts located at the one position of the plurality of illumination images, thus whether or not the face to be verified is a face of living human can be determined.

For example, obtaining of the illumination liveness detection result according to the light reflection characteristic of the face to be verified in the plurality of illumination images in the step S720 comprising the following steps.

S721: extracting information (signal) regarding the change of an image of a target object, due to the change of the mode (e.g., the color and/or position) of the illumination light irradiated on the face, from the acquired video or the plurality of images of the face to be verified; and S722: obtaining the illumination liveness detection result according to the extracted information (signal).

For example, the steps S721 and S722 can be implemented by the processing device 710. For example, data generated in the steps S721 and S722 can be stored in the memory 720.

For example, in the step S721, the method of extracting the change information (signal) of the image of the target object due to the change of the mode of the illumination light irradiated on the face to be verified can be selected according to specific implementation demands. No specific limitation will be given here in the embodiment of the present disclosure. For example, the change information of the image of the target object can be extracted by the method of calculating a correlation image (for example, calculating the correlation between the plurality of illumination images and corresponding modes of the illumination light). For example, the specific method of calculating the correlation image can refer to the embodiment of the device for face liveness detection illustrated in FIG. 1A. No further description will be given herein.

For example, before the step S721, the plurality of illumination images, which are respectively corresponding to various modes, of the face to be verified acquired by the image acquisition device can be preprocessed. The objective of image preprocessing is to ensure the consistency of the target object in size, position and quality. For example, according to specific implementation demands, the target object can be the entire face region of the face to be verified or partial area of the face to be verified. No specific limitation will be given here. For example, the position of the target object, in the plurality of frames of face images, in each image can be consistent by means of alignment compensation. The consistency herein refers to that the positions of the target object in the plurality of frames of face images, in each image are substantially same (for example, the maximum value of the position deviation of the target object is less than a predetermined value), not requiring to have exactly same position. The specific method of alignment compensation can refer to the embodiment of the device for face liveness detection illustrated in FIG. 1A. No further description will be given herein.

For example, after the step S721 and before the step S722, the reliability of the signal (e.g., the reliability of the correlation image or the calculation result of the correlation) extracted in the step S721 can also be calculated. For example, whether or not the face to be verified is illuminated by bright light other than the illumination light during acquiring the plurality of illumination images can be determined by calculating the reliability of the extracted signal based on the plurality of illumination images; and when there is bright light other than the illumination light, the user is prompted to finding a place without the bright light to perform the face liveness detection. For example, the calculation and determination method of the reliability of the extracted signal can refer to the embodiment of the device for face liveness detection illustrated in FIG. 1A. No further description will be given herein.

For example, in the step S722, whether or not the change of the image of the target object is in line with the change rule of a face of living human (for example, the change rule of a three dimensional face) can be determined according to the extracted signal (e.g., the correlation image) by means of machine learning. For example, the above-mentioned face liveness determination process can be implemented by means of machine learning, so the illumination liveness detection result can be obtained, and hence the face liveness detection can be implemented. For example, the extracted signal about the change of the image of the target object can be inputted into a pre-trained classifier, and the classifier is adopted to determine whether or not the image, which is corresponding to the extracted signal, is an image obtained in the process of capturing photos of the face of living human (for example, capturing photos of a three dimensional face), that is, the pre-trained classifier is adopted to determine whether or not the face to be verified is a face of living human (for example, the three dimensional face). For example, the classifier can be a convolution neural network, a support vector machine or other applicable classifiers. No specific limitation will be given here in the embodiment of the present disclosure. For example, the method of training the classifier can refer to the embodiment of the device for face liveness detection illustrated in FIG. 1A. No further description will be given herein.

For example, the method of machine learning can also be directly adopted to determine whether or not the face to be verified is the face of living human (for example, the three dimensional face) according to the light reflection characteristic of the face to be verified in the plurality of illumination images. For example, the video or the plurality of images acquired by, for example, the image acquisition device and the unique identifier (or the real number sequence) can be inputted into the pre-trained classifier (e.g., an RNN), and the classifier is adopted to determine whether or not the image is an image obtained in the process of capturing the face of living human (for example, the three dimensional face). Therefore, the device for face liveness detection can realize the face liveness detection and hence can improve the safety of the face liveness detection 700.

In an example of determining whether or not the face to be verified passes the face liveness detection only according to the illumination liveness detection result, if the illumination liveness detection result indicates that the face to be verified fails to pass the illumination liveness detection (for example, the face to be verified is not a three dimensional face), the face to be verified fails to pass the face liveness detection; and if the illumination liveness detection result indicates that the face to be verified passes the illumination liveness detection, the face to be verified passes the face liveness detection. In an example of determining whether or not the face to be verified passes the face liveness detection according to both of the illumination liveness detection result and the action liveness detection result, if the illumination liveness detection result indicates that the face to be verified fails to pass the illumination liveness detection or the action liveness detection result indicates that the face to be verified fails to pass the action liveness detection, the face to be verified fails to pass face liveness detection; and if the illumination liveness detection result indicates that the face to be verified passes the illumination liveness detection and the action liveness detection result also indicates that the face to be verified passes the action liveness detection, the face to be verified passes the face liveness detection.

Figure 14:
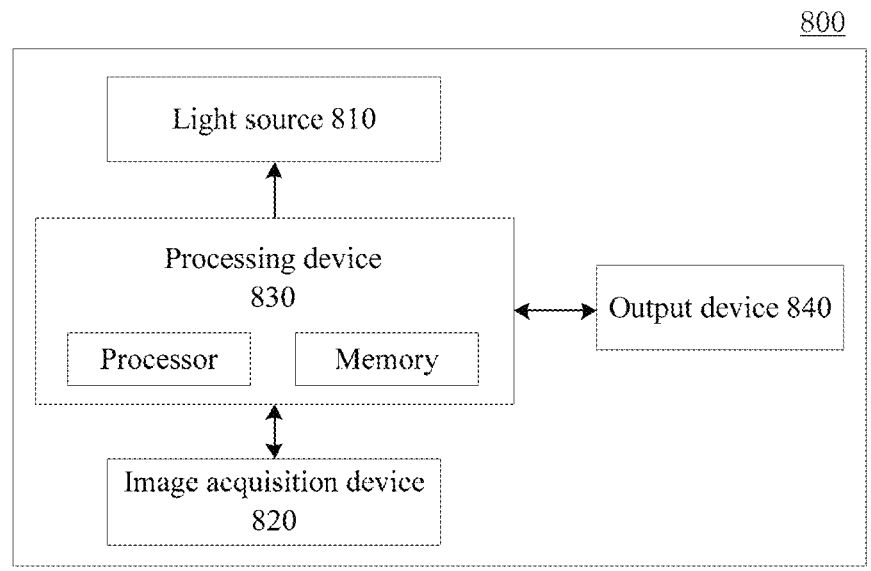
FIG. 14 is an illustrative block diagram of a device for face liveness detection provided by still another embodiment of the present disclosure.

For example, FIG. 14 is an illustrative block diagram of a device for face liveness detection 800 provided by still another embodiment of the present disclosure. For example, compared with the device for face liveness detection as illustrated in FIG. 1A, the device for face liveness detection 800 provided by the embodiment not only comprises a light source 810, an image acquisition device 820 and a processing device 830 but also comprises an output device 840, in which the light source 810, the image acquisition device 820 and the processing device 830 can be used for realizing the function of illumination liveness detection. The specific content can refer to the above-mentioned relevant content. No further description will be given herein.

For example, the image acquisition device 820, the processing device 830 and the output device 840 can also be used for realizing the function of action liveness detection. More specifically, the output device 840 can be configured to output an action instruction. For example, the action instruction is used for notifying the face to be verified to execute an action corresponding to the action instruction. The image acquisition device 820 can be further configured to acquire an action image of the face to be verified. The processing device 830 can be further configured to acquire an action detection result by detecting the action executed by the face to be verified according to the action image, and obtain an action liveness detection result according to the action detection result and the action instruction. For example, when the action detection result and the action instruction are matched with each other in sequence, it indicates that the face to be verified passes the action liveness detection. For example, the processing device 830 can be further configured to determine whether or not the face to be verified passes the face liveness detection according to both of the illumination liveness detection result and the action liveness detection result.

The specific function and the implementation of the output device, the image acquisition device and the processor for realizing the function of action liveness detection can refer to the embodiment of the method for face liveness detection described in the later portion of the present disclosure. No further description will be given herein.

In a case that whether or not the face to be verified passes the face liveness detection is determined according to the illumination liveness detection result and the action liveness detection result, the device for face liveness detection not only can effectively counteract the malicious attack by the videos and the images but also can effectively counteract mask attacks (e.g., counteract the malicious attacks of three dimensional human face mask). Therefore, the device for face liveness detection provided by the embodiment can further refine the device and the method for face liveness detection and further improve the safety of the device and method for face liveness detection.

According to specific implementation demands, the device for face liveness detection provided by other embodiments of the present disclosure (for example, the device for face liveness detections as illustrated in FIGS. 8A, 9, 10, 11, 12 and 13) can be further configured to realize the function of action liveness detection and to determine whether or not face to be verified passes the face liveness detection according to both of the illumination liveness detection result and the action liveness detection result, so as to further improve the safety of the device for face liveness detection provided by the embodiment of the present disclosure.

Figure 15:
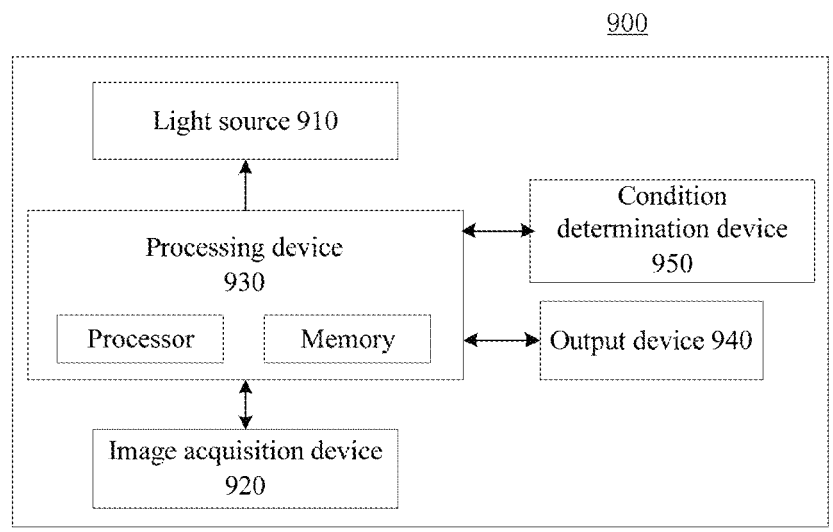
FIG. 15 is an illustrative block diagram of a device for face liveness detection provided by still another embodiment of the present disclosure.

For example, FIG. 15 is an illustrative block diagram of a device for face liveness detection 900 provided by still another embodiment of the present disclosure. As illustrated in FIG. 15, the device for face liveness detection 900 can comprise a light source 910, an image acquisition device 920, a processing device 930 and a condition determination device 950. Optionally, the device for face liveness detection 900 can further comprise an output device 940, so as to realize the function of action liveness detection together with the image acquisition device 920 and the processing device 930.

For example, the condition determination device 950 can be configured to determine whether or not a preset requirement of an image acquisition condition of the face to be verified is satisfied before the step of acquiring illumination images, in which the image acquisition condition at least comprises one or more selected from a position of the face to be verified, a pose of the face to be verified and a size of the face to be verified in a real-time image acquired by the image acquisition device. The specific implementation of the condition determination device 950 can refer to relevant description in the following embodiment of the method for face liveness detection. No further description will be given herein.

For example, images (e.g., illumination images) with better quality can be acquired by notifying the user to adjust the position and/or the orientation relative to the device for face liveness detection when the preset requirement of an image acquisition condition of the face to be verified is not satisfied. Thus, not only the number of times needed for performing the face liveness detection (e.g., the illumination liveness detection) can be reduced but also the workload of image preprocessing can be reduced, and therefore, the user experience can be improved.

Figure 16:
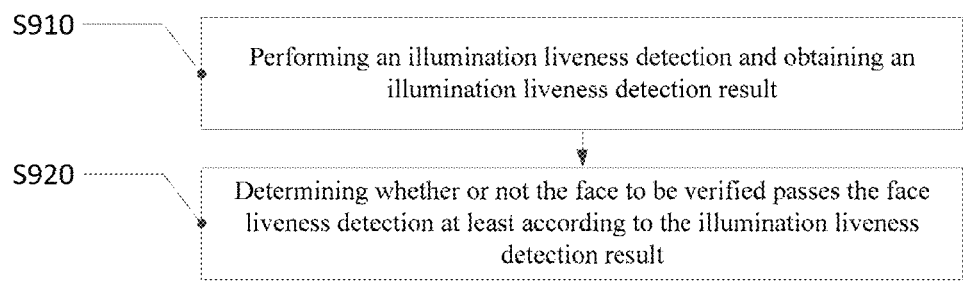
FIG. 16 is an illustrative flow diagram of a method for face liveness detection provided by still another embodiment of the present disclosure.
Figure 17:
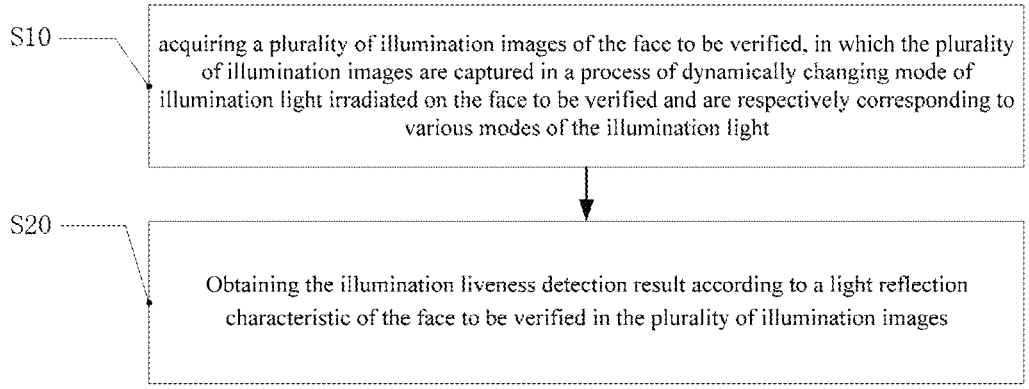
FIG. 17 is an illustrative flow diagram illustrating a method for obtaining illumination detection result in still another embodiment of the present disclosure.

FIG. 16 is a flow diagram of a method for face liveness detection provided by still another embodiment of the present disclosure. FIG. 16 corresponds to the foregoing device for face liveness detection. To avoid repetition, corresponding contents are appropriately omitted here. As illustrated in FIG. 16, the method for face liveness detection comprises the following steps.

S910: performing an illumination liveness detection and obtaining an illumination liveness detection result; and S920: determining whether or not the face to be verified passes the face liveness detection at least according to the illumination liveness detection result.

For example, performing of the illumination liveness detection and obtaining of the illumination liveness detection result can include the following step.

S10: acquiring a plurality of illumination images of the face to be verified, in which the plurality of illumination images are captured in a process of dynamically changing mode of illumination light irradiated on the face to be verified and are respectively corresponding to various modes of the illumination light; and S20: obtaining the illumination liveness detection result according to a light reflection characteristic of the face to be verified in the plurality of illumination images.

For example, acquiring of the plurality of illumination images of the face to be verified comprises: dynamically changing the mode of illumination light irradiated on the face to be verified, and acquiring a plurality of illumination images corresponding to various modes respectively.

For example, obtaining of the illumination liveness detection result according to the light reflection characteristic of the face to be verified in the plurality of illumination images comprises: analyzing the plurality of illumination images, acquiring the light reflection characteristic of the face to be verified in the plurality of illumination images, and obtaining the illumination liveness detection result according to the light reflection characteristic.

The specific content regarding the steps S910, S920, S10 and S20 can refer to the embodiment of the device for face liveness detection illustrated in FIG. 1A. No further description will be given herein.

More specifically, the step of obtaining the illumination liveness detection result according to the light reflection characteristic of the face to be verified in the plurality of illumination images comprising the following steps.

S201: extracting change information (signal) of an image of a target object, due to the change of the mode (e.g., the color and/or position) of the illumination light irradiated on the face to be verified, from acquired videos or a plurality of images of the face to be verified; and S202: obtaining the illumination liveness detection result according to the extracted information (signal).

For example, after the step S201 and before the step S202, the reliability of the signal (e.g., a correlation image or a calculation result of the correlation) extracted in the step S201 can also be calculated. The calculation and determination methods of the reliability of the extracted signal can refer to the embodiment of the device for face liveness detection illustrated in FIG. 1A. No further description will be given herein.

For example, in the step S202, whether or not the change of the image of the target object is in line with the change rule of a face of living human (for example, the change rule of a three dimensional face) can be determined according to the extracted signal (e.g., the correlation image) by means of machine learning. The specific content can refer to the embodiment of the device for face liveness detection illustrated in FIG. 1A. No further description will be given herein.

Therefore, the face liveness detection can be realized by the method for face liveness detection and hence the safety of the method for face liveness detection can be improved.

Figure 18:
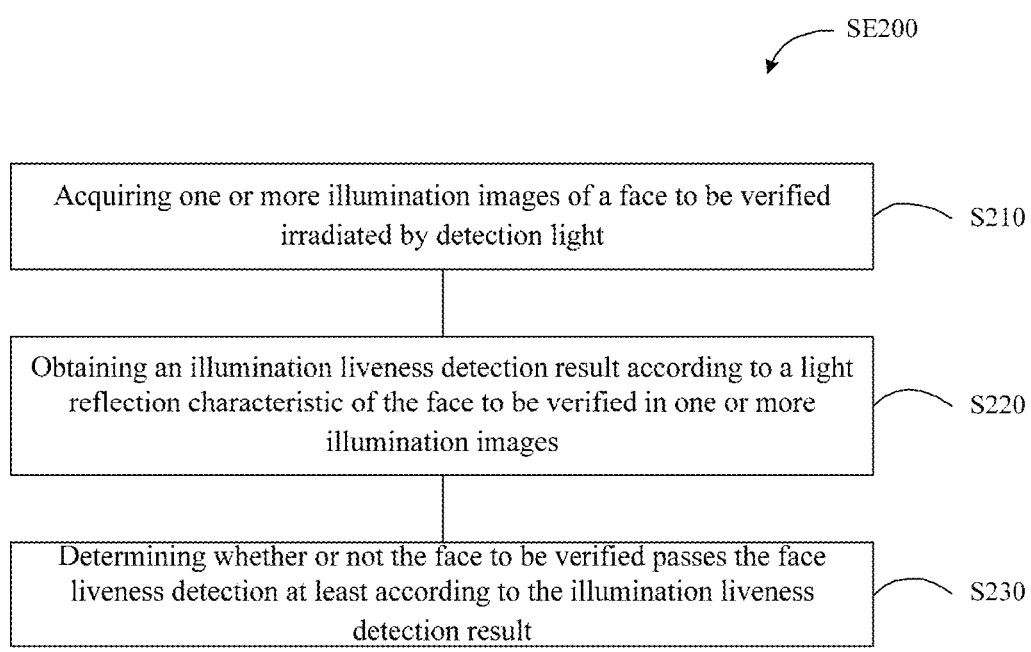
FIG. 18 is an illustrative flow diagram of a method for face liveness detection provided by still another embodiment of the present disclosure.

Description will be given below to a method for face liveness detection provided by the embodiment of the present disclosure with reference to FIG. 18. FIG. 18 is an illustrative flow diagram of a method for face liveness detection SE200 provided by the embodiment of the present disclosure. The method for face liveness detection SE200 corresponds to the foregoing embodiments of device for face liveness detection and is a specific example of the foregoing method for face liveness detection, so corresponding contents are appropriately omitted here. It should be understood that the method for face liveness detection provided by the embodiment of the present disclosure is not limited to the example illustrated in FIG. 18.

For example, as illustrated in FIG. 18, the method for face liveness detection SE200 comprises the following steps.

In step S210, acquiring one or more illumination images of a face to be verified irradiated by detection light.

For example, the face to be verified can be a face of a living human, a face of an object to be verified, a photo, a human face mask or a screen for displaying the face.

Illustratively, a light source can be adopted to emit the detection light (e.g., illumination light) toward the face to be verified. For example, the light source can be controlled by a processor to emit light. For example, other light-emitting devices can be used as the light source; for another example, the light source can also be a special purpose light source; for further another example, the light source can also be a combination of a display screen and light sources of other types (e.g., the special purpose light source). The specific content can refer to the above-mentioned relevant content; no further description will be given herein.

For example, the mode of the detection light can include but not limited to the color of the detection light, the intensity of the detection light, the illumination angle of the detection light, the wavelength of the detection light, and the frequency of the detection light. For example, in a case that at least part of the display screen is used as the light source, the mode of the detection light can also include the position of a luminous area of the display screen.

Illustratively, in the process of irradiating the face to be verified, the mode of the detection light can be unchanged, namely the light source can adopt the detection light with constant parameters (e.g., color or wavelength is unchanged during an illumination liveness detection) to irradiate the face to be verified. For example, in one embodiment, the adopted light source can be a display screen of a mobile terminal; the color, the brightness and the like of each pixel can be controlled, so the display screen can emit light with a specific pattern, e.g., structural light. In such a case, the specific color or brightness displayed in a specific pixel region of the screen can be the mode of the detection light selected by optimization based on a large number of experimental data. In a case that the face to be verified is irradiated by the detection light with constant parameters, the face liveness detection can be rapidly and accurately executed by a specific algorithm corresponding to this detection light with specific constant parameters, and an illumination liveness detection result regarding the face to be verified can be rapidly and accurately obtained. In such a case, one or more illumination images can be acquired under the irradiation of unchanged detection light, and then the illumination liveness detection result of the face liveness detection can be obtained on the basis of the illumination images.

For example, in the process of irradiating the face to be verified with the detection light, the mode of the detection light can be changed at least once. In such a case, the change frequency of the mode of the detection light and the acquisition frequency of the images can have a corresponding relationship, so that at least one illumination image can be acquired under the detection light of each mode. For example, the acquisition frequency of the images is an integer multiple of the change frequency of the mode of the detection light. For example, in a case that the change frequency of the mode of the detection light is 60 times per minute, the acquisition frequency of the images can be 60 or 120 times per minute, but the embodiment of the present application is not limited to the case.

For example, the mode of the detection light changes between every two consecutive moments. The consecutive moments can be any specific time point in a predetermined period of time. For example, the mode of the detection light can change once every one second. More information about light reflection characteristic can be obtained by rapid change of the mode of the detection light, so as to improve accuracy and efficiency of the face liveness detection according to the light reflection characteristic.

For example, in the process of irradiating the face to be verified, the mode of the detection light is randomly changed or preset.

In one example, the mode of the detection light is completely randomly changed. For example, the adopted light source is a display screen of a mobile terminal. For example, the color of each area of the display screen can be controlled; and as for each area, RGB value (i.e., color values of red, green and red color) can be randomly selected within a predetermined RGB value range at each time of changing the mode of the detection light and can be used as the color value of the area. The display screen can comprise a plurality of areas and the size of the areas can be randomly set. For example, each area can include one or more pixels, and the size of two different areas can be same or different.

In another example, the mode of the detection light can be preset. For example, the detection light can be set to irradiate the face to be verified for a total of 10 seconds; the change frequency of the mode of the detection light can be set to once per second; and the color, the position, the intensity and the like of the detection light emitted each time can be preset. During the process of the face liveness detection, the light source can sequentially emit the detection light of ten different modes according to a preset manner. The preset modes of the detection light can be comparatively effective modes for face liveness detection obtained on the basis of previous experience, so the accuracy and the efficiency of the face liveness detection can be improved.

For example, the mode of the detection light irradiated on the face to be verified can be dynamically changed by dynamically changing the color of the detection light. For another example, the mode of the detection light irradiated on the face to be verified can also be dynamically changed by dynamically changing the position of the detection light (e.g., changing the position of the luminous area of the display screen). For further another example, the mode of the detection light irradiated on the face to be verified can also be dynamically changed by simultaneously and dynamically changing the color of the detection light and the position of the detection light.

For example, the position of the detection light can be dynamically changed by changing the position of the light source, so that the region (e.g., cheek region of the face to be verified) of the face to be verified irradiated by the detection light can be changed. For another example, the region of the face to be verified irradiated by the detection light can also be dynamically changed by changing the angle of emitted light of the light source.

For example, the adopted light source can be a display screen of a mobile terminal, and the image acquisition device can be a camera (e.g., a front camera) of the mobile terminal disposed on the same side with the display screen. For example, compared with adopting an additional special purpose light source, the present embodiment can adopt the display screen and the camera of a conventional mobile terminal (such as a mobile phone) to realize the function of the light source and the image acquisition device, therefore, the face liveness detection with the above-mentioned configuration for example can better suit for application scenes such as remote account opening through a personal mobile terminal.

For example, the adopted mode of the light can comprise the color and the position of the luminous area. For example, light of colors emitted at different positions of the display screen at the same time can be different; for another example, light of the colors emitted at different positions of the display screen can be same at any time, while light of colors emitted by same one position of the display screen can be different at different times. For example, compared with changing light intensity of the light, the method of changing mode of the detection light through changing the color and the position of the luminous area not only can have better detection effect, but also can reduce the stimulation of the light on the human eyes, and hence can improve the user experience.

For example, when the face to be verified is irradiated by the detection light, the image acquisition device can be adopted to acquire images of the face to be verified irradiated by the detection light and obtain the illumination images. For example, the image acquisition device can be controlled by the processor to acquire the images. For example, the image acquisition device can send one or more acquired illumination images to a processor of the system or device for face liveness detection. Illustratively, the number of the illumination images acquired under the irradiation of the light of each mode can be one or more, and no limitation will be given here in the present disclosure. It should be understood by those skilled in the art that the face liveness detection is mainly based on the face image. Therefore, according to the embodiment of the present disclosure, in the processes of acquiring the illumination images, action images and real-time images, the objective is to acquire images including the face be verified for face liveness detection.

For example, the illumination images can be sent by a client device (e.g., a mobile terminal including a camera or a remote video teller machine (VTM)) to the device for face liveness detection and then processed by the processor of the device for face liveness detection. For another example, the illumination images can also be acquired by an image acquisition device (e.g., a camera) of the device for face liveness detection and sent to the processor of the same device for face liveness detection for relevant processing.

In step S220: determining whether or not the face to be verified passes the illumination liveness detection (for example, whether or not the face to be verified is a three dimensional face) according to a light reflection characteristic of the face to be verified in one or more illumination images, and obtaining an illumination liveness detection result.

In step S230: determining whether or not the face to be verified passes the face liveness detection at least according to the illumination liveness detection result.

In one example, the illumination liveness detection result can be directly taken as the final face liveness detection result; in such a case, the face liveness detection method can have small calculation amount and high efficiency. In another example, whether or not the face to be verified passes the face liveness detection can be determined by the illumination liveness detection result in combination with result obtained through other face liveness detection processes (namely whether or not the face to be verified passes the face liveness detection can be determined by taking the illumination liveness detection result and other face liveness detection results obtained on the basis of other face liveness detection processes into consideration), in such a case, the face liveness detection method can have high accuracy.

As described above, as the light reflection characteristic of the face of living human (e.g., the three dimensional human face) is different from the light reflection characteristic of an object such as a display screen or a photo, the real face of living human and a face displayed by the screen or the face on the photo can be effectively distinguished according to the light reflection characteristic. Therefore, the method for face liveness detection provided by the embodiment of the present disclosure can effectively counteract screen attackers or photo attackers, and hence can improve the safety and the user experience of an authentication system or similar systems employing the method for face liveness detection.

Illustratively, the method for face liveness detection provided by the embodiment of the present disclosure can be implemented by a device, an apparatus or a system comprising a memory and a processor.

The method for face liveness detection provided by the embodiment of the present disclosure can be adopted by an image acquisition end, for example, can be adopted by an image acquisition end of a financial system such as a bank management system or can be adopted by a mobile terminal such as a smart mobile phone and a tablet PC. Alternatively, the method for face liveness detection provided by the embodiment of the present disclosure can also be adopted by a server (e.g., a cloud server) and a client. For example, light is emitted by the client and images of the face to be verified are acquired by the client; the acquired images are transmitted to the server (e.g., a cloud server) by the client; the illumination liveness detection result is obtained by the server (e.g., a cloud server); and the illumination liveness detection result (or a verification result, which is obtained (for example, calculated) based on the illumination liveness detection result, regarding whether or not the face to be verified passes the face liveness detection) is received by the client. Because the server can have more powerful data processing capability than the client, when the illumination liveness detection result is obtained (for example, calculated) by the server, the verification speed (for example, face liveness detection speed) can be improved and the user experience can be improved. In addition, because the server can have higher processing speed, a more complex algorithm for face liveness detection can be adopted, and therefore, obtaining of the illumination liveness detection result (or a verification result, which is obtained based on the illumination liveness detection result, regarding whether or not the face to be verified passes the face liveness detection) by the server can improve the accuracy of face liveness detection.

For example, the attack methods adopted by the attackers can be various, although the face liveness detection on the basis of light reflection characteristics can counteract screen attack or photo attack, the method for face liveness detection on the basis of light reflection characteristic can fail to counteract some other attack methods adopting, for example, a three dimensional human face mask. Therefore, in order to further refine the method for face liveness detection and improve the safety of the method for the face liveness detection, other face liveness detection processes (e.g., action liveness detection) can be further incorporated into the method for face liveness detection on the basis of the light reflection characteristic. One illustrative embodiment will be described below.

Figure 19:
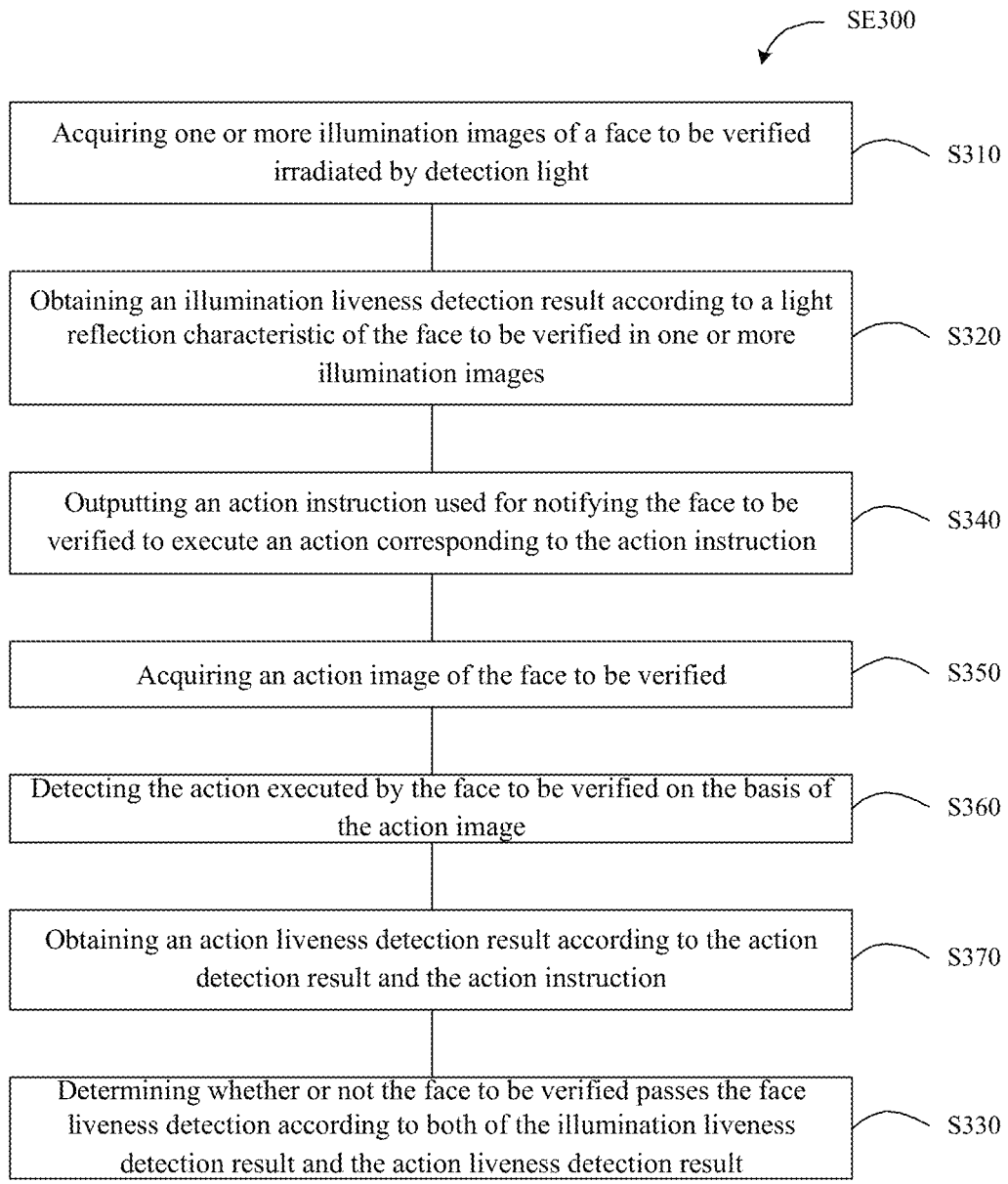
FIG. 19 is an illustrative flow diagram of another method for face liveness detection provided by still another embodiment of the present disclosure.

FIG. 19 is an illustrative flow diagram of a method for face liveness detection SE300 provided by the embodiment of the present disclosure. Steps S310, S320 and S330 of the method for face liveness detection SE300 as illustrated in FIG. 19 are similar to the steps S210-S230 of the method for face liveness detection SE200 as illustrated in FIG. 18. The steps S310, S320 and S330 as illustrated in FIG. 19 can be understood by those skilled in the art with reference to relevant description in FIG. 18. No further description will be given herein.

For example, the method for face liveness detection SE300 provided by the embodiment can further comprise the steps S340-S370, and by performing the steps S340-S370, an action liveness detection result can be obtained. For example, in the step S330, whether or not the face to be verified passes the face liveness detection is determined according to the illumination liveness detection result and the action liveness detection result.

For example, in the step S340, an action instruction used for notifying the face to be verified to execute an action corresponding to the action instruction is outputted.

Illustratively, the action instruction can be outputted by an output device. For example, the output device can be a display screen, such that the output device can output text and/or picture prompt information. For another example, the output device can also be a loudspeaker, such that the output device can output voice prompt information. Illustratively, the action instruction can be outputted randomly or according to a predetermined rule. For example, the action instruction can include one instruction or an instruction sequence formed by a series of action instructions. For example, the action instruction can prompt the face to be verified to execute one or more action selected from nod, shake the head, wink the eyes, open the mouth, etc.

For example, in the step S350: an action image of the face to be verified is acquired.

For example, the number of the acquired action image of the face to be verified can be set according to demands of specific implementations, no limitations will be given here in the embodiments of the present disclosure. For example, the number of the acquired action images can be one times the number of action instructions; for another example, the number of the acquired action image can be five times the number of action instruction. The action image can be obtained by performing image acquisition regarding the face to be verified during the action instruction is outputted or within a period of time after the action instruction is outputted. For example, the action image of the face to be verified can be acquired during the action instruction (or the action instruction sequence) is outputted (for example, after one action instruction is outputted, acquiring at least one image of the face to be verified, and subsequently, outputting the next action instruction). For another example, the action image of the face to be verified can also be acquired after all the action instructions (or the action instruction sequence) are outputted. For example, acquiring the action image of the face to be verified can comprise: recording a video including the action image (for example, including a plurality of action images). For another example, the action image can also be images or an image acquired by the image acquisition device.

For example, in the step S360: the action executed by the face to be verified is detected on the basis of the action image, so as to obtain an action detection result.

Illustratively, face detection and key point recognition can be performed for each action image, and the action executed by the face to be verified can be determined according to the face contour and/or the face key points of the action image. For example, the action executed by the face to be verified can be determined according to the change tendency of the face contour and/or the face key points of the plurality of acquired action images, such that whether or not the action executed by the face to be verified is matched with the action instruction can be determined in subsequent step (for example, step S360). For another example, the action executed by the face to be verified can also be determined by the face contour and/or the face key points of one action image.

For example, in the step S370: whether or not the face to be verified passes the action liveness detection is determined according to the action detection result and the action instruction, and an action liveness detection result is obtained.

Illustratively, if the action executed by the face to be verified in the action image is matched with the action instruction, the action liveness detection result, which indicates that the face to be verified passes the action liveness detection (namely action-based face liveness detection), is obtained; and if the action executed by the face to be verified in the action image is not matched with the action instruction or if the action liveness detection result indicates that the face to be verified does not execute any action in the action image (namely no action, executed by the face to be verified, is detected), the action liveness detection result, which indicates that the face to be verified fails to pass the action liveness detection, is obtained, and it can be further determined that the face to be verified does not belong to a living body.

It should be understood that the method to determine whether or not the action executed by the face to be verified in the action image is matched with the action instruction can be set according to specific implementations, no limitations will be given here in the embodiments of the present disclosure. For example, when the face to be verified executes a plurality of actions, and the plurality of actions executed by the face to be verified include the plurality of actions indicated by the plurality of action instructions (for example, include all of the actions indicated by the plurality of action instructions), it is determined that the action executed by the face to be verified in the action image is matched with the action instruction and the face to be verified passes the action liveness detection (i.e., it is determined that the face to be verified passes the action liveness detection in a case that the plurality of actions executed by the face to be verified include for example all of the actions indicated by the plurality of action instructions regardless of whether or not the sequence of the plurality of actions is consistent with the sequence of the plurality of actions indicated by the plurality of action instructions). For another example, when the plurality of actions executed by the face to be verified are the plurality of actions indicated by the plurality of action instructions, and the sequence of the plurality of actions executed by the face to be verified is consistent with the sequence of the plurality of actions indicated by the action instructions, it is determined that the action executed by the face to be verified in the action image is matched with the action instruction and the face to be verified passes the action liveness detection; that is to say, when the action images are matched with the action instructions in sequence, it is determined that the face to be verified passes the action liveness detection.

Illustratively, in the step S330, if the face to be verified passes the illumination liveness detection and the action liveness detection (namely both the illumination liveness detection result and the action liveness detection result indicate that the face to be verified belongs to a living body), it is determined that the face to be verified passes the face liveness detection; and if the face to be verified fails to pass the illumination liveness detection or the action liveness detection (namely if any of the illumination liveness detection result and the action liveness detection result indicates that the face to be verified does not belong to a living body), it is determined that the face to be verified fails to pass the face liveness detection. It should be understood that the above-mentioned methods are only illustrative, and there are other determination methods for determining whether or not the face to be verified passes face liveness detection.

It should be noted that the execution sequence of the action liveness detection (for example, the steps S340-S370) and the illumination liveness detection (for example, the steps S310-S320) can be set according to specific implementation demands. No specific limitation will be given here in the present disclosure. For example, the illumination liveness detection can be performed before performing the action liveness detection; for another example, the illumination liveness detection can also be performed after the action liveness detection is performed.

The method for face liveness detection based on action liveness detection can be independently implemented by an image acquisition end, for example, can be independently implemented by an image acquisition end of a financial system such as a bank management system or a mobile terminal such as a smart mobile phone and a tablet PC. Alternatively, the method for face liveness detection based on action liveness detection can also be implemented by a server (e.g., a cloud server) and a client together. For example, the action instruction can be generated by the server or the client; the action images of the face to be verified are acquired by the client; the acquired action images are then transmitted to the server (e.g., a cloud server) by the client; the action liveness detection result is obtained by the server (e.g., a cloud server); and then the action liveness detection result is received by the client from the server.

It should be noted that, in one example, the action liveness detection and the illumination liveness detection can be combined and the combined method can be a method for face liveness detection; in another example, the action liveness detection can also be an independent method for face liveness detection. No specific limitation will be given here in the embodiment of the present disclosure.

For example, the method for face liveness detection based on action liveness detection can effectively counteract the attack manners such as mask attack; For example, the method for face liveness detection, which is combined with the action liveness detection and the illumination liveness detection, can counteract various types of malicious attacks effectively, and hence the safety of the above-mentioned method for face liveness detection and relevant authentication system adopted with the method for face liveness detection can be further improved.

For example, obtaining of the action liveness detection result according to the action detection result and the action instruction comprises: determining that the face to be verified passes the action liveness detection in a case that an action, which is executed by the face to be verified and matched with the action instruction, is detected in the action image, which is acquired within a time period not greater than a preset time period of the action liveness detection, and determining that the face to be verified fails to passes the action liveness detection in a case that the action, which is executed by the face to be verified and matched with the action instruction, is not detected in the action image, which is acquired within the time period not greater than the preset time period of the action liveness detection.

For example, the action instruction (e.g., a text or voice instruction such as "Please Nod" or "Please Open Your Mouth") can be randomly outputted to prompt the face to be verified to execute the action corresponding to the action instruction (e.g., nodding or opening the mouth), and key points of a face region are detected to determine the action executed by the face to be verified, and then whether or not the action executed by the face to be verified is matched with the outputted action instruction can be determined. If the action, which is executed by the face to be verified and detected within the preset time period of the action liveness detection, is matched with the outputted action instruction, it is determined that the face to be verified passes the action liveness detection; and if the action, which is executed by the face to be verified and detected within the preset time period of the action liveness detection, is not matched with the outputted action instruction, or no action executed by the face to be verified is detected within the preset time period of the action liveness detection, it can be determined that the face to be verified fails to pass the action liveness detection. For example, the preset time period of the action liveness detection is the time for reminding the face to be verified (or user) that the action corresponding to the action instruction is required to complete within the preset time period of the action liveness detection. No matter whether or not the face to be verified completes executing the action corresponding to the action instruction within the time period of the preset time period of the action liveness detection, the action liveness detection result is recorded and the following step is subsequently executed. Illustratively, if the face to be verified does not complete executing the action corresponding to the action instruction within the preset time period of the action liveness detection, it can be determined that the face to be verified fails to pass the action liveness detection.

For example, according to the embodiment of the present disclosure, the method for face liveness detection SE300 can further comprise: increasing number of times for performing the action liveness detection by one (for example, counting once with a counter) for executing the steps S340-S370 each time (namely increasing number of times for performing the action liveness detection by one for each performance of the action liveness detection), and so as to obtain the number of times for performing the action liveness detection.

For example, after the step S370 (namely after the step of obtaining the action liveness detection result) and in a case that the action liveness detection result indicates that the face to be verified fails to pass the action liveness detection, the method SE300 can further comprise: outputting first error information used for notifying a failure of the action liveness detection; determining whether or not the number of times for performing the action liveness detection is greater than a first counting threshold; and returning to the step S330 (namely determining whether or not the face to be verified passes the face liveness detection according to both of the illumination liveness detection result and the action liveness detection result) in a case that the number of times for performing the action liveness detection is greater than a first counting threshold, and returning to the step S340 (namely executing the action liveness detection again) in a case that the number of times for performing the action liveness detection is not greater than the first counting threshold, or returning to the step S310 when the step S310 is executed before the step S340 and the number of times for performing the action liveness detection is not greater than the first counting threshold (namely performing the illumination liveness detection again when the illumination liveness detection is performed before the action liveness detection and the number of times for performing the action liveness detection is not greater than the first counting threshold).

Illustratively, a counter can be adopted and configured to count the number of times for performing the action liveness detection (for example, the steps S340-S370). The counter can increase the number of times for performing the action liveness detection by one for each performance of the action liveness detection. For example, an output result of the counter can be the number of times for performing the action liveness detection. For example, the counter can be reset after the entire method for face liveness detection (the method for face liveness detection SE300) is ended.

For example, if the current action liveness detection result indicates that the face to be verified fails to pass the action liveness detection, the first error information can be outputted. For example, the first error information can prompt the failure of the action liveness detection. For example, if the number of times for performing the action liveness detection is not greater than a first counting threshold, the first error information can also prompt the face to be verified that a new face liveness detection process will be performed. For example, the new face liveness detection process can be the action liveness detection. For another example, if the light face liveness detection (for example, the steps S310-S320) are executed before the action liveness detection, the new face liveness detection process can be the illumination face liveness detection and the action liveness detection; in such a case, the method for face liveness detection can directly returned the step S310 (namely the illumination liveness detection and the action liveness detection can be sequentially executed once more), so as to improve the accuracy of the method for face liveness detection.

For example, the first counting threshold can be any appropriate value and can be set as required. No limitation will be given here in the present disclosure. For example, the first counting threshold can be three; for another example, the first counting threshold can also be five.

For example, there can be various unexpected situations in actual face liveness detection processes, for example, the user can fail to execute the action corresponding to the action instruction in time, the acquired image can be a blurred image, or the face detection result can be not accurate enough. These unexpected situations can cause a face of a living human fails to pass the face liveness detection. Therefore, in order to balance the user experience and the safety of the method for the face liveness detection, the frequency threshold can be set to allow the user to have several chances (for example, three chances) to pass the action liveness detection. If the user fails to pass the action liveness detection in a case that the number of times for performing the action liveness detection is increased by the first counting threshold, it is can be determined that the face to be verified fails to pass the action liveness detection, and thus it is can be determined that the face to be verified does not belong to a living body.

For example, according to the embodiment of the present disclosure, before the step S210 (or S310), the method for face liveness detection SE200 (or SE300) can further comprise: S208: determining whether or not a preset requirement of an image acquisition condition of the face to be verified is satisfied, and executing the step S210 or S310 (namely performing the illumination liveness detection) if the preset requirement of the image acquisition condition is satisfied, or performing the action liveness detection if the preset requirement of the image acquisition condition is satisfied and the action liveness detection is executed before the illumination liveness detection. The image acquisition conditions include the position of the face to be verified in an image acquisition area of the image acquisition device and/or the relative angle between the face to be verified and the image acquisition device.

For example, before performing the face liveness detection based on light reflection characteristic or other face liveness detection processes, the image acquisition conditions of the face to be verified can be detected, and then whether or not the preset requirement of the image acquisition condition is satisfied can be determined. The face liveness detection based on light reflection characteristic or other face liveness detection processes can be executed when the preset requirement of the image acquisition condition is satisfied. Thus, the quality of the images (including the illumination images, the action images, etc.) for face liveness detection can be guaranteed, and the correctly detection of the face in the images can be guaranteed, so the accuracy of the method for face liveness detection can be improved.

For example, according to the embodiment of the present disclosure, before the step S208 and/or during executing the step S208 (namely in the process and/or before the step of determining whether or not the preset requirement of the image acquisition condition of the face to be verified is satisfied), the method for face liveness detection SE200 (or SE300) can further comprise: S206: outputting first prompt information, in which the first prompt information is used for notifying the face to be verified to be directly opposite to the image acquisition device and to be closer to the image acquisition device.

For example, the first prompt information can be outputted in any appropriate form. Illustratively, the step S206 can include: outputting the first prompt information in the form of one or more selected from voice, image and text. For example, text prompt information such as "Please Face the Screen" (for example, facing the screen is equivalent to that of facing the image acquisition device) can be outputted on a display screen of a mobile terminal, or the voice prompt information "Please Face the Screen" can be given out by a loudspeaker of the mobile terminal.

Illustratively, the method for face liveness detection can be implemented by an APP (i.e., software application) installed on the mobile terminal, which is used as the device for face liveness detection. For example, immediately after the APP is enabled, the first prompt information can be outputted to prompt the user to maintain an appropriate relative positional relationship with the mobile terminal, so that a camera of the mobile terminal can acquire face images (for example, ideal face images) suitable for face liveness detection. In one example, the first prompt information can be continuously or intermittently outputted before the preset requirement of the image acquisition condition is satisfied.

For example, outputting of the first prompt information can instruct the user to adjust the relative positional relationship between the device for face liveness detection and the user (for example, the face to be verified of the user) in time, and meanwhile, the interaction between the user and the device for face liveness detection can also improve the user experience.

For example, according to the embodiment of the present disclosure, the step S208 can include: acquiring a real-time image of the face to be verified; displaying a preset region (e.g., a reference region) for calibrating the image acquisition conditions and a face region in the real-time image (e.g., a reference part of the face to be verified), in real time; and determining whether or not the preset requirement of the image acquisition condition is satisfied according to the face region detected in the real-time image, in which it is determined that the preset requirement of the image acquisition condition is satisfied if the face region is in the preset region and a ratio between a size of the face region and a size of the real-time image is greater than a first preset ratio threshold (for example, a ratio threshold), and it is determined that the preset requirement of an image acquisition condition of the face to be verified is not satisfied if the face region is not in the preset region or the ratio between the size of the face region and the size of the real-time image is not greater than the first preset ratio threshold. It should be understood that the size of the face region and the size of the real-time image respectively can be an area of the face region and an area of the real-time image.

In one example, whether or not the preset requirement of the image acquisition condition of the face to be verified is satisfied can be determined according to the acquired images of the face to be verified. For example, the mobile terminal can acquire the real-time image with a camera of the mobile terminal and then can execute the face detection. The face region can be acquired by the face detection. The face region of the face to be verified can be an image block including the face to be verified. Whether or not the preset requirement of the image acquisition condition of the face to be verified is satisfied can be determined according to the position of the face region of the face to be verified in the real-time image and the ratio between the size of the face region of the face to be verified and the size of the real-time image. For example, the preset region can be defined in the real-time image. For example, the position of the face to be verified in the image acquisition area of the image acquisition device can be limited through the preset region. For example, the size of the face region of the face to be verified can reflect the distance and the relative angle between the face to be verified and the image acquisition device. For example, both the preset region and the first preset ratio threshold (for example, a ratio threshold) can be set as required. No limitation will be given here in the present disclosure.

For example, if the face region of the face to be verified is disposed in the preset region but the ratio between the size of the face region of the face to be verified and the size of the real-time image is less than the first preset ratio threshold (e.g., two-thirds), the face to be verified can be too oblique relative to the image acquisition device and/or too far away from the image acquisition device; in such a case, it can be determined that the preset requirement of an image acquisition condition of the face to be verified is not satisfied.

Illustratively, the method for face liveness detection SE200 (or SE300) can further comprise: outputting first acquisition prompt information to prompt the face to be verified to be closer to the image acquisition device if the ratio of the size of the face region of the face to be verified to the size of the real-time image is not greater than the first preset ratio threshold.

Optionally, the first acquisition prompt information can be outputted in the form of one or more selected from voice, image and text. For example, if the ratio of the size of the face region of the face to be verified to the size of the real-time image is found to be not greater than the first preset ratio threshold, first acquisition prompt information such as "Please be Closer to the Camera" (or "Please be Closer to the Mobile Phone") can be displayed on the display screen.

According to the embodiment of the present disclosure, the step S208 can include: acquiring real-time images of the face to be verified; outputting a preset region for calibrating the image acquisition conditions and a face region in the real-time image, in real time; and determining whether or not the preset requirement of the image acquisition condition is satisfied according to the face region detected in the real-time image, in which it is determined that the preset requirement of the image acquisition condition is satisfied if the face region is disposed in the preset region and a ratio between a size of the face region and a size of the preset region is greater than a second preset ratio threshold, and in which it is determined that the preset requirement of an image acquisition condition of the face to be verified is not satisfied if the face region is not disposed in the preset region or the ratio between the size of the face region and the size of the preset region is greater than a second preset ratio threshold is not greater than the second preset ratio threshold. It should be understood that the size of the preset region can be an area of the preset region.

In one example, whether or not the preset requirement of the image acquisition condition of the face to be verified is satisfied can be determined according to the acquired images of the face to be verified. For example, the mobile terminal can acquire the real-time images with a camera of the mobile terminal and then can execute face detection. The face region of the face to be verified can be acquired by the face detection. The face region of the face to be verified can be an image block including the face to be verified. Whether or not the preset requirement of the image acquisition condition of the face to be verified is satisfied can be determined according to the position of the face region of the face to be verified in the real-time image and the ratio between the size of the face region and the size of the preset region.

For example, the preset region can be displayed on the display screen. The relative position between the face to be verified and the screen can be limited through the preset region. The size of the face region can reflect the distance and the relative angle between the face to be verified and the image acquisition device. For example, when a distance between the face to be verified and the screen is decreased, the size of the face region displayed on the screen can be increased, and therefore the size of the face region displayed on the screen can be increased to a certain value that allowing the preset conditions to be satisfied when the face to be verified is close enough to the screen. Of course, the size of the face region displayed on the screen in real time can also be adjusted to satisfy the preset conditions only when the face is close enough to the screen. No limitation will be given herein. Both the preset region and the second preset ratio threshold can be set as required, and no limitation will be given here in the present disclosure.

For example, if the face region of the face to be verified is disposed in the preset region but the ratio between the size of the face region and the size of the preset region is less than the second preset ratio threshold (e.g., two-thirds), the face to be verified can be too oblique relative to the image acquisition device and/or too far away from the image acquisition device. In such a case, it can be determined that the preset requirement of an image acquisition condition of the face to be verified is not satisfied.

Illustratively, the method for face liveness detection SE200 (or SE300) can further comprise: outputting second acquisition prompt information to prompt the face to be verified to be closer to the image acquisition device if the ratio between the size of the face region and the size of the preset region is not greater than the second preset ratio threshold.

Optionally, the second acquisition prompt information can be outputted in the form of one or more selected from voice, image and text. For example, if the ratio between the size of the face region and the size of the preset region is found to be not greater than the second preset ratio threshold, prompt information such as "Please be Closer to the Camera" (or "Please be Closer to the Mobile Phone") can be displayed on the display screen.

For example, according to the embodiment of the present disclosure, the method SE200 (or SE300) can further comprise: determining the relative positional relationship between the face region and the preset region in real time; and outputting third acquisition prompt information according to the relative positional relationship between the face region and the preset region, so as to notify the change of the relative positional relationship between the face to be verified and the image acquisition device, so as to allow the face to be verified to be closer to the preset region.

For example, when the method and device for face liveness detection provided by the embodiment of the present disclosure are implemented by the mobile terminal, the face region (for example, an image block including the face extracted from the real-time image) and an icon (namely the preset region displayed on the screen in real time) for indicating the preset region can be displayed on the display screen of the mobile terminal in real time. The real-time display of the face region and the icon for indicating the preset region can provide convenience for the user to know current image acquisition condition and the difference between the current image acquisition condition and the preset requirements, so that the user can adjust its pose or the image acquisition device (or the device for face liveness detection comprising the image acquisition device) so as to enter the subsequent face liveness detection processes as soon as possible. Therefore, displaying the face region and the icon for indicating the preset region in real-time can improve the user experience and improve the efficiency of the face liveness detection.

In addition, third acquisition prompt information can also be outputted to prompt the user to change the relative positional relationship between the face to be verified and the image acquisition device, so that the face region can be closer to the preset region. Optionally, the third acquisition prompt information can be outputted in the form of one or more selected from voice, image and text. For example, if the face region is found to be not disposed in the preset region, prompt information such as "Please be Closer to the Center of the Circle" (for example, a circle icon on the display screen can be used as the preset region) can be displayed on the display screen. In addition, an arrow pointing from the face region to the preset region can also be displayed on the display screen, so that the user can know how to move the user or the image acquisition device to allow the face region to fall within the preset region as soon as possible. For example, the adjustment prompt information such as "Please be Closer to the Center of the Circle" and the image prompt information such as the arrow can be simultaneously displayed; for another example, one of the adjustment prompt information such as "Please be Closer to the Center of the Circle" and the image prompt information such as the arrow can be displayed.

For example, according to the embodiment of the present disclosure, the step S208 (namely determining whether or not the preset requirement of the image acquisition condition of the face to be verified is satisfied) can further include: acquiring posture information (i.e., attitude information) of the image acquisition device; and determining whether or not the image acquisition device is vertically placed according to the posture information, and determining that the preset requirement of the image acquisition condition of the face to be verified is not satisfied if the image acquisition device is not vertically placed. For example, in a case that the image acquisition device is vertically placed and other preset requirement of the image acquisition condition of the face to be verified is also satisfied, it can be determined that the preset requirement of the image acquisition condition is satisfied. It should be understood that the term that vertically placed can indicate that the attitude of the image acquisition device is in a range of an optimum state or the attitude of the image acquisition device is the most frequently adopted attitude by the user.

For example, when the method for face liveness detection provided by the embodiment of the present disclosure is implemented by the mobile phone, the posture information of the image acquisition device (namely the camera of the mobile terminal) can be measured by a gyroscope sensor and/or an acceleration sensor mounted in the mobile terminal. When the mobile terminal is vertically placed, the image acquisition device is also vertically placed. In such a case, ideal face images (i.e., face images suitable for face liveness detection) can be acquired. Thus, the attitude of the image acquisition device can be adopted as one of the image acquisition conditions, and used for determining whether or not the preset requirement of the image acquisition condition of the face to be verified is satisfied.

For example, according to the embodiment of the present disclosure, the method for face liveness detection SE200 (or SE300) can further comprise: increasing number of times for performing the illumination liveness detection by one in the process of executing the steps S210-S220 (or the steps S310-S320) each time (namely increasing number of times for performing the illumination liveness detection by one), so as to obtain the number of times for performing the illumination liveness detection; and after the step S220 (or S320) (namely after the illumination liveness detection result is obtained) and in a case that the illumination liveness detection result indicates that the face to be verified fails to pass the illumination liveness detection, the method for face liveness detection SE200 (or SE300) can further comprise: outputting second error information used for notifying a failure of the illumination liveness detection, determining whether or not the number of times for performing the illumination liveness detection is greater than a second counting threshold, and returning to the step S230 or S330 (namely determining whether or not the face to be verified passes the face liveness detection at least according to the illumination liveness detection result) if the number of times for performing the illumination liveness detection is greater than the second counting threshold, and returning to the step S208 (namely determining whether or not the preset requirement of the image acquisition condition of the face to be verified is satisfied again) or returning to the step S210 or S310 (namely executing the illumination liveness detection again) if the number of times for performing the illumination liveness detection is not greater than the second counting threshold. For example, if the number of times for performing the illumination liveness detection is not greater than the second counting threshold and the action liveness detection is executed before the illumination liveness detection, the action liveness detection can also be executed again. The second error information is used for notifying the failure of the illumination liveness detection of the face to be verified.

For example, as similar to the action liveness detection, for the illumination face liveness detection (for example, the steps S210-S220 as illustrated in FIG. 18 or the steps S310-S320 as illustrated in FIG. 19), if the face to be verified fails to pass the illumination liveness detection, the illumination liveness detection can also be executed again. The principle and the advantages of re-executed the illumination liveness detection are similar to those of re-executing the action liveness detection. No further description will be given herein.

Illustratively, when the method for face liveness detection comprises the above-mentioned step S208, the process can be executed again beginning from the step S208 (that is, the step of determining whether or not the preset requirement of the image acquisition condition of the face to be verified is satisfied and the subsequent steps can be executed again).

For example, according to the embodiment of the present disclosure, before the step S210 (or S310) and/or in the process of executing the step S210 (or S310), the method for face liveness detection SE200 (or SE300) can further comprise: outputting second prompt information (that is, outputting second prompt information during and/or before acquiring the illumination images), in which the second prompt information used for notifying the face to be verified to keep still within a preset time period of the illumination liveness detection. For example, in the process of executing the step S220 (or S320), the second prompt information can also be outputted. For example, the second prompt information can be outputted during the entire time period of performing the illumination liveness detection.

For example, the preset time period of the illumination liveness detection can be the execution time of the illumination liveness detection (for example, the steps S210-S220 as illustrated in FIG. 18 or the steps S310-S320 as illustrated in FIG. 19). For another example, the preset time period of the illumination liveness detection can also be the execution time of the step S210 or S310 (i.e., time needed for acquiring the illumination images of the face to be verified irradiated by the detection light). For example, in the process of executing the illumination liveness detection (for example, in the process of adopting the detection light to irradiate the face to be verified and acquiring the illumination images of the face to be verified), the face to be verified can be prompted to keep still within this time period, so as to avoid the adversely impact on the illumination images and the face liveness detection result.

Illustratively, in a case that the face to be verified moves during acquiring the illumination images and a moving distance is beyond an allowable range, the above-mentioned movement can result in that the preset requirement of the image acquisition condition of the face to be verified is not satisfied anymore, in such a case, the method for face liveness detection can return to the step S206 or the step S208, namely one or more of the following steps can be executed again: determining whether or not the preset requirement of the image acquisition condition of the face to be verified is satisfied, outputting the first prompt information, outputting various kinds of acquisition prompt information, etc.

Illustratively, the second prompt information can comprise count-down information corresponding to the preset time period of the illumination liveness detection. Optionally, the count-down information can be implemented in the form of one or more selected from text, dynamical image and voice. The count-down information can keep the user informed of the progress of the illumination liveness detection and can improve the interactive experience of the user.

For example, description will be given below to a concrete implementation of the method for face liveness detection provided by the embodiment of the present disclosure with reference to FIG. 20. The application scene as illustrated in FIG. 20 is a scene for mobile terminal, but the method for face liveness detection provided by the present disclosure is not limited to be applied to the mobile terminal.

Figure 20:
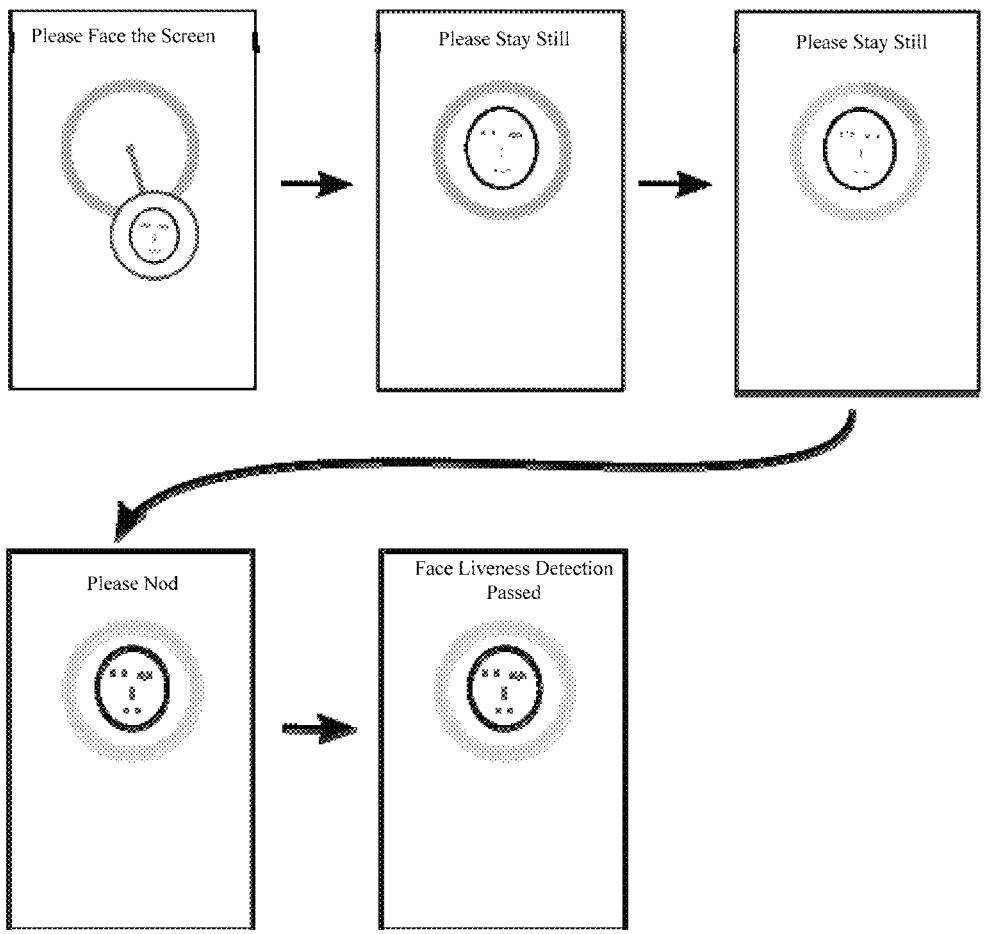
FIG. 20 is an illustrative schematic diagram of a method for face liveness detection provided by still another embodiment.

For example, as illustrated in FIG. 20, firstly, the text prompt information such as "Please Face the Screen" can be displayed on the display screen of the mobile terminal to prompt the user to allow the face to be verified directly opposite to the screen, and the icon for indicating the preset region (represented by a circle) and the face region detected on the basis of the real-time image are simultaneously displayed on the display screen. The text such as "Please Face the Screen" and the icon for indicating the preset region can be continuously displayed for at least one of the following cases, that is, the user changes the position and/or pose of the face of the user, and the user changes the position and/or attitude of the mobile terminal. For example, the text such as "Please Face the Screen" and the icon for indicating the preset region can be kept unchanged. For example, both the size and the position of the face region of the face to be verified can be changed. For example, the continuously changed face region can be displayed in real time, which is in favor of viewing the face region for the user. Secondly, when the preset requirement of the image acquisition condition is satisfied, the subsequent stages or steps (for example, the illumination liveness detection), can be performed.

In the process of illumination liveness detection, the text such as "Please Stay Still" can be displayed on the display screen (as shown by the $2^{nd}$ and $3^{rd}$ images in FIG. 20) to prompt the user to stay still, and count-down information can also be simultaneously displayed on the display screen. For example, the count-down information can be represented in the $3^{rd}$ image as illustrated in FIG. 20 by a circular progress bar (for example, a colored progress bar) marked on the edge of the icon (namely a circle) for indicating the preset region.

After the illumination liveness detection is completed, the action liveness detection can be performed. As shown by the $4^{th}$ image in FIG. 20, the text such as "Please Nod" is displayed on the display screen to prompt the user to execute the action corresponding to the action instruction such as "Please Nod".

Finally, the final face liveness detection result (for example, the text such as "Face Liveness Detection Passed") is outputted on the display screen.

Figure 21:
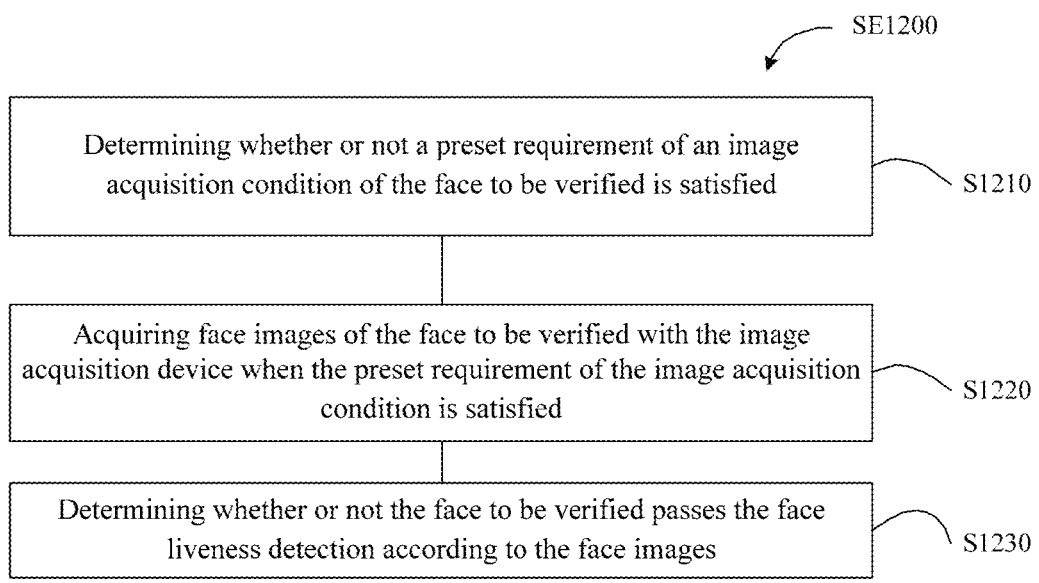
FIG. 21 is an illustrative flow diagram of a method for face liveness detection provided by still another embodiment.

Description will be given below to the method for face liveness detection provided by the embodiment of the present disclosure with reference to FIG. 21. FIG. 21 is an illustrative flow diagram of a method for face liveness detection SE1200 provided by the embodiment of the present disclosure. As illustrated in FIG. 21, the method for face liveness detection SE1200 comprises the following steps.

S1210: determining whether or not a preset requirement of an image acquisition condition of the face to be verified is satisfied.

For example, the image acquisition condition at least comprises one or more selected from a position of the face to be verified, a pose of the face to be verified and a size of the face to be verified in a real-time image acquired by an image acquisition device, but the embodiment of the present disclosure is not limited thereto.

For example, the face to be verified can be a true face of a living human being; for example, the face to be verified can also be the counterfeited face such as a face on a photo, a face displayed by a screen or a human face mask.

Illustratively, the real-time image of the face to be verified can be acquired, and the position of the face to be verified in the real-time image can be determined. When it is determined that the position of the face to be verified to be at an appropriate position suitable for the face liveness detection (for example, at a position near a center of the real-time image), the subsequently face liveness detection processes can be performed (for example, step S1220) and the images acquired in the subsequently face liveness detection processes can be used as face images described in this disclosure for obtaining the face liveness detection result (for example, obtaining the illumination detection result).

For example, the position of the face to be verified in the image acquired by the image acquisition device can refer to the coordinate of a center point (e.g., a point indicating the tip of the nose) of the face to be verified in the entire face image, but the embodiment of the present disclosure is not limited thereto.

Illustratively, the image acquisition conditions of the face to be verified can further include a pose of the face to be verified and/or size of the face to be verified in the image acquired by the image acquisition device. For example, the pose of the face to be verified can be obtained (for example, estimated) according to various conventional or future face pose estimation algorithms. For example, the pose of the face can be represented by three kinds of angles of the face in a three-dimensional space, and the three kinds of angles are pitch, yaw and roll which respectively represent the angle of longitudinal flip (for example, an rotation angle around X-axis of a Cartesian coordinate system), horizontal flip (for example, an rotation angle around Y-axis of a Cartesian coordinate system) and rotation in a plane (for example, an rotation angle around Z-axis of a Cartesian coordinate system). For example, in a case that the pitch, yaw and roll of the face to be verified are within predetermined angle threshold, it can be determined that the preset requirement of the image acquisition condition of the pose of the face to be verified is satisfied.

It should be understood that the size of the face to be verified in the real-time image acquired by the image acquisition device is relevant to the distance between the face to be verified and the image acquisition device. For example, when the face to be verified is farther from the image acquisition device, the size of the face to be verified in the real-time image is smaller.

S1220: acquiring face images of the face to be verified with the image acquisition device when the preset requirement of the image acquisition condition is satisfied.

S1230: determining whether or not the face to be verified passes the face liveness detection according to the face images.

According to methods adopted by different face liveness detections, the different types of face images can be acquired. For distinction, the image of the face to be verified acquired during the illumination liveness detection can be referred to as the illumination image, and the image of the face to be verified acquired during the action liveness detection can be referred to as the action image. For example, in the following embodiment of the illumination liveness detection, the illumination images of the face to be verified under the irradiation of detection light (or illumination light) can be acquired; and in the embodiment of the action liveness detection, the action images of the face to be verified can be acquired. The methods for acquiring the face images and the methods for face liveness detections on the basis of the face images can refer to the following description.

For example, before the step of acquiring the face images for determining whether or not the face to be verified is a living body, the image acquisition conditions (for example, the position of the face to be verified, the pose of the face to be verified and the size of the face to be verified in the image) can be adjusted to satisfy the preset requirements, for example, allowing the position of the face to be verified to be closer to the center of the image as much as possible, allowing the pose of the face to be verified to be upright as much as possible, and allowing the size of the face to be verified to be not too large or too small (namely allowing the face to be verified to be not too close or too far away from the image acquisition device). In such a case, face images with good quality can be acquired, so the accuracy of the face liveness detection result can be guaranteed.

Illustratively, the method for face liveness detection provided by the embodiment of the present disclosure can be implemented by a device, an apparatus or a system comprising a memory and a processor.

For example, the method for face liveness detection provided by the embodiment of the present disclosure can be adopted by an image acquisition end, for example, can be adopted by an image acquisition end of a financial system such as a bank management system or can be adopted by a mobile terminal such as a smart mobile phone and a tablet PC. Alternatively, the method for face liveness detection provided by the embodiment of the present disclosure can also be adopted by a server (e.g., a cloud server) and a client. For example, images of the face to be verified are acquired by the client; the acquired images are transmitted to the server (e.g., a cloud server) by the client; the face liveness detection result is obtained by the server (e.g., a cloud server); and the face liveness detection result is received by the client from the server. Because the server can have more powerful data processing capability than the client, when the face liveness detection result is obtained by the server, the face liveness detection speed can be improved and the user experience can be improved. In addition, because the server can have higher processing speed, a more complex algorithm for face liveness detection can be adopted, and therefore, obtaining of the face liveness detection result by the server can improve the accuracy of face liveness detection.

Figure 22:
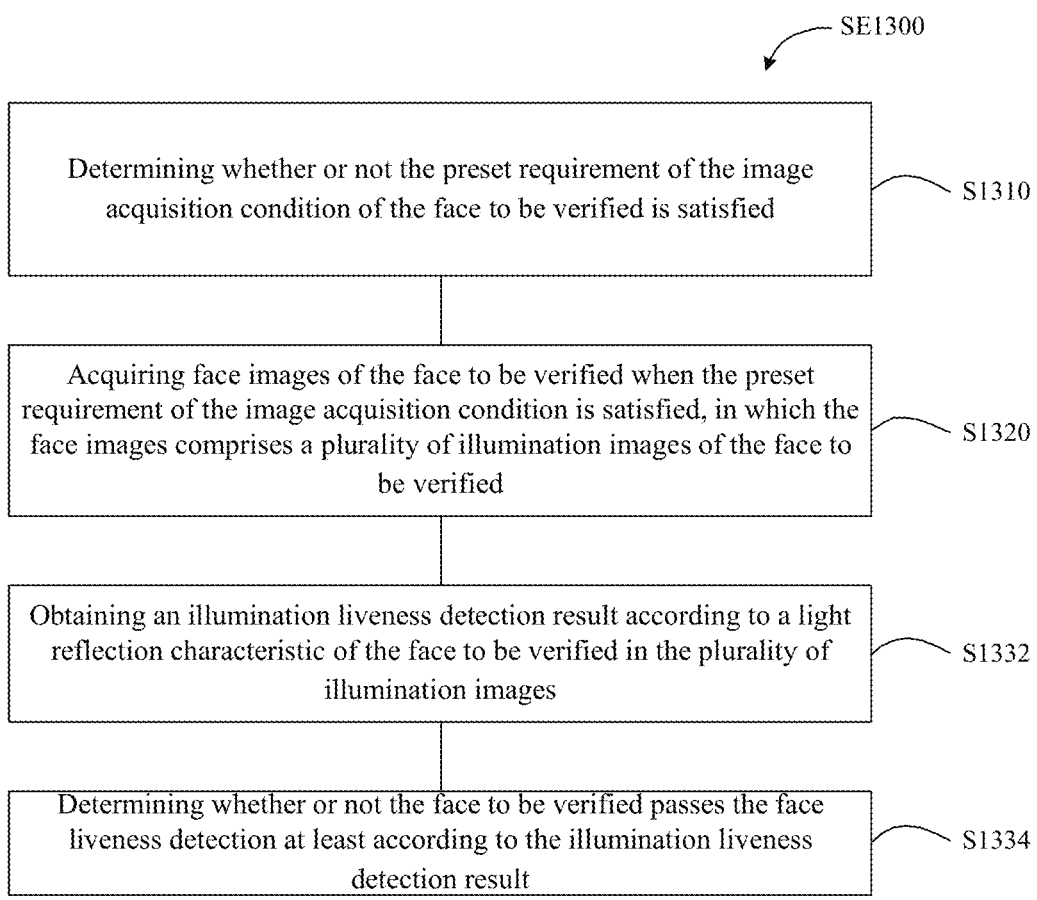
FIG. 22 is an illustrative flow diagram of another method for face liveness detection provided by still another embodiment.

FIG. 22 is an illustrative flow diagram of a method for face liveness detection SE1300 provided by further another embodiment of the present disclosure. The steps S1310 and S1320 of the method for face liveness detection SE1300 as illustrated in FIG. 22 are respectively correspondingly to the steps S1210 and S1220 of the method for face liveness detection SE1200 as illustrated in FIG. 21. The steps S1310 and S1320 as illustrated in FIG. 22 can be understood by those skilled in the art with reference to relevant description in FIG. 21. No further description will be given herein. According to the embodiment, the step S1230 of the method for face liveness detection SE1200 can further include the steps S1332 and S1334 as illustrated in FIG. 22. Detailed description will be given below.

Illustratively, face images acquired during the step S1320 can include one or more illumination images, which is acquired by an image acquisition device, of the face to be verified under the irradiation of detection light (namely illumination light). For example, the step S1230 of the method for face liveness detection SE1200 can corresponding to the steps S1332 and S1334 of the method for face liveness detection SE1300. The step S1332 comprising: obtaining an illumination liveness detection result according to a light reflection characteristic of the face to be verified in one or more illumination images, so as to determine whether or not the face to be verified belongs to a living body. The step S1334 comprising: determining whether or not the face to be verified passes the face liveness detection at least according to the illumination liveness detection result. For example, in the step S1332, a plurality of illumination images can be analyzed to obtain the light reflection characteristic of the face to be verified in the plurality of illumination images, and hence the illumination liveness detection result can be obtained.

Illustratively, a light source can be adopted to emit the detection light toward the face to be verified, and the light source can be controlled by a processor to emit the detection light. For example, the specific implementation of the light source can refer to the foregoing embodiment of the device for face liveness detection, and the embodiment of the method for face liveness detection as illustrated in FIG. 18. No further description will be given herein.

For example, the specific implementation of the steps S1332 and S1334 can respectively refer to the steps S220 and S230 of the method for face liveness detection as illustrated in FIG. 18. No further description will be given herein.

As described above, as the light reflection characteristic of the face of living human (e.g., the three dimensional human face) is different from the light reflection characteristic of an object such as a display screen or a photo, a true face of living human and a face displayed by the screen or a face on the photo can be effectively distinguished according to the light reflection characteristic. Therefore, the method and device for face liveness detection for determining whether or not the face to be verified belongs to a living body according to the light reflection characteristic of the face to be verified under the detection light can effectively counteract screen attackers or photo attackers, and hence can improve the safety and the user experience of an authentication system or similar systems employing the method and device for face liveness detection.

For example, according to the embodiment of the present disclosure, the step S1320 can include: if the image acquisition conditions of the face to be verified in the current image (for example, the image used for determining whether or not the preset requirement of the image acquisition condition of the face to be verified is satisfied) satisfy the preset requirements, outputting a detection light control instruction for controlling the light source to emit the detection light toward the face to be verified, and acquiring one or more illumination images.

For example, when the preset requirement of the image acquisition condition is satisfied, a processor (e.g., a processor of a mobile terminal) can control the light source (e.g., a display screen of the mobile terminal) to emit the detection light, and the processor can also control the light source to change mode of the detection light. The mode of the detection light has been described above, so no further description will be given herein.

According to the embodiment of the present disclosure, the step S1320 can further include: returning to the step S1310 (namely determining whether or not the preset requirement of the image acquisition condition of the face to be verified is satisfied) if the face to be verified moves during acquiring one or more illumination images (for example, during acquiring one or more illumination images with an image acquisition device) and a moving distance is beyond an allowable range (for example, a preset distance threshold).

For example, in the process of acquiring the illumination images, the position of the face to be verified, the pose of the face to be verified and the size of the face to be verified in a real-time image can be continuously monitored. For example, if the face to be verified moves to the left and the moving distance is beyond the preset distance threshold, the step S1310 is returned to determine the image acquisition conditions again so as to acquire new illumination images. For example, the step S1310 and the step of acquiring the illumination images can be repeated until the sufficient number of illumination images, which is acquired under a condition that the preset requirement of the image acquisition condition is satisfied, are acquired; in such a case, the quality of the illumination images for face liveness detection can be ensured, and the image acquisition conditions such as the position of the face to be verified, the pose of the face to be verified and the size of the face to be verified in a real-time image can be sufficiently stable, so that the accuracy of the face liveness detection result can be sufficiently high.

For example, the attack methods adopted by the attackers can be various, although the face liveness detection on the basis of light reflection characteristic can counteract screen attack or photo attack, the method for the face liveness detection on the basis of light reflection characteristic can fail to counteract some other attack methods adopting, for example, a three dimensional human face mask. Therefore, in order to further refine the method for face liveness detection and improve the safety of the method for the face liveness detection, other face liveness detection processes (e.g., action liveness detection) can be further incorporated into the method for face liveness detection on the basis of the light reflection characteristic. One illustrative embodiment will be described below.

Figure 23:
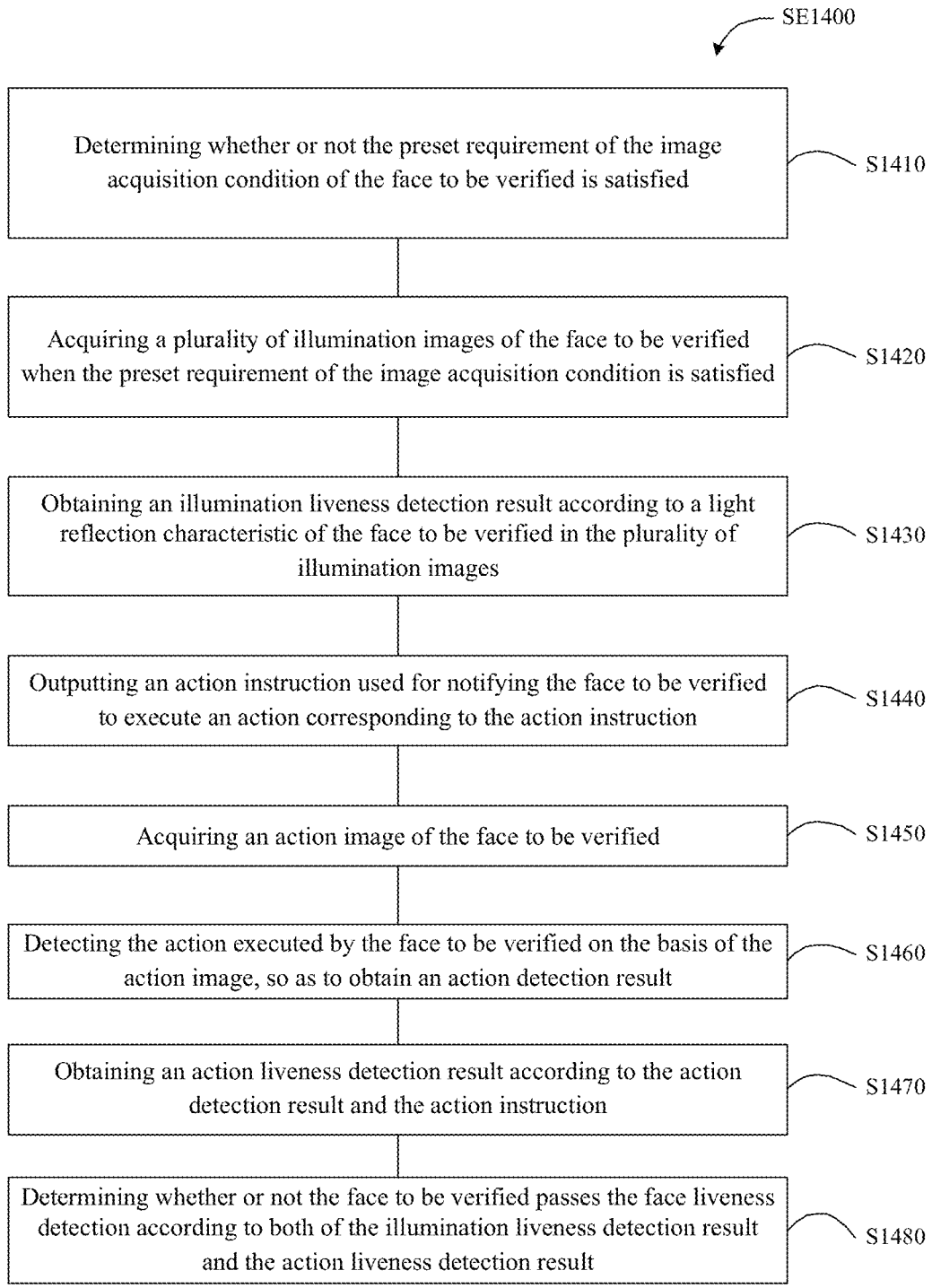
FIG. 23 is an illustrative flow diagram of further another method for face liveness detection provided by still another embodiment.

FIG. 23 is an illustrative flow diagram of a method for face liveness detection SE1400 provided by further another embodiment of the present disclosure. The steps S1410 and S1430 of the method for face liveness detection SE1400 as illustrated in FIG. 23 correspond to the steps S1310 and S1332 of the method for face liveness detection SE1300 as illustrated in FIG. 22. The steps S1410 and S1430 as illustrated in FIG. 23 can be understood by those skilled in the art with reference to relevant description in FIG. 22. No further description will be given herein. According to the embodiment, when image acquisition conditions of the face to be verified satisfy preset requirements, obtaining face images of the face to be verified acquired by an image acquisition device, in which obtaining of face images of the face to be verified can include the steps S1420 and S1450 as illustrated in FIG. 23, namely acquiring a plurality of illumination images of the face to be verified and acquiring an action image of the face to be verified when the preset requirement of the image acquisition condition is satisfied. For example, the step S1334 of the method for face liveness detection SE1300 as illustrated in FIG. 22 corresponds to the step S1480 in the embodiment. In addition, before performing the step S1480, the method for face liveness detection SE1400 can further comprise the steps S1440, S1450, S1460 and S1470.

For example, the illumination images and the action images of the face to be verified can be respectively acquired in the steps S1420 and S1450. The acquisition method of the illumination images of the face to be verified can refer to the above-mentioned description, and no further description will be given here. The following mainly describes the action liveness detection (namely the steps S1440-S1470).

For example, an action instruction can be outputted in the step S1440, in which the action instruction is used for used for notifying the face to be verified to execute an action corresponding to the action instruction.

For example, the action image of the face to be verified acquired by the image acquisition device can be acquired in the step S1450. For example, the face images can further include the action image.

S1460: detecting the action executed by the face to be verified according to the action images, so as to obtain an action detection result.

S1470: obtaining an action liveness detection result according to the action detection result and the action instruction.

S1480: determining whether or not the face to be verified passes the face liveness detection according to both of the illumination liveness detection result and the action liveness detection result.

Illustratively, if the face to be verified passes both the illumination liveness detection and the action liveness detection (namely both the illumination liveness detection result and the action liveness detection result indicate that the face to be verified belongs to a living body), it is determined that the face to be verified passes the face liveness detection; and if the face to be verified fails to pass the illumination liveness detection or the action liveness detection (namely if any of the illumination liveness detection result and the action liveness detection result indicates that the face to be verified does not belong to a living body), it is determined that the face to be verified fails to pass face liveness detection. It should be understood that the above-mentioned methods are only illustrative, and there are other determination methods for determining whether or not the face to be verified passes face liveness detection.

It should be noted that that the execution sequence of the action liveness detection (for example, the steps S1440-S1470) and the illumination liveness detection (for example, the steps S1420-S1430) can be set according to specific implementation demands. No specific limitation will be given here in the present disclosure.

For example, the executing sequence of the method for face liveness detection SE1400 can be S1410, S1420, S1430, S1440, S1450, S1460, S1470 and S1480 (in such a case, the illumination liveness detection can be performed before performing the action liveness detection), but the embodiment is not limited to the case; for another example, the executing sequence of the method for face liveness detection SE1400 can also be S1440, S1450, S1460, S1470, S1410, S1420, S1430 and S1480 (in such a case, the illumination liveness detection can be performed after the action liveness detection is performed); for further another example, the executing sequence of the method for face liveness detection SE1400 can also be S1410, S1440, S1450, S1460, S1470, S1410, S1420, S1430 and S1480; for still another example, the executing sequence of the method for face liveness detection SE1400 can also be S1410, S1440, S1450, S1460, S1470, S1420, S1430 and S1480.

It should be understood that he method for face liveness detection SE1400 can comprise steps (for example, outputting second prompt information) other than the steps S1410-S1480, the concrete content can refer to the embodiments of the present disclosure, no further description will be given herein.

For example, the method for face liveness detection based on action liveness detection can be independently implemented by an image acquisition end, for example, can be independently implemented by an image acquisition end of a financial system such as a bank management system or a mobile terminal such as a smart mobile phone and a tablet PC. Alternatively, the method for face liveness detection based on action liveness detection can also be implemented by a server (e.g., a cloud server) and a client together. For example, the action instruction can be generated by the server or the client; the action images of the face to be verified can be acquired by the client; the acquired action images can be transmitted to the server (e.g., a cloud server) by the client; the action liveness detection result can be obtained by the server (e.g., a cloud server); and then the action liveness detection result can be received by the client.

For example, the final face liveness detection result can be outputted after both the illumination liveness detection and the action liveness detection are completed; in such a case, attackers are unable to determine the liveness detection method preventing the attack from succeeding (for example, the method preventing the attack from succeeding can be the illumination liveness detection and/or the action liveness detection), so the safety of the method for face liveness detection can be further improved. The face liveness detection based on the action liveness detection processes and the illumination liveness detection can counteract various attack methods (such as mask attack), such that the safety of the method and the device (or system) for face liveness detection and relevant authentication system incorporated with the device (or system) for face liveness detection can be further improved.

For example, according to the embodiment of the present disclosure, the step S1470 (namely obtaining the action liveness detection result according to the action detection result and the action instruction) can include: determining that the face to be verified passes the action liveness detection in a case that an action, which is executed by the face to be verified and matched with the action instruction, is detected in the action image, which is acquired within a time period not greater than a preset time period of the action liveness detection, and determining that the face to be verified fails to passes the action liveness detection in a case that the action, which is executed by the face to be verified and matched with the action instruction, is not detected in the action image, which is acquired within the time period not greater than the preset time period of the action liveness detection.

According to the embodiment of the present disclosure, in the process of executing the step S1440 (namely during outputting the action instruction), the method for face liveness detection SE1400 can further comprise: outputting first time prompt information, in which the first time prompt information includes count-down information corresponding to the preset time period of the action liveness detection.

According to the embodiment of the present disclosure, before the step S1332 (or S1420) and/or in the process of executing the steps S1332 (or S1420), namely in the process and/or before acquiring the illumination images, the method for face liveness detection SE1300 (or SE1400) can further comprise: outputting second prompt information, in which the second prompt information is used for notifying the face to be verified to keep still within the preset time period of the illumination liveness detection. For example, in the process of executing the step S1334 (or S1430), the second prompt information can also be outputted. For example, the second prompt information can be outputted during the entire time period of performing the illumination liveness detection.

For example, the preset time period of the illumination liveness detection can be the execution time of the illumination liveness detection (the steps S1332-S1334 as illustrated in FIG. 21 or the steps S1420-S1430 as illustrated in FIG. 23). For another example, the preset time period of the illumination liveness detection can also be the execution time of the step S1332 (or S1420) (i.e., time needed for acquiring the illumination images of the face to be verified).

Illustratively, the step S1310 (or S1410) can be returned (namely whether or not the preset requirement of the image acquisition condition of the face to be verified is satisfied is determined again) if the preset requirement of the image acquisition condition of the face to be verified is not satisfied, which is caused by the movement of the face to be verified within the preset time period of the illumination liveness detection.

The specific content can refer to relevant content in the method for face liveness detection SE300 as illustrated in FIG. 19. No further description will be given herein.

For example, according to the embodiment of the present disclosure, before the step S210 (S1310 or S1410), namely before the step of determining whether or not the preset requirement of the image acquisition condition of the face to be verified is satisfied, or before the step of adopting the image acquisition device to acquire the real-time image of the face to be verified, the method for face liveness detection SE1200 (SE1300 or SE1400) can further comprise: outputting first prompt information, in which the first prompt information is used for notifying the face to be verified to be directly opposite to the image acquisition and to be closer to the image acquisition device.

The implementations of the step S1210 (S1310 or S1410), namely determining whether or not the preset requirement of the image acquisition condition of the face to be verified is satisfied, can be various. Several concrete embodiments of the step S1210 (S1310 or S1410) will be described below, but the embodiment of the present disclosure is not limited thereto. In several following concrete embodiments, a simple interactive command is adopted to instruct the user to execute correct operation, so the convenience of the method for face liveness detection can be improved.

For example, determining of whether or not the preset requirement of the image acquisition condition of the face to be verified is satisfied comprises: adopting the image acquisition device to acquire the real-time image of the face to be verified; displaying a reference part of the face to be verified in the real-time image and a reference region in real time; and determining whether or not the preset requirement of the image acquisition condition is satisfied at least according to whether or not the reference part of the face to be verified in the real-time image falls within the reference region. For example, the reference part of the face to be verified in the real-time image and the reference region are respectively the face to be verified in the real-time image and the face preview region; for another example, the reference part of the face to be verified in the real-time image and the reference region are respectively a specific facial part of the face to be verified in the real-time image and a targeted part region.

According to an embodiment of the present disclosure, the step S1210 (S1310 or S1410) can include: acquiring the real-time image of the face to be verified acquired by the image acquisition device; displaying a face preview region in real time, and displaying part of the real-time image in the face preview region in real time, in which, the displayed part of the real-time image is consistent with the face preview region in position, for example, the displayed part of the real-time image and the face preview region are completely coincide with each other in position; displaying adjustment prompt information in real time according to the image acquisition conditions, which is obtained based on the real-time image, of the face to be verified, in which the adjustment prompt information is used for notifying the face to be verified to make adjustment allowing the preset requirement of the image acquisition condition to be satisfied; and determining whether or not the preset requirement of the image acquisition condition of the face to be verified is satisfied at least according to whether or not the position of the face to be verified in the real-time image falls within a range defined by the face preview region.

Figure 24:
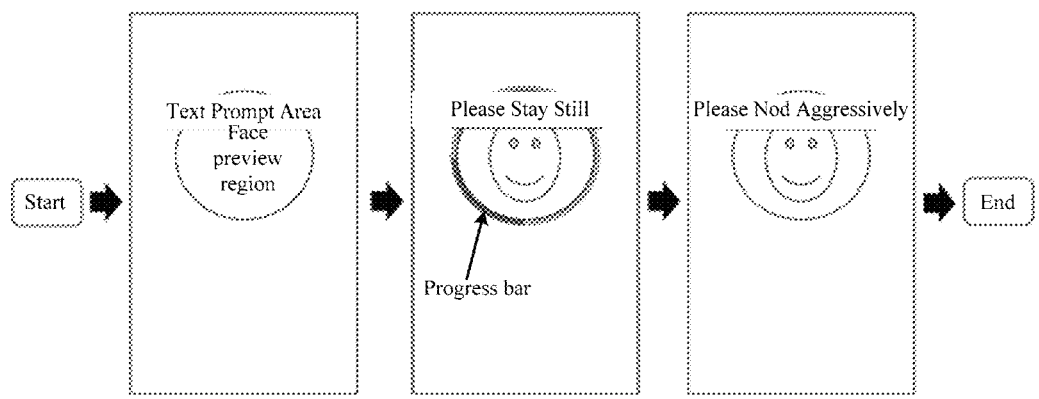
FIG. 24 is a schematic diagram illustrating displayed contents on a display screen in a process of implementing the method for face liveness detection provided by still another embodiment of the present disclosure.

FIG. 24 is a schematic diagram illustrating the content displayed on the display screen during the implementation of the method for face liveness detection provided by one embodiment.

For example, as illustrated in FIG. 24, at the beginning of the face liveness detection process, a face preview region and a text prompt area are displayed on the display screen. For example, both the position of the face preview region and the position of the text prompt area can be fixed. It should be noted that the text "Text Prompt Area" displayed on the leftmost image in FIG. 24 is only illustrative, and the text actually displayed in the text prompt area can be preset and can also be determined according to the current condition of the face to be verified. For example, when the face to be verified fails to fall within the face preview region, the text displayed in the text prompt area can be text such as "Please Let Me See Your Face". Similarly, the "Face preview region" displayed on the leftmost image in FIG. 24 is illustrative, and the content actually displayed in the face preview region can be part of the current acquired image, in which, the displayed part of the current acquired image is consistent with the face preview region in position. It should be understood that the consistency in position (i.e., the displayed part of the current acquired image is consistent with the face preview region in position) described in the present disclosure refers to that the coordinate of the face preview region displayed on the display screen is consistent with the coordinate of the displayed part of the current acquired image, acquired by the image acquisition device, in the current acquired image. It should be understood it is not necessary to set the text prompt area in a case of using voice to realize prompt and interactive function.

For example, part of the real-time image can be displayed in the face preview region in real time, in which, the displayed part of the real-time image is consistent with the face preview region in position. It should be understood that the content displayed in the face preview region can be a video in a case of continuously acquiring a plurality of real-time images. When the scene object in the image acquisition area changes (for example, when the face to be verified moves), the displayed content in the face preview region can also be changed along with the movement of the face to be verified. For example, the user can intuitively determine whether or not the face to be verified is located in an appropriate position, whether or not the size of the face to be verified is appropriate, whether or not the pose of the face to be verified is appropriate, and the like through the displayed content in the face preview region.

For example, during determining whether or not the preset requirement of the image acquisition condition of the face to be verified is satisfied (for example, in the process of executing the step S1210), a displayed color of the display screen except for the face preview region and the text prompt area can be white, so as to highlight the face preview region and the text prompt area.

For example, with reference to the middle image as illustrated in FIG. 24, at this point, the stage of the face liveness detection based on light reflection characteristic, namely the stage of the illumination liveness detection, is entered; adjustment prompt information such as "Please Stay Still" is displayed in the text prompt area and meanwhile, count-down information can be displayed at the edge of the face preview region. For example, the count-down information can be displayed by a progress bar; for example, the progress bar can be a circular progress bar (for example, a circular progress bar overlapped with an edge of a circular face preview region); and for another example, the progress bar can also be a colored progress bar. For example, in this stage, the face to be verified still can be displayed in the face preview region in real time.

For example, with reference to the rightmost image as illustrated in FIG. 24, at this point, the stage of action liveness detection is entered, and the action instructions such as "Please Nod Aggressively" is displayed in the text prompt area to prompt the user to execute the action corresponding to the action instruction. In this stage, the face to be verified can also be continuously displayed in the face preview region in real time.

For example, the implementation form and the displayed content of the face preview region and the text prompt area described above and shown in FIG. 24 can be set as required. No limitation will be given here in the application.

For example, according to the above-mentioned embodiment, the implementation difficulty and the amount of calculation can be reduced by adoption of a face preview region with a fixed position as a reference for the user to align the face to be verified and by adoption of the text prompt area to prompt the user to make adjustment allowing the preset requirement of the image acquisition condition to be satisfied.

For example, according to the embodiment of the present disclosure, the step of displaying the adjustment prompt information in real time according to the image acquisition conditions of the face to be verified in the real-time image (for example, outputting of the adjustment prompt information in the case that the preset requirement of the image acquisition condition is not satisfied) can include one or more of the following: outputting the adjustment prompt information in a case that there is no face to be verified in the real-time image, so as to notify the person having the face to be verified to move toward a direction allowing the face to be verified to be in the real-time image; and outputting the adjustment prompt information in a case that the position of the face to be verified in the real-time image is deviated from a face preview region, so as to notify the person having the face to be verified to move towards a direction opposite to a deviation direction.

For example, adjustment prompt information such as "Please Let Me See Your Face" can be outputted when the face to be verified does not fall within the image acquisition area and the face to be verified cannot be found in the real-time image. For example, adjustment prompt information such as "Please Move Right a Little" can be outputted when the position of the face to be verified in the real-time image is on the left relative to the face preview region (for example, when the center of the face to be verified is on the left of the center of face preview region). For example, adjustment prompt information such as "Please Move Left a Little" can be outputted when the position of the face to be verified in the real-time image is on the right relative to the face preview region (for example, when the center of the face to be verified is on the right of the center of face preview region). For example, adjustment prompt information such as "Please Move Down a Little" can be outputted when the position of the face to be verified in the real-time image is on the upper side relative to the face preview region (for example, when the center of the face to be verified is on the upper side of the center of face preview region). For example, adjustment prompt information such as "Please Move Up a Little" can be outputted when the position of the face to be verified in the real-time image is on the lower side of the face preview region (for example, when the center of the face to be verified is on the lower side of the center of face preview region).

The above-mentioned adjustment prompt information is only illustrative, and the adjustment prompt information displayed in the text prompt area can be set as required. No limitation will be given here in the present disclosure.

For example, according to the embodiment of the present disclosure, the image acquisition conditions can also include a blurriness of the real-time image and a shielding state of the face to be verified in the real-time image; and the step of displaying the adjustment prompt information in real time according to the image acquisition conditions of the face to be verified in the real-time image (for example, outputting of the adjustment prompt information in the case that the preset requirement of the image acquisition condition is not satisfied) can include one or more of the following: outputting the adjustment prompt information in a case that a blurriness of the real-time image exceeds a preset blurriness threshold, so as to notify user to clean the image acquisition device; outputting the adjustment prompt information in a case that the pose of the face to be verified in the real-time image is in a face upward state, so as to notify the person having the face to be verified to lower his/her head; outputting the adjustment prompt information in a case that the pose of the face to be verified in the real-time image is in a face downward state, so as to notify the person having the face to be verified to raise his/her head; outputting the adjustment prompt information in a case that the pose of the face to be verified in the real-time image is tilting to the left or the right, so as to notify the person having the face to be verified to look straight ahead; outputting the adjustment prompt information in a case that the size of the face to be verified in the real-time image is less than a first threshold, so as to notify the person having the face to be verified to be closer to the image acquisition device; outputting the adjustment prompt information in a case that the size of the face to be verified in the real-time image is greater than a second threshold, so as to notify the person having the face to be verified to be away from the image acquisition device; and outputting the adjustment prompt information in a case that a specific facial part of the face to be verified in the real-time image is shielded by an occlusion, so as to notify the person having the face to be verified to remove the occlusion and to expose the specific facial part.

As described above, the image acquisition conditions of the face to be verified can also include the pose and/or size of the face to be verified. Correspondingly, when the image acquisition conditions of the face to be verified also include the pose and/or size of the face to be verified, the adjustment prompt information relevant to the adjustment of the pose and/or size of the face to be verified can be outputted.

For example, adjustment prompt information such as "Please Lower Your Head Slightly" is outputted when the pose of the face to be verified in the real-time image is in a face upward state. For example, adjustment prompt information such as "Please Raise Your Head Slightly" is outputted when the pose of the face to be verified in the real-time image is in a face downward state. Adjustment prompt information such as "Please Look Straight Ahead" is outputted when the pose of the face to be verified in the real-time image is tilting to the left or the right. Adjustment prompt information such as "Please be Closer to the Screen" is outputted when the size of the face to be verified in the real-time image is too small. For example, adjustment prompt information such as "Please Stay away from the Screen" is outputted when the size of the face to be verified in the real-time image is too large.

For example, other factors that can affect the accuracy of the face liveness detection can also be taken as one or more of the image acquisition conditions described in the present disclosure. For example, the image acquisition conditions of the face to be verified can also include a blurriness of the real-time image and a shielding state of the face to be verified in the real-time image. For example, adjustment prompt information such as "Do not Block Your Eyes" is outputted when the eyes of the face to be verified in the real-time image are blocked by other objects (e.g., an occlusion such as the hair, the hand or glasses). Adjustment prompt information such as "Do not Cover Your Mouth" is outputted when the mouth of the face to be verified in the real-time image is covered by other objects (e.g., an occlusion such as a gauze mask or the hand). For example, adjustment prompt information such as "Please Wipe the Lens" can be outputted to prompt the user to clean the image acquisition device when the blurriness of the real-time image exceeds the preset blurriness threshold.

Illustratively, it can be preset as required that, the next stage (e.g., the stage of the illumination liveness detection) can be entered and the preset requirement of the image acquisition condition can be satisfied only when the face to be verified is entirely within the face preview region, the ratio between the size of the face to be verified and the size of the entire face preview region is within a preset ratio range (the preset ratio range can be, for example, more than 70%), and the inclination angle of the face to be verified in any direction of the three-dimensional space does not exceed an angle preset threshold.

Illustratively, as illustrated in FIG. 24, the adjustment prompt information can be displayed in an area above the face preview region; in such a case, the user's eyes can be allowed to focus on this area, and thus the user does not need to change a direction of the line of sight, so the experience can be consistent and smooth, and the interactive progress can be simple and clear, and hence good interactive experience can be obtained.

For example, determining of whether or not the preset requirement of the image acquisition condition of the face to be verified is satisfied comprises: adopting the image acquisition device to acquire the real-time image of the face to be verified; displaying a reference part of the face to be verified in the real-time image and a reference region in real time; and determining whether or not the preset requirement of the image acquisition condition is satisfied at least according to whether or not the reference part of the face to be verified in the real-time image falls within the reference region. For example, the reference part of the face to be verified in the real-time image and the reference region are respectively the face to be verified in the real-time image and the face preview region; for another example, the reference part of the face to be verified in the real-time image and the reference region are respectively a specific facial part of the face to be verified in the real-time image and a targeted part region.

Description will be given below with reference to FIG. 25 to a method of determining whether or not the preset requirement of the image acquisition condition of the face to be verified is satisfied and a method of instructing the user to align some specific facial parts of the face to be verified with the targeted part region in the case that the preset requirement of the image acquisition condition of the face to be verified is not satisfied, provided by the embodiment of the present disclosure.

According to the embodiment of the present disclosure, the step S1210 (S1310 or S1410), namely the step of determining whether or not the preset requirement of the image acquisition condition of the face to be verified is satisfied can include: adopting the image acquisition device to acquire acquiring the real-time image of the face to be verified; displaying a targeted part region in real time, and displaying the face to be verified in the real-time image in real time; and determining whether or not a specific facial part of the face to be verified of the real-time image falls within the targeted part region, determining that the preset requirement of the image acquisition condition is satisfied if the specific facial part of the face to be verified of the real-time image falls within the targeted part region, and determining that the preset requirement of the image acquisition condition of the face to be verified is not satisfied if the specific facial part of the face to be verified of the real-time image fails to fall within the targeted part region.

For example, when the preset requirement of the image acquisition condition of the face to be verified is not satisfied, the user can also be instructed to align some specific facial parts of the face to be verified with the targeted part region, such that the alignment of the face to be verified can be realized, and the preset requirement of the image acquisition condition of the face to be verified can be satisfied. For example, in the alignment process, the ultimate goal of aligning the entire face can be achieved by requiring the user to align relative obvious specific facial parts of the face to be verified with specified positions (for example, the targeted part region) displayed on the display screen.

Figure 25:
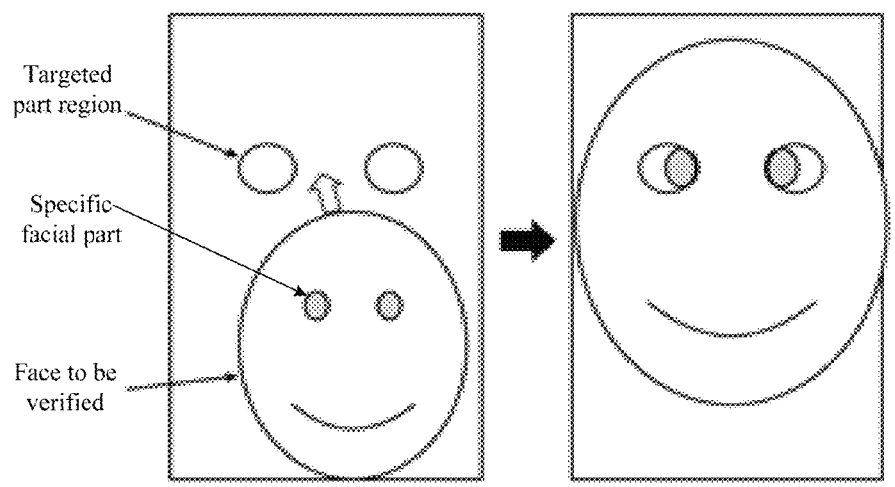
FIG. 25 is a schematic diagram illustrating displayed content on the display screen in a process of implementing the method for face liveness detection provided by still another embodiment of the present disclosure.

FIG. 25 is a schematic diagram illustrating the content displayed on the display screen during the implementation of the method for face liveness detection in the embodiment of the present disclosure. For example, in the example as illustrated in FIG. 25, the user can be required to align both eyes of the face to be verified to specified positions (for example, the targeted part region), and once the operation of aligning the both eyes is completed, it can be determined that the entirely face to be verified is aligned. For example, the alignment method can also be realized by aligning other specific facial parts with obvious features such as the tip of nose, the place between the eyebrows, and the jaw with the targeted part region. For example, the face to be verified can also be aligned by simultaneous aligning of a plurality of specific facial parts with specified positions (for example, the targeted part regions), for example, by simultaneous aligning both eyes and the tip of nose with specified positions.

For example, the leftmost image of FIG. 25 shows a targeted part region. For example, the targeted part region can be two regions defined by circles. For example, if both eyes of the face to be verified is within the targeted part region, namely the both eyes are within the displayed circles, it can be determined that the preset requirement of the image acquisition condition is satisfied; and the case illustrated in the rightmost image of FIG. 25 shows that the both eyes of the face to be verified is within the targeted part region. For example, if not all of the both eyes of the face to be verified is within the targeted part region (for example, if only one eye is within the targeted part region or only part of each eye is within the targeted part region, namely both eyes are not aligned with the displayed circles), it can be determined that the preset requirement of the image acquisition condition of the face to be verified is not satisfied.

For example, as illustrated in FIG. 25, in the process of aligning the specific facial part, other parts of the face to be verified, except for the specific facial part (for example, the face to be verified except for both eyes), can also be displayed in real time. Thus, the user can easily determine the distance difference between the specific facial part and the targeted part region, so the alignment of the face to be verified can be conveniently performed. For example, because it's difficult to require the user to directly adjust the parameters such as the pose and the size of the face to be verified without a reference, providing a specific reference (for example, the targeted part region) can lower the difficulty of realizing the alignment of the face to be verified, so the alignment method in the embodiment is easier to execute, and hence the use experience of the user can be improved.

Description will be given below with reference to FIG. 26 to another method provided by the embodiment of the present disclosure for determining whether or not the preset requirement of the image acquisition condition of the face to be verified is satisfied and a method of instructing the user to adjust the face to be verified in the case that it is determined that the preset requirement of the image acquisition condition of the face to be verified is not satisfied, so that the preset requirement of the image acquisition condition of the face to be verified can be satisfied.

According to the embodiment of the present disclosure, the step S1210 (S1310 or S1410), namely the step of determining whether or not the preset requirement of the image acquisition condition of the face to be verified is satisfied includes: adopting the image acquisition device to acquire the real-time image of the face to be verified; displaying a simulated face region changing along with the face to be verified in real time according to the image acquisition condition, wherein the face to be verified is displayed in the simulated face region; displaying a targeted face region, which is used for indicating an alignment of the face to be verified, in real time; and determining whether or not the simulated face region is aligned with the targeted face region, in which it is determined that the preset requirement of the image acquisition condition of the face to be verified is satisfied in a case that the simulated face region is aligned with the targeted face region, and it is determined that the preset requirement of the image acquisition condition of the face to be verified is not satisfied in a case that the simulated face region is not aligned with the targeted face region.

A real-time, abstract or concrete virtual object (e.g., the simulated face region) can be generated for the alignment of the face to be verified according to the image acquisition conditions (e.g., the position, the pose and the size of the face to be verified) of the face to be verified in each real-time image. In the alignment process, the mainly considered factor can comprise at least one of the following factors (for example, all of the following factors): whether or not the pose of the face to be verified is put in a upright state, whether or not the center of the face to be verified is overlapped with the center of, for example, the real-time image, whether or not the size of the face to be verified is appropriate, and the like. These image acquisition conditions can be calculated by algorithms; the calculated image acquisition conditions are mapped as key values by functions; and these key values are used to control the virtual object (e.g., the simulated face region) displayed on the display screen to move or change. For example, the position of the face to be verified in the real-time image can be mapped as a position of the virtual object (e.g., the simulated face region) in the display screen, such that the position of the virtual object can be controlled by the position change of the face to be verified in the real-time image. For another example, the size of the face to be verified in the real-time image can be mapped as a size of the virtual object (e.g., the simulated face region), such that the size of the virtual object can be controlled by the size of the face to be verified in the real-time image. For further another example, the pose of the face to be verified in the real-time image can be mapped as a shape of the virtual object (e.g., the simulated face region) in the display screen, such that the shape of the virtual object can be controlled by the pose change of the face to be verified in the real-time image. For example, the virtual object can be a circular object in a case that the face to be verified is a front view face, and the virtual object can be an elliptic object in a case that the face to be verified is a side view face. It should be understood that the shape of the virtual object (e.g., the simulated face region) is not limited to circle and ellipse, the shape of the virtual object can be set according to specific implementations; no limitation will be given herein. For example, the shape of the virtual object (e.g., the simulated face region) can also be a square or in a shape of heart. It should be understood that the mapping between the image acquisition conditions and the key values corresponding to the virtual object (e.g., the simulated face region) can be set according to specific implementations; no limitation will be given herein. For example, the size of the virtual object can be the same as or half of the size of the face to be verified in the real-time image, but the present disclosure is not limited to the case. For example, the size of the face to be verified can be a minimum value of a diameter of a circle which can encircle the face to be verified.

For example, it is determined that the preset requirement of the image acquisition condition of the face to be verified is satisfied in a cased that the virtual object controlled by the image acquisition conditions reaches a preset target state. For example, reaching of the preset target state can be any one of the following cases: the virtual object is within the targeted face region; the virtual object is within the targeted face region and the size of the virtual object is within a preset size range (for example, the size of the virtual object allows a ratio between the size of the virtual object and the size of the targeted face region to be greater than ⅔); the virtual object is within the targeted face region, the size of the virtual object is within a preset size range and the ellipticity of the virtual object is within a preset ellipticity range (for example, the ellipticity of the virtual object is less than 10%), in which the ellipticity of the virtual object can be calculated by the following equation, that is, ellipticity=2× 100%×(major axis of the ellipse−minor axis of the ellipse)/(major axis of the ellipse+minor axis of the ellipse).

Figure 26:
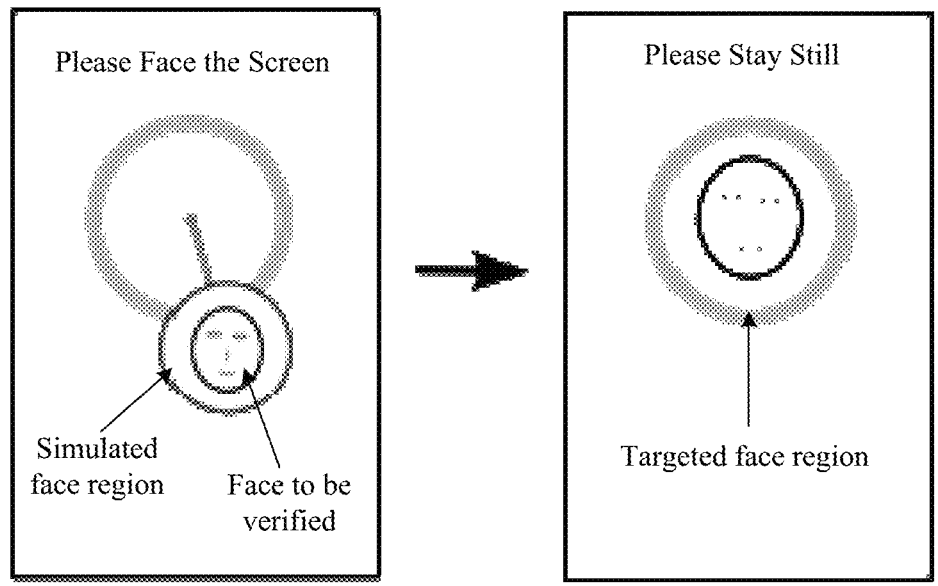
FIG. 26 is a schematic diagram illustrating still another displayed content on the display screen in the process of implementing the method for face liveness detection provided by still another embodiment of the present disclosure.

For example, FIG. 26 is a schematic diagram illustrating the content displayed on the display screen during the implementation of the method for face liveness detection in the embodiment of the present disclosure. For example, in FIG. 26, an image window for indicating the face to be verified (namely the simulated face region; the image window is a video window when a plurality of continuous images are acquired for the face to be verified) is designed to be a circular object capable of moving and capable of changing the size. The user can control the circular object (or control the simulated face) to move up, down, left or right by adjusting the angle between the face to be verified and the display screen (and the image acquisition device), and the position of the face to be verified in the display screen. The user can also adjust the size of the circular object by adjusting the distance between the face to be verified and the display screen (and the image acquisition device). For example, the ultimately goal is to require the user to align the circular object with the targeted face region (for example, a circular ring with largest diameter as illustrated in FIG. 26), namely allowing the circular object to be within the circular ring with largest diameter.

It should be understood that the continuous images in the present application indicates that the number of the images displayed on the display screen per minute is sufficiently high (for example, 24 images per minute) such that the user takes the displayed images as the continuous images.

In one example, it can be determined that the simulated face region is aligned with the targeted face region when the edge of the simulated face region and the edge of the targeted face region are completely aligned (for example, completely overlapped with each other). In another example, it can be determined that the simulated face region is aligned with the targeted face region when the simulated face region falls within the targeted face region and the ratio of the size of the simulated face region to the size of the targeted face region (namely the proportion of the simulated face region in the targeted face region) is within the range of the preset ratio (for example, not greater than the second preset ratio described in the present disclosure).

For example, according to the embodiment of the present disclosure, the step of determining of whether or not the simulated face region is aligned with the targeted face region can comprise: determining that the simulated face region is aligned with the targeted face region in a case that the simulated face region is within the targeted face region and a ratio of a size of the simulated face region to a size of the real-time image is greater than a first preset ratio; and determining that the simulated face region is not aligned with the targeted face region in a case that the simulated face region is not within the targeted face region or the ratio of the size of the simulated face region to the size of the real-time image is less than or equal to the first preset ratio.

The size of the simulated face region can reflect the distance and the relative angle between the face to be verified and the image acquisition device, so the size of the simulated face region can be used as a determination condition regarding whether or not the image acquisition conditions satisfy the requirements. Both the targeted face region and the first preset ratio can be set as required. No limitation will be given here in the present disclosure.

For example, if the simulated face region of the face to be verified is within the targeted face region but the ratio of the size of the simulated face region to the size of the real-time image is less than the first preset ratio (e.g., two-thirds), the pose of the face to be verified can be too oblique and/or the face to be verified can be too far away from the image acquisition device. In such a case, it can be determined that the image acquisition conditions do not satisfy the requirements.

Illustratively, the method for face liveness detection SE1200 (SE1300 or SE1400) can further comprise: outputting first acquisition prompt information in real time to prompt the face to be verified to be closer to the image acquisition device when the ratio of the size of the simulated face region to the size of the real-time image is not greater than the first preset ratio.

According to the embodiment of the present disclosure, the step of determining of whether or not the simulated face region is aligned with the targeted face region can comprise: determining that the simulated face region is aligned with the targeted face region in a case that the simulated face region is within the targeted face region and a ratio of a size of the simulated face region to a size of the targeted face region is greater than a second preset ratio; and determining that the simulated face region is not aligned with the targeted face region in a case that the simulated face region is not within the targeted face region or the ratio of the size of the simulated face region to the size of the targeted face region is less than or equal to the second preset ratio.

For example, the size of the simulated face region can reflect the distance and the relative angle between the face to be verified and the image acquisition device, so the size of the simulated face region can be used as a determination condition regarding whether or not the image acquisition conditions satisfy the requirements For example, when the distance between the face to be verified is decreased, the size of the simulated face region displayed on the display screen in real time is increased, and therefore, the size of the simulated face region displayed on the display screen can be increased to a certain value that allowing the simulated face region to be aligned with the targeted face region when the face is close enough to the display screen. Of course, the size of the simulated face region displayed on the display screen in real time can also be adjusted to be aligned with the targeted face region only when the face to be verified is close enough to the display screen, and no limitation will be given herein. Both the targeted face region and the second preset ratio can be set as required, and no limitation will be given here in the present disclosure.

For example, if the simulated face region of the face to be verified is disposed in the targeted face region but the ratio of the size of the simulation face are to the size of the targeted face region is less than the second preset ratio (e.g., two-thirds), the pose of the face to be verified can be too oblique and/or the face to be verified can be too far away from the image acquisition device. In such a case, it can be determined that the image acquisition conditions do not satisfy the requirements.

Illustratively, the method for face liveness detection SE1200 (SE1300 or SE1400) can further comprise: outputting second acquisition prompt information in real time to prompt the face to be verified to be closer to the image acquisition device if the ratio of the size of the simulated face region to the size of the targeted face region is not greater than the second preset ratio. For example, the second acquisition prompt information can be outputted in the form of one or more selected from voice, image and text. For example, if the ratio of the size of the simulated face region to the size of the targeted face region is not greater than the second preset ratio, prompt information such as "Please be Closer to the Camera" (or "Please be Closer to the Mobile Phone") can be displayed on the display screen.

According to the embodiment of the present disclosure, the method SE1200 (SE1300 or SE1400) can further comprise: determining the relative positional relationship between the simulated face region and the targeted face region in real time; and outputting third acquisition prompt information in real time according to the relative positional relationship, so as to notify the change of the relative positional relationship and allow the simulated face region to be closer to the targeted face region.

For example, when the method and device for face liveness detection provided by the embodiment of the present disclosure are implemented by the mobile terminal, the simulated face region and the icon for indicating the targeted face region (namely the targeted face region) can be displayed in real time on the display screen of the mobile terminal. The real-time display of the simulated face region and the icon for indicating the targeted face region can provide convenience for the user to know the state of the current image acquisition condition and the difference between the current image acquisition condition and the preset requirements, so that the user can conveniently adjust the pose of the user or the image acquisition device (or the device for face liveness detection including the image acquisition device), and hence the subsequent stage for face liveness detection can be entered as soon as possible. Therefore, the real-time display of the simulated face region and the icon for indicating the targeted face region can improve the user experience and the efficiency of the face liveness detection.

For example, according to the embodiment of the present disclosure, in the process of adopting the image acquisition device to acquire the face images, the method for face liveness detection SE1200 (SE1300 or SE1400) further comprises: outputting a brightness control instruction during and/or before acquiring the real-time image of the face to be verified, in which the brightness control instruction is configured for setting a brightness of a display screen (for example, the display screen can be used for displaying the face to be verified) to be one of the following: to be a constant value which is greater than a preset brightness threshold but less than a maximum brightness of the display screen, to be a constant value which is equal to the maximum brightness of the display screen, and to be changed along with an intensity change of ambient light.

Because poor illumination condition can adversely affect the quality of the face images, the method and device for face liveness detection can fail to work properly in situations with poor illumination conditions. Illustratively, in the process of adopting the image acquisition device to acquire the face images, the setting of the brightness of the display screen can be changed (for example, the brightness of the display screen can be increased), for example, the brightness of the display screen can set to be the constant value which is greater than the preset brightness threshold but less than the maximum brightness of the display screen, or the brightness of the display screen can set to be the constant value which is equal to the maximum brightness of the display screen, such that the light of the display screen can be used to illuminate the face to be verified, and hence the face liveness detection still can be performed in a dark environment. For example, the above-mentioned working mode can fully utilize the self-luminescence characteristic of the display screen of the mobile terminal, and therefore, the light emitted by the display screen can be adopted as complementary light to illuminate the face to be verified, ensures that the face images with good quality can be still acquired in dark environments, and thus allows the method for face liveness detection to be robust. Optionally, the mobile terminal can have the capability to detect ambient light, such that the brightness of the display screen can be automatically adjusted according to the intensity change of the ambient light.

In the above-mentioned three embodiments of determining the image acquisition conditions of the face to be verified with reference to FIGS. 24, 25 and 26, the face to be verified or one part thereof is aligned with a reference position. However, it should be understood that the above-mentioned embodiments are not intended to limit the present disclosure, and the present disclosure can adopt other implementation methods to determine the image acquisition condition of the face to be verified. For example, the image acquisition condition of the face to be verified can include the size and/or pose of the face to be verified in the real-time image, while the position of the face to be verified in the image is not adopted as a determination condition for the image acquisition condition; in such a case, it can be determined that the preset requirement of the image acquisition condition is satisfied as long as the size of the face to be verified is in a preset size range and/or the pose of the face to be verified is in a preset pose range. For another example, the image acquisition condition of the face to be verified can include the position, the size and the pose of the face to be verified in the real-time image, in such a case, it can be determined that the preset requirement of the image acquisition condition is satisfied in a case that the position of the face to be verified is in a preset position range, the size of the face to be verified is in a preset size range, and the pose of the face to be verified is in a preset pose range.

Figure 27:
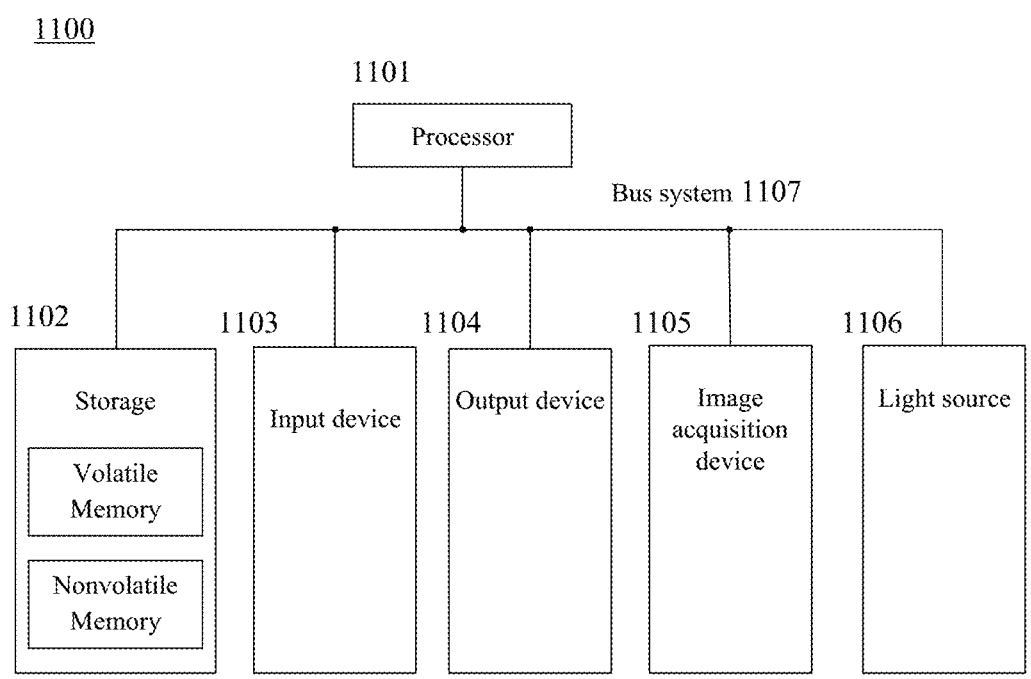
FIG. 27 is an illustrative block diagram of a device for face liveness detection provided by still another embodiment of the present disclosure.

Detailed description will be given below to a device for face liveness detection provided by the embodiment of the present disclosure with reference to FIG. 27. FIG. 27 is an illustrative block diagram of a device for face liveness detection 1100. For example, the device for face liveness detection 1100 can be used for the face liveness detection, and more specifically, the device for face liveness detection 1100 can implement the foregoing method for face liveness detection provided by the embodiment of the present disclosure.

For example, as illustrated in FIG. 27, the device for face liveness detection 1100 comprises one or more processors 1101, one or more storages 1102, an input device 1103, an output device 1104, an image acquisition device 1105 and a light source 1106. These components are connected with each other through a bus system 1107 and/or connecting mechanisms (not shown) in other forms. It should be understood that the components and the structures of the device for face liveness detection 1100 as illustrated in FIG. 27 are only illustrative and not restrictive, and the device for face liveness detection can also comprise other components and structures as required.

The processor 1101 can be a CPU or a processor in other forms having data processing capability and/or instruction execution capability, and other components in the device for face liveness detection 1100 can be controlled by the processor 1101 to execute expected functions. For example, the processor 1101 can control the device for face liveness detection 1100 to implement the foregoing method for face liveness detection provided by the embodiment of the present disclosure.

The storage 1102 can include one or more computer program products, and the computer program products can include computer readable storage media in various forms, e.g., volatile memories and/or nonvolatile memories. The volatile memory, for example, can include an RAM and/or a cache. The nonvolatile memory, for example, can include an ROM, a hard disc, a flash memory, etc. One or more computer program instructions can be stored on the computer readable storage medium, and the processor 1101 can run the program instructions to realize the function of a client and/or other expected functions (implemented by the processor) in the following embodiments and/or the above-mentioned embodiments of the present disclosure. Various APPs and data, e.g., various data used and/or produced by the APPs, can also be stored in the computer readable storage medium.

The input device 1103 can be a device used by the user for inputting an instruction and the input device 1103 can include one or more selected from a keyboard, a mouse, a microphone and a touch screen.

The output device 1104 can output various kinds of information (e.g., image and/or voice) to the outside (e.g., the user), and the output device 1104 can include one or more selected from a display screen and a loudspeaker, but the embodiment of the present disclosure is not limited thereto.

The image acquisition device 1105 can acquire various kinds of images, e.g., face images (or face video), and the acquired images are stored in the storage 1102 and can be used by other components of the device for face liveness detection 1100. The image acquisition device 1105 can be a camera. It should be understood that the case that the device for face liveness detection 1100 comprises the image acquisition device 1105 is only illustrative, and the device for face liveness detection 1100 can also comprise no image acquisition device 1105, in such a case, other image acquisition devices separated from the face liveness detection system 1100 can be utilized to acquire images and then the acquired images can be send to the device for face liveness detection 1100.

The light source 1106 can be an apparatus capable of emitting light. For example, the light source 1106 can include a special purpose light source such as LEDs, and can also include an unconventional light source such as a display screen. When the method and device for face liveness detection are implemented by a mobile terminal such as a smart mobile phone, the input device 1103, the output device 1104 and the light source 1106 can be implemented by same display screen.

For example, the device for face liveness detection 1100 can be implemented on equipment such as a personal computer or a remote server, but the embodiment of the present disclosure is not limited thereto.

Figure 28:
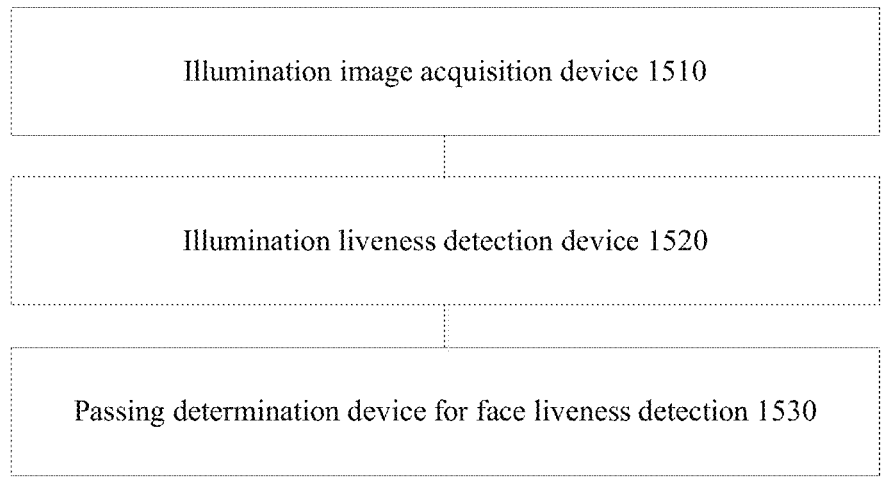
FIG. 28 is an illustrative block diagram of another device for face liveness detection provided by still another embodiment of the present disclosure.

According to another aspect of the present disclosure, a face liveness detection device is provided. FIG. 28 is an illustrative block diagram of a face liveness detection device 1500 provided by an embodiment of the present disclosure.

As illustrated in FIG. 28, the face liveness detection device 1500 provided by the embodiment of the present disclosure comprises an illumination image acquisition device 1510, an illumination liveness detection device 1520 and a passing determination device for face liveness detection 1530. The above-mentioned devices of the device for face liveness detection 1500 are cooperated with each other to realize the above-mentioned function for face liveness detection in the embodiments of the present disclosure.

For example, the illumination image acquisition device 1510 can be configured to acquire a plurality of illumination images of the face to be verified. For example, at least partial functions of the illumination image acquisition device 1510 can be realized by the program instructions stored in the storage 1102, run by the processor 1101 in the device for face liveness detection as illustrated in FIG. 27.

For example, the illumination liveness detection device 1520 can be configured to determine whether or not a face to be verified passes the illumination liveness detection according to the light reflection characteristic of the face to be verified in one or more illumination images, and obtain an illumination liveness detection result. For example, the illumination liveness detection device 1520 can be implemented by the program instructions stored in the storage 1102, run by the processor 1101 of the device for face liveness detection as illustrated in FIG. 27.

For example, the passing determination device for face liveness detection 1530 can be configured to determine whether or not the face to be verified passes the face liveness detection at least according to the illumination liveness detection result. For example, the passing determination device for face liveness detection 1530 can be implemented by the program instructions stored in the storage 1102, run by the processor 1101 in the device for face liveness detection 1101 as illustrated in FIG. 27.

Figure 29:
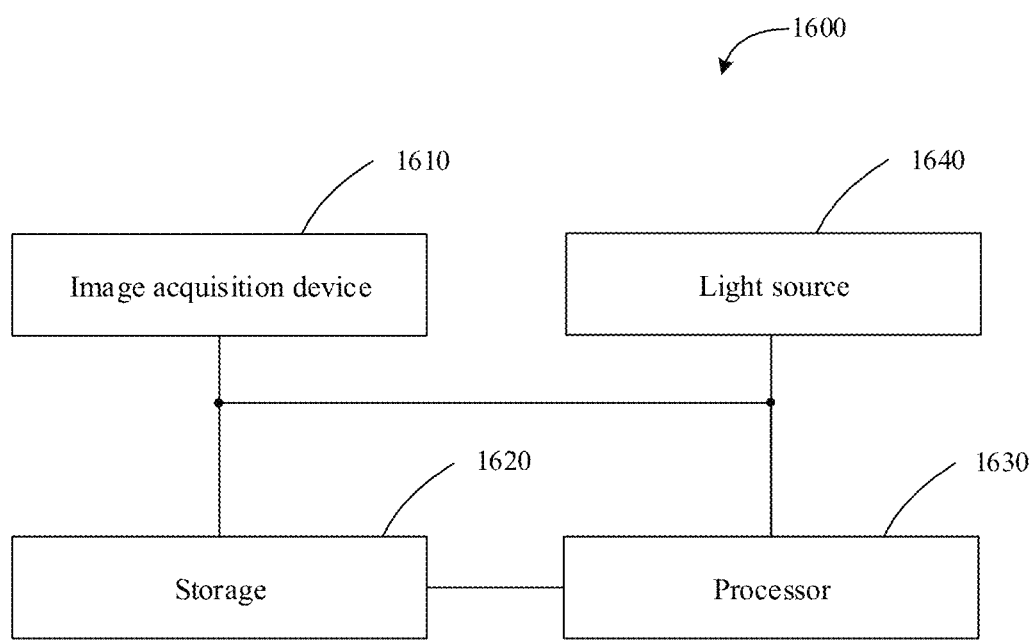
FIG. 29 is an illustrative block diagram of further another device for face liveness detection provided by still another embodiment of the present disclosure.

FIG. 29 is an illustrative block diagram of a face liveness detection system 1600 provided by an embodiment of the present disclosure. For example, the face liveness detection system 1600 comprises an image acquisition device 1610, a storage 1620, a processor 1630 and a light source 1640.

For example, the light source 1640 is configured to dynamically change the mode of illumination light irradiated on the face to be verified. For example, the image acquisition device 1610 can be configured to acquire images (including illumination images, action images and real-time images) of the face to be verified. For example, the image acquisition device 1610 is optional. For example, the face liveness detection system 1600 can comprise no image acquisition device; in such a case, other image acquisition devices separated from the face liveness detection system 1600 can be utilized to acquire images for face liveness detection and the acquired images can be sent to the face liveness detection system 1600.

For example, the storage 1620 is configured to store computer program instructions used for implementing corresponding steps of the method for face liveness detection provided by the embodiment of the present disclosure.

For example, the processor 1630 is configured to run the computer program instructions stored in the storage 1620, so as to execute corresponding steps of the method for face liveness detection provided by the embodiment of the present disclosure. For example, the illumination liveness detection device 1520 and the passing determination device for face liveness detection 1530 of the device for face liveness detection 1500 provided by the embodiment of the present disclosure can be implemented by the processor 1630.

For example, in one embodiment, when the computer program instructions are run by the processor 1630, the face liveness detection system 1600 executes the following steps: obtaining an illumination liveness detection result according to the light reflection characteristic of the face to be verified in the plurality of illumination images; and determining whether or not the face to be verified passes the face liveness detection at least according to the illumination liveness detection result.

Figure 30:
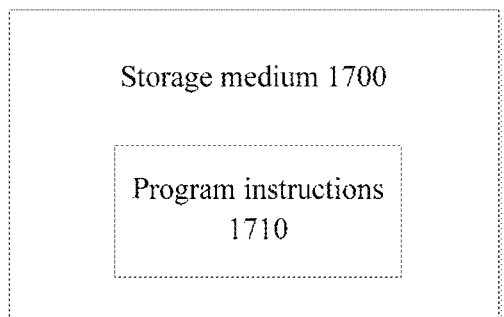
FIG. 30 is an illustrative block diagram of still another device for face liveness detection provided by still another embodiment of the present disclosure.

FIG. 30 shows a storage medium 1700 in the embodiment of the present disclosure. Program instructions 1710 (namely computer program instructions) are stored in the storage medium 1700. When the program instructions 1710 are run by a computer or a processor, the storage medium can be configured to execute corresponding steps in the method for face liveness detection provided by the embodiment of the present disclosure, and can also be configured to implement corresponding devices, modules, sub-modules or units in the device for face liveness detection provided by the embodiments of the present disclosure. For the sake of clarity, corresponding content is appropriately omitted here. The storage medium, for example, can include a memory card of a smart mobile phone, a storage of a tablet PC, a hard disc of a personal computer, an ROM, an erasable programmable read-only memory (EPROM), a compact disc-read-only memory (CD-ROM), a USB memory or any combination of the above-mentioned storage media.

For example, in one example, when the computer program instructions are run by the computer or the processor, the computer or the processor can be implemented as various devices, modules, sub-modules, and/or units of the device for face liveness detection provided by the embodiment of the present disclosure, and/or can execute the method for face liveness detection provided by the embodiment of the present disclosure.

In one embodiment, the computer program instructions are used for executing the following steps in the process of running: acquiring a plurality of illumination images, which are respectively corresponding to various modes, of the face to be verified captured in the process of dynamically changing the mode of the illumination light irradiated on the face to be verified; obtaining an illumination liveness detection result according to a light reflection characteristic of the face to be verified in the plurality of illumination images; and determining whether or not the face to be verified passes the face liveness detection at least according to the illumination liveness detection result. For example, the step of obtaining the illumination liveness detection result according to the light reflection characteristic of the face to be verified in the plurality of illumination images can include: analyzing the plurality of illumination images, acquiring the light reflection characteristic of the face to be verified in the plurality of illumination images, and obtaining the illumination liveness detection result.

Relevant devices, modules, sub-modules and/or or units in the system for face liveness detection 1600 provided by the embodiment of the present disclosure can be implemented by the computer program instructions stored in the memory, run by the processor of the device for face liveness detection provided by the embodiment of the present disclosure for implementing the face liveness detection, or can be implemented in the process of adopting the computer to run the computer instructions stored in the computer-readable storage medium of the computer program product in the embodiment of the present disclosure.

Figure 31:
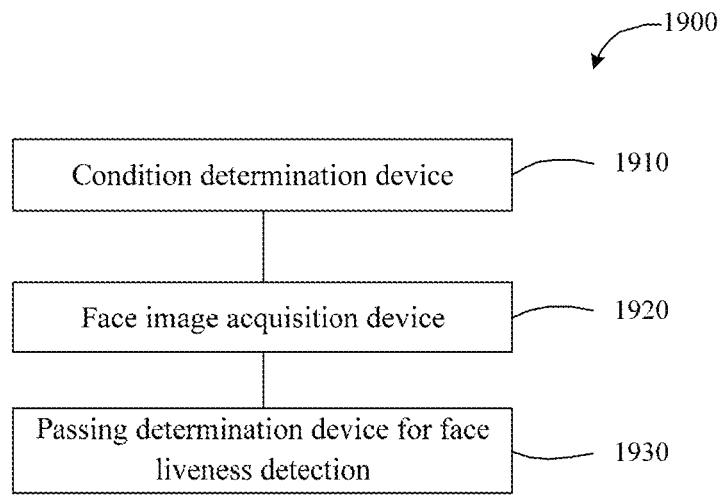
FIG. 31 is an illustrative block diagram of a device for face liveness detection provided by still another embodiment of the present disclosure.

FIG. 31 is an illustrative block diagram of a device for face liveness detection 1900 provided by the embodiment of the present disclosure.

As illustrated in FIG. 31, the device for face liveness detection 1900 provided by the embodiment of the present disclosure comprises a condition determination device 1910, a face image acquisition device 1920 and a passing determination device for face liveness detection 1930. The above-mentioned devices can be used for executing various steps/ functions of the method for face liveness detection provided by the embodiment of the present disclosure. Description will be given below to main functions of the components of the device for face liveness detection 1900, and the details already described above are omitted.

For example, the condition determination device 1910 is configured to determine whether or not a preset requirement of an image acquisition condition of the face to be verified is satisfied, in which the image acquisition condition at least comprises one or more selected from a position of the face to be verified, a pose of the face to be verified and a size of the face to be verified in a real-time image acquired by an image acquisition device. For example, at least partial functions of the condition determination device 1910 can be implemented by the program instructions, stored in the storage (for example, the storage 104 as illustrated in FIG. 27), run by the processor (for example, the processor 102 in the device for face liveness detection as illustrated in FIG. 27).

For example, the face image acquisition device 1920 is configured to acquire face images of the face to be verified acquired by the image acquisition device when the preset requirement of the image acquisition condition is satisfied. For example, at least partial functions of the face image acquisition device 1920 can be implemented by the program instructions, stored in the storage (for example, the storage 104 as illustrated in FIG. 27), run by the processor (for example, the processor 102 in the device for face liveness detection as illustrated in FIG. 27).

For example, the passing determination device for face liveness detection 1930 is configured to determine whether or not the face to be verified passes the face liveness detection according to the face images. For example, the passing determination device for face liveness detection 1930 can be implemented by the program instructions, stored in the storage (for example, the storage 104 as illustrated in FIG. 27), run by the processor (for example, the processor 102 in the device for face liveness detection as illustrated in FIG. 27).

For example, in one example, the condition determination device 1910 can include a first real-time image acquisition sub-module, a first region display sub-module, a first prompt display sub-module and a first condition determination sub-module. For example, the first real-time image acquisition sub-module can be configured to acquire the real-time image of the face to be verified acquired by the image acquisition device; the first region display sub-module can be configured to display a face preview region in real time, and to display part of the real-time image in the face preview region in real time, in which, the displayed part of the real-time image is consistent with the face preview region in position; the first prompt display sub-module can be configured to output adjustment prompt information in real time according to the image acquisition conditions of the face to be verified in the real-time image, and for example, the adjustment prompt information can be used for notifying the face to be verified to make adjustment allowing the preset requirement of the image acquisition condition to be satisfied; the first condition determination sub-module can be configured to determine whether or not the preset requirement of the image acquisition condition of the face to be verified is satisfied at least according to whether or not the position of the face to be verified in the real-time image falls within a range defined by the face preview region.

Illustratively, the first prompt display sub-module includes one or more of the following: a first prompt output device configured to output adjustment prompt information in a case that there is no face to be verified in the real-time image, so as to notify the person having the face to be verified to move toward a direction allowing the face to be verified to be in the real-time image; and a second prompt output device configured to output adjustment prompt information in a case that the position of the face to be verified in the real-time image is deviated from a face preview region, so as to notify the person having the face to be verified to move towards a direction opposite to a deviation direction.

Illustratively, the image acquisition condition can further include a blurriness of the real-time image and a shielding state of the face to be verified in the real-time image; and the first prompt display sub-module also includes one or more of the following: a third prompt output device configured to output adjustment prompt information in a case that a blurriness of the real-time image exceeds a preset blurriness threshold, so as to notify user to clean the image acquisition device; a fourth prompt output device configured to output adjustment prompt information in a case that the pose of the face to be verified in the real-time image is in a face upward state, so as to notify the person having the face to be verified to lower his/her head; a fifth prompt output device configured to output adjustment prompt information in a case that the pose of the face to be verified in the real-time image is in a face downward state, so as to notify the person having the face to be verified to raise his/her head; a sixth prompt output device configured to output adjustment prompt information in a case that the pose of the face to be verified in the real-time image is tilting to the left or the right, so as to notify the person having the face to be verified to look straight ahead; a seventh prompt output device configured to output adjustment prompt information in a case that the size of the face to be verified in the real-time image is less than a first threshold, so as to notify the person having the face to be verified to be closer to the image acquisition device; an eighth prompt output device configured to output adjustment prompt information in a case that the size of the face to be verified in the real-time image is greater than a second threshold, so as to notify the person having the face to be verified to be away from the image acquisition device; and a ninth prompt output device configured to output adjustment prompt information in a case that a specific facial part of the face to be verified in the real-time image is shielded by an occlusion, so as to notify the person having the face to be verified to remove the occlusion and to expose the specific facial part.

Illustratively, the adjustment prompt information can be displayed in an area above the face preview region.

For example, in another example, the condition determination device 1910 can include a second real-time image acquisition sub-module, a second region display sub-module and a second condition determination sub-module. For example, the second real-time image acquisition sub-module can be configured to acquire the real-time image of the face to be verified acquired by the image acquisition device; the second region display sub-module can be configured to display a targeted part region in real time, and display a face to be verified of the real-time image in real time; and the second condition determination sub-module can be configured to determine whether or not the position of a specific facial part of the face to be verified in the real-time image falls within the targeted part region, determine that the preset requirement of the image acquisition condition is satisfied if so, and determining that the preset requirement of the image acquisition condition of the face to be verified is not satisfied if not.

For example, in still another example, the condition determination device 1910 can include a third real-time image acquisition sub-module, a third region display sub-module, a fourth region display sub-module and a third condition determination sub-module. For example, the third real-time image acquisition sub-module can be configured to acquire the real-time image of the face to be verified acquired by the image acquisition device; the third region display sub-module can be configured to display a simulated face region changing along with the face to be verified in real time according to the image acquisition conditions of the face to be verified in the real-time image, and the face to be verified is displayed in the simulated face region; the fourth region display sub-module can be configured to display a targeted face region for indicating an alignment of the face to be verified in real time; and the third condition determination sub-module can be configured to determine whether or not the simulated face region is aligned with the targeted face region, in which it is determined that the preset requirement of the image acquisition condition of the face to be verified is satisfied in a case that the simulated face region is aligned with the targeted face region, and it is determined that the preset requirement of the image acquisition condition of the face to be verified is not satisfied in a case that the simulated face region is not aligned with the targeted face region.

For example, in one example, the third condition determination sub-module can include a first alignment determination unit and a second alignment determination unit. For example, the first alignment determination unit can be configured to determine that the simulated face region is aligned with the targeted face region when the simulated face region is disposed in the targeted face region and the ratio of the size of the simulated face region to the size of the real-time image is greater than first preset ratio. For example, the second alignment determination unit can be configured to determine that the simulated face region is not aligned with the targeted face region when the simulated face region is not disposed in the targeted face region or when the ratio of the size of the simulated face region to the size of the real-time image is not greater than the first preset ratio.

Illustratively, the device for face liveness detection 1900 can further comprise a first prompt output module. For example, the first prompt output module can be configured to output first acquisition prompt information in real time to prompt the face to be verified to be closer to the image acquisition device when the ratio of the size of the simulated face region to the size of the real-time image is not greater than the first preset ratio.

For example, in another example, the third condition determination sub-module can include a third alignment determination unit and a fourth alignment determination unit. For example, the third alignment determination unit can be configured to determine that the simulated face region is aligned with the targeted face region when the simulated face region is disposed in the targeted face region and the ratio of the size of the simulated face region to the size of the targeted face region is greater than second preset ratio; and the fourth alignment determination unit can be configured to determine that the simulated face region is not aligned with the targeted face region when the simulated face region is not disposed in the targeted face region or when the ratio of the size of the simulated face region to the size of the targeted face region is not greater than the second preset ratio.

Illustratively, the device for face liveness detection 1900 can further comprise a second prompt output module. For example, the second prompt output module can be configured to output second acquisition prompt information to prompt the face to be verified to be closer to the image acquisition device when the ratio of the size of the simulated face region to the size of the targeted face region is not greater than the second preset ratio.

Illustratively, the device for face liveness detection 1900 can further comprise a positional relationship determination module and a third prompt output module. For example, the positional relationship determination module can be configured to determine the relative positional relationship between the simulated face region and the targeted face region in real time; and the third prompt output module can be configured to output third acquisition prompt information in real time according to the relative positional relationship, so as to notify the change of the relative positional relationship and allow the simulated face region to be closer to the targeted face region.

Illustratively, the device for face liveness detection 1900 can further comprise a brightness control module. For example, the brightness control module can be configured to output a brightness control instruction during and/or before acquiring the real-time image of the face to be verified, in which the brightness control instruction is configured for setting a brightness of a display screen, which is used for displaying the face to be verified, to be one of the following: to be a constant value which is greater than a preset brightness threshold but less than a maximum brightness of the display screen, to be a constant value which is equal to the maximum brightness of the display screen, and to be changed along with an intensity change of ambient light Illustratively, the face images can include one or more illumination images of the face to be verified. For example, the passing determination device for face liveness detection 1930 can include an illumination liveness detection sub-module and a passing determination sub-module for face liveness detection. For example, the illumination liveness detection sub-module can be configured to determine whether or not the face to be verified passes the illumination liveness detection according to the light reflection characteristic of the face to be verified in one or more illumination images, so as to obtain an illumination liveness detection result; and the passing determination sub-module for face liveness detection can be configured to determine whether or not the face to be verified passes the face liveness detection at least according to the illumination liveness detection result.

Illustratively, the face image acquisition device 1920 can include a control instruction output sub-module. For example, the control instruction output sub-module can be configured to output a detection light control instruction when the image acquisition conditions of the face to be verified in the current image satisfy the preset requirements, so as to control the light source to emit detection light toward the face to be verified; and to acquire one or more illumination images.

Illustratively, the face image acquisition device 1920 can include an enable sub-module. For example, the enable sub-module can be configured to enable the condition determination device 1910 when the face to be verified moves and a moving distance is beyond an allowable range in the process of acquiring the illumination images.

Illustratively, the device for face liveness detection 1900 can further comprise an action instruction output module, an action image acquisition module, an action detection module and an action detection result acquisition module. For example, the action instruction output module is configured to output an action instruction, and the action instruction can be used for indicating the face to be verified to execute the action corresponding to the action instruction; the action image acquisition module can be configured to acquire action images of the face to be verified acquired by the image acquisition device; the action detection module can be configured to detect the action executed by the face to be verified according to the action images; and the action detection result acquisition module can be configured to obtain an action liveness detection result according to the action detection result and the action instruction. For example, in such a case, the passing determination sub-module for face liveness detection can include a passing determination unit for face liveness detection. For example, the passing determination unit for face liveness detection can be configured to determine whether or not the face to be verified passes the face liveness detection according to both of the illumination liveness detection result and the action liveness detection result. Illustratively, the action detection result acquisition module can include an action detection result acquisition sub-module. For example, the action detection result acquisition sub-module can be configured to determine that the face to be verified passes the action liveness detection in a case that an action, which is executed by the face to be verified and matched with the action instruction, is detected in the action image, which is acquired within a time period not greater than a preset time period of the action liveness detection, and to determine that the face to be verified fails to passes the action liveness detection in a case that the action, which is executed by the face to be verified and matched with the action instruction, is not detected in the action image, which is acquired within the time period not greater than the preset time period of the action liveness detection.

Illustratively, the device for face liveness detection 1900 can further comprise a fourth prompt output module. For example, the fourth prompt output module is configured to output first time prompt information in the process of outputting the action instruction. The first time prompt information includes count-down information corresponding to the preset time period of the action liveness detection.

Illustratively, the device for face liveness detection 1900 can further comprise a fifth prompt output module. For example, the fifth prompt output module can be configured to output second prompt information in the process and/or before performing the illumination liveness detection. For example, the second prompt information can be used for notifying the face to be verified to keep still within the preset time period of the illumination liveness detection. Illustratively, the second prompt information can include count-down information corresponding to the preset time period of the illumination liveness detection.

Illustratively, the device for face liveness detection 1900 can further comprise a sixth prompt output module. For example, the sixth prompt output module can be configured to output first prompt information before the condition determination device 1910 determines that the preset requirement of the image acquisition condition of the face to be verified is satisfied, in which the first prompt information is used for notifying the face to be verified to be directly opposite to the image acquisition device and to be closer to the image acquisition device.

Illustratively, the sixth prompt output module can further include a second prompt output sub-module. For example, the second prompt output sub-module can be configured to output first prompt information in one or more forms selected from voice, image and text.

Figure 32:
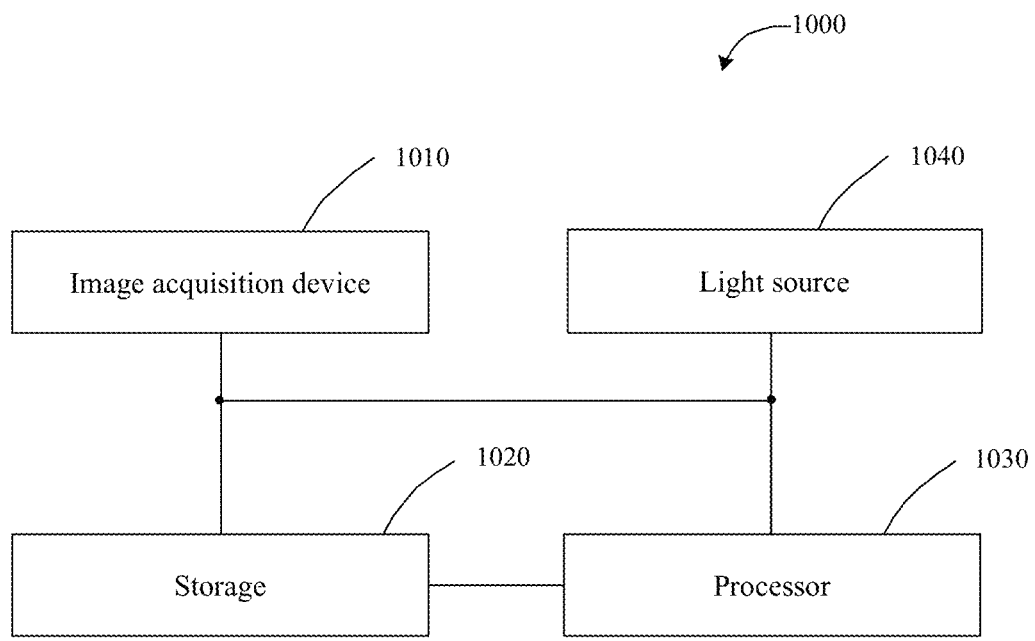
FIG. 32 is an illustrative block diagram of another device for face liveness detection provided by still another embodiment of the present disclosure.

FIG. 32 is an illustrative block diagram of a face liveness detection system 1000 provided by the embodiment of the present disclosure. The face liveness detection system 1000 can comprise an image acquisition device 1010, a storage 1020, a processor 1030 and a light source 1040. The face liveness detection system 1000 is configured to execute corresponding steps of the method for face liveness detection provided by the embodiment of the present disclosure, and is configured to implement corresponding devices, modules, sub-modules and/or units in the device for face liveness detection provided by the embodiment of the present disclosure. For the sake of clarity, corresponding content is appropriately omitted here.

For example, the image acquisition device 1010 can be configured to acquire images (including illumination images, action images and real-time images) of the face to be verified. For example, the image acquisition device 1010 is optional. The face liveness detection system 1000 can comprise no image acquisition device. In such a case, other image acquisition devices separated from the face liveness detection system 1000 can be utilized to acquire images for face liveness detection and then send the acquired images to the face liveness detection system 1000.

For example, the storage 1020 stores computer program instructions which can be used for implementing corresponding steps of the method for face liveness detection provided by the embodiment of the present disclosure.

For example, the processor 1030 can be configured to run the computer program instructions stored in the storage 1020, so as to execute corresponding steps of the method for face liveness detection provided by the embodiment of the present disclosure, and can be configured to implement the condition determination device 1910, the face image acquisition device 1920 and the passing determination device for face liveness detection 1930 of the device for face liveness detection 1900 provided by the embodiment of the present disclosure.

For example, the light source 1040 can be configured to emit detection light to the face to be verified. For example, the light source 1040 is optional. The face liveness detection system 1000 can comprise no light source.

For example, in one embodiment, when the computer program instructions are run by the processor 1030, the face liveness detection system 1000 executes the following steps.

S1210: determining whether or not a preset requirement of an image acquisition condition of the face to be verified is satisfied, in which the image acquisition condition at least comprises one or more selected from a position of the face to be verified, a pose of the face to be verified and a size of the face to be verified in a real-time image acquired by an image acquisition device;

S1220: acquiring face images of the face to be verified when the preset requirement of the image acquisition condition is satisfied; and S1230: determining whether or not the face to be verified passes the face liveness detection according to the face images.

The embodiment of the present disclosure can further provide a storage medium. For example, program instructions are stored on the storage medium. When the program instructions are run by a computer or a processor, the storage medium is configured to execute corresponding steps of the method for face liveness detection provided by the embodiment of the present disclosure, and is configured to implement corresponding devices, modules, sub-modules and/or units of the device for face liveness detection provided by the embodiment of the present disclosure. For the sake of clarity, corresponding content is appropriately omitted here. The storage medium, for example, can include a memory card of a smart mobile phone, a storage of a tablet PC, a hard disc of a personal computer, an ROM, an EPROM, a CD-ROM, a USB memory or any combination of the above-mentioned storage media.

For example, in one embodiment, when the program instructions are run by the computer or the processor, the computer or the processor can be adopted to implement various devices, modules, sub-modules and/or units of the device for face liveness detection provided by the embodiment of the present disclosure, and/or can execute the method for face liveness detection provided by the embodiment of the present disclosure.

For example, in one embodiment, the program instructions are used for executing the following steps in the process of running. S1210: determining whether or not a preset requirement of an image acquisition condition of the face to be verified is satisfied, in which the image acquisition condition at least comprises one or more selected from a position of the face to be verified, a pose of the face to be verified and a size of the face to be verified in a real-time image acquired by an image acquisition device; S1220: acquiring face images of the face to be verified acquired by the image acquisition device when the preset requirement of the image acquisition condition is satisfied; and S1230: determining whether or not the face to be verified passes the face liveness detection according to the face images.

At least part of the devices, modules, sub-modules, and/or units in the face liveness detection system provided by the embodiment of the present disclosure can be implemented by the computer program instructions stored in the memory, run by the processor of the device for face liveness detection for implementing face liveness detection provided by the embodiment of the present disclosure, or can be implemented when the computer runs the computer program instructions stored in the computer readable storage medium of the computer program product in the embodiment of the present disclosure. The method for face liveness detection, device and system and the storage medium, provided by the embodiment of the present disclosure, can effectively counteract screen attackers, photo attackers or mask attackers and hence can improve the safety and the user experience of an authentication system or similar systems employing the method, the device, the system or the storage medium for face liveness detection.

Although description has been given to the concrete embodiments with reference to the accompanying drawings, it should be understood that the above-mentioned concrete embodiments are only illustrative and not intended to limit the scope of the present disclosure thereto. Various changes and modifications can be made by those skilled in the art without departing from the scope and the spirit of the present disclosure. All the changes and modifications shall fall within the scope of the present disclosure as claimed in the appended claims.

It should be understood by those skilled in the art that the components and the algorithm steps in the examples of the embodiment of the present disclosure can be implemented by electronic hardware or a combination of computer software and the electronic hardware. Whether or not the functions are executed by hardware or software depends on specific implementation and design constraints of the technical solution. Different methods can be adopted by those skilled in the art to realize the described function for each specific implementation, but the above-mentioned different methods for realizing the described function for each specific implementation shall not be construed as exceeding the scope of the present disclosure.

In several embodiments of the application, it should be understood that the disclosed equipment and method can be implemented by other means. For example, the foregoing device embodiments are only illustrative. For example, the division of the units is merely one kind of division according to logical function, and there can be other division modes in actual implementation. For example, a plurality of units or components can be combined or integrated into another device, or some characteristics can be omitted or not executed.

A large amount of concrete details have been provided in the description herein. However, it should be understood that the embodiments of the present disclosure can be implemented without the concrete details. The well-known methods, structures and techniques are not shown in detail in some embodiments, so as not to obscure the understanding of the description.

Similarly, it should be understood that: in order to simplify the present disclosure and aid in the understanding of one or more of various disclosure aspects, in the description of the concrete embodiments of the present disclosure, the features of the present disclosure are sometimes grouped together in a single embodiment, a figure or description thereof. However, the method provided by the present disclosure should not be construed as reflecting the following content: namely the claimed present disclosure requires more features than those expressly recited in each claim. More precisely, as reflected by corresponding claims, corresponding technical problem can be solved by features fewer than all the features of a single embodiment of the present disclosure. Thus, the claims following the Detailed Description are hereby expressly incorporated into the Detailed Description, with each claim as a separate embodiment of the present disclosure.

It should be understood by those skilled in the art that: in addition to the features conflicting with each other, all the features of the present disclosure in the description (including the accompanying claims, abstract and drawings) and all the disclosed processes or units of any method or device can be combine. Unless otherwise specifically stated, each feature disclosed in the description (including the accompanying claims, abstract and drawings) can be replaced by an alternative feature serving the same, equivalent or similar purpose.

In addition, it should be understood by those skilled in the art that although some embodiments described here include some features included in other embodiments but not include other features, combinations of features of different embodiments are meant to fall within the scope of the present disclosure and form different embodiments. For example, any of the claimed embodiments in the claims can be used in any combination.

Various components, devices, modules, sub-modules and/or units provided by the embodiments of the present disclosure can be implemented by hardware or software modules run by one or more processors or a combination of hardware and software. It should be understood by those skilled in the art that part of or all of the functions of some components, devices, modules, sub-modules and/or units in the device for face liveness detection provided by the embodiment of the present disclosure can be realized by a microprocessor or a DSP. The present disclosure can also be implemented as a part or all of the device programs (for example, computer programs and computer program products) for executing the method described herein. The programs for implementing the present disclosure can be stored on a computer readable medium or can be in the form of one or more signals. Such signals can be downloaded from the Internet website, provided on a carrier signal, or provided in any other form.

It should be noted that the above-mentioned embodiments are intended to illustrate the present disclosure but not intended to limit the present disclosure, and alternative embodiments can be designed by those skilled in the art without departing from the scope of the appended claims. In the claims, any reference numeral placed between brackets shall not be construed as the limitation of the claims. The word "comprising" does not exclude the presence of elements or steps not listed in the claims. The word "a" or "an" preceding an element does not exclude the presence of a plurality of such elements. The present disclosure can be implemented with the aid of hardware comprising several different elements and by means of a suitably programmed computer. In the unit claims enumerating several apparatuses, several of these apparatuses can be specifically embodied by the same hardware. The use of the words first, second, third and the like does not indicate any order, the words first, second, third and the like can be interpreted as name.

The foregoing is only the concrete embodiments of the present disclosure or the description of the concrete embodiments. The scope of protection of the present disclosure is not limited thereto. Any change or replacement that can be easily thought of by those skilled in the art within the technical scope disclosed by the present disclosure shall fall within the scope of the present disclosure. The scope of the present disclosure shall be defined by the appended claims.

What is claimed is:

1. A method for face liveness detection, comprising:
    performing an illumination liveness detection and obtaining an illumination liveness detection result; and
    determining whether or not a face to be verified passes the face liveness detection at least according to the illumination liveness detection result;
    wherein performing of the illumination liveness detection and obtaining of the illumination liveness detection result comprise:
        acquiring a plurality of illumination images of the face to be verified, wherein the plurality of illumination images are captured in a process of dynamically changing mode of illumination light irradiated on the face to be verified and are respectively corresponding to various modes of the illumination light; and
        obtaining the illumination liveness detection result according to a light reflection characteristic of the face to be verified in the plurality of illumination images, wherein the method further comprises:
    performing an action liveness detection before determining whether or not the face to be verified passes the face liveness detection; wherein
    performing of the action liveness detection comprises:
        outputting an action instruction used for notifying the face to be verified to execute an action corresponding to the action instruction;
        acquiring an action image of the face to be verified;
        detecting the action executed by the face to be verified on the basis of the action image, so as to obtain an action detection result; and
        obtaining an action liveness detection result according to the action detection result and the action instruction;
    and
    determining of whether or not the face to be verified passes the face liveness detection at least according to the illumination liveness detection result comprises:
    determining whether or not the face to be verified passes the face liveness detection according to both of the illumination liveness detection result and the action liveness detection result.

2. The method for face liveness detection according to claim 1, wherein
    acquiring of the plurality of illumination images of the face to be verified comprises:
        dynamically changing the mode of the illumination light irradiated on the face to be verified, and
        capturing the plurality of illumination images, which are respectively corresponding to the various modes of the illumination light, of the face to be verified;
    obtaining of the illumination liveness detection result according to the light reflection characteristic of the face to be verified in the plurality of illumination images comprises:
        analyzing the plurality of illumination images,
        acquiring the light reflection characteristic of the face to be verified in the plurality of illumination images, and
        obtaining the illumination liveness detection result according to the light reflection characteristic; and
    dynamically changing the mode of the illumination light irradiated on the face to be verified comprises:
        dynamically changing color and/or position of the illumination light.

3. The method for face liveness detection according to claim 2, wherein
    light emitted from a display screen is used as the illumination light irradiated on the face to be verified; and
    a mode of the light emitted from the display screen is dynamically changed by changing contents displayed on the display screen, so that the mode of the illumination light irradiated on the face to be verified is dynamically changed.

4. The method for face liveness detection according to claim 1, wherein
    number of times for performing the action liveness detection is increased by one for each performance of the action liveness detection, so as to obtain the number of times for performing the action liveness detection; and
    after the action liveness detection result is obtained and in a case that the action liveness detection result indicates that the face to be verified fails to pass the action liveness detection, the method further comprises:
        outputting first error information used for notifying a failure of the action liveness detection;

determining whether or not the number of times for performing the action liveness detection is greater than a first counting threshold; and determining whether or not the face to be verified passes the face liveness detection at least according to the illumination liveness detection result in a case that the number of times for performing the action liveness detection is greater than the first counting threshold, and performing the action liveness detection again in a case that the number of times for performing the action liveness detection is not greater than the first counting threshold, or performing the illumination liveness detection again in a case that the illumination liveness detection is performed before the action liveness detection and the number of times for performing the action liveness detection is not greater than the first counting threshold.

5. The method for face liveness detection according to claim 1, further comprising:

determining whether or not a preset requirement of an image acquisition condition of the face to be verified is satisfied before performing the illumination liveness detection, so as to perform the illumination liveness detection in a case that the preset requirement of the image acquisition condition is satisfied, wherein the image acquisition condition at least comprises one or more selected from a position of the face to be verified, a pose of the face to be verified and a size of the face to be verified in a real-time image acquired by an image acquisition device.

6. The method for face liveness detection according to claim 5, wherein the image acquisition condition further comprises a blurriness of the real-time image and a shielding state of the face to be verified in the real-time image.

7. The method for face liveness detection according to claim 5, wherein determining of whether or not the preset requirement of the image acquisition condition of the face to be verified is satisfied comprises:

adopting the image acquisition device to acquire the real-time image of the face to be verified;

displaying a reference part of the face to be verified in the real-time image and a reference region in real time; and determining whether or not the preset requirement of the image acquisition condition is satisfied at least according to whether or not the reference part of the face to be verified in the real-time image falls within the reference region.

8. The method for face liveness detection according to claim 7, wherein the reference part of the face to be verified in the real-time image and the reference region are respectively the face to be verified in the real-time image and a face preview region; or the reference part of the face to be verified in the real-time image and the reference region are respectively a specific facial part of the face to be verified in the real-time image and a targeted part region.

9. The method for face liveness detection according to claim 7, wherein determining of whether or not the preset requirement of the image acquisition condition is satisfied at least according to whether or not the reference part of the face to be verified in the real-time image falls within the reference region comprises:

determining that the preset requirement of the image acquisition condition is satisfied in a case that the reference part of the face to be verified in the real-time image falls within the reference region; and determining that the preset requirement of the image acquisition condition is not satisfied in a case that the reference part of the face to be verified in the real-time image fails to fall within the reference region.

10. The method for face liveness detection according to claim 7, wherein determining of whether or not the preset requirement of the image acquisition condition is satisfied at least according to whether or not the reference part of the face to be verified in the real-time image falls within the reference region comprises:

determining that the preset requirement of the image acquisition condition is satisfied in a case that the reference part of the face to be verified in the real-time image falls within the reference region and a ratio of a size of the reference part of the face to be verified to a size of the real-time image is greater than a ratio threshold; and determining that the preset requirement of the image acquisition condition is not satisfied in a case that the reference part of the face to be verified in the real-time image fails to fall within the reference region or the ratio of the size of the reference part of the face to be verified to the size of the real-time image is less than or equal to the ratio threshold.

11. The method for face liveness detection according to claim 7, wherein determining of whether or not the preset requirement of the image acquisition condition of the face to be verified is satisfied further comprises:

acquiring posture information of the image acquisition device;

determining whether or not the image acquisition device is vertically placed according to the posture information; and determining that the preset requirement of the image acquisition condition is not satisfied in a case that the image acquisition device is not vertically placed.

12. The method for face liveness detection according to claim 7, further comprising:

outputting first prompt information during and/or before acquiring the real-time image of the face to be verified with the image acquisition device, wherein the first prompt information is used for notifying the face to be verified to be directly opposite to the image acquisition device and to be closer to the image acquisition device.

13. The method for face liveness detection according to claim 5, further comprising:

outputting adjustment prompt information in a case that the preset requirement of the image acquisition condition is not satisfied, wherein the adjustment prompt information is used for notifying the face to be verified to make adjustment allowing the preset requirement of the image acquisition condition to be satisfied.

14. The method for face liveness detection according to claim 13, wherein outputting of the adjustment prompt information in the case that the preset requirement of the image acquisition condition is not satisfied comprises:

outputting the adjustment prompt information in a case that there is no face to be verified in the real-time image, so as to notify a person having the face to be verified to move toward a direction allowing the face to be verified to be in the real-time image;

outputting the adjustment prompt information in a case that the position of the face to be verified in the real-time image is deviated from a face preview region, so as to notify the person having the face to be verified to move towards a direction opposite to a deviation direction;

outputting the adjustment prompt information in a case that a blurriness of the real-time image exceeds a preset blurriness threshold, so as to notify user to clean the image acquisition device;

outputting the adjustment prompt information in a case that the pose of the face to be verified in the real-time image is in a face upward state, so as to notify the person having the face to be verified to lower his/her head;

outputting the adjustment prompt information in a case that the pose of the face to be verified in the real-time image is in a face downward state, so as to notify the person having the face to be verified to raise his/her head;

outputting the adjustment prompt information in a case that the pose of the face to be verified in the real-time image is tilting to the left or the right, so as to notify the person having the face to be verified to look straight ahead;

outputting the adjustment prompt information in a case that the size of the face to be verified in the real-time image is less than a first threshold, so as to notify the person having the face to be verified to be closer to the image acquisition device;

outputting the adjustment prompt information in a case that the size of the face to be verified in the real-time image is greater than a second threshold, so as to notify the person having the face to be verified to be away from the image acquisition device; and outputting the adjustment prompt information in a case that a specific facial part of the face to be verified in the real-time image is shielded by an occlusion, so as to notify the person having the face to be verified to remove the occlusion and to expose the specific facial part.

15. The method for face liveness detection according to claim 5, wherein determining of whether or not the preset requirement of the image acquisition condition of the face to be verified is satisfied comprises:

adopting the image acquisition device to acquire the real-time image of the face to be verified;

displaying a simulated face region changing along with the face to be verified in real time according to the image acquisition condition, wherein the face to be verified is displayed in the simulated face region;

displaying in real time a targeted face region, which is used for indicating an alignment of the face to be verified; and determining whether or not the simulated face region is aligned with the targeted face region, wherein it is determined that the preset requirement of the image acquisition condition of the face to be verified is satisfied in a case that the simulated face region is aligned with the targeted face region, and it is determined that the preset requirement of the image acquisition condition of the face to be verified is not satisfied in a case that the simulated face region is not aligned with the targeted face region.

16. The method for face liveness detection according to claim 15, wherein determining of whether or not the simulated face region is aligned with the targeted face region comprises:

determining that the simulated face region is aligned with the targeted face region in a case that the simulated face region is within the targeted face region and a ratio of a size of the simulated face region to a size of the real-time image is greater than a first preset ratio; and determining that the simulated face region is not aligned with the targeted face region in a case that the simulated face region is not within the targeted face region or the ratio of the size of the simulated face region to the size of the real-time image is less than or equal to the first preset ratio.

17. The method for face liveness detection according to claim 15, wherein determining of whether or not the simulated face region is aligned with the targeted face region comprises:

determining that the simulated face region is aligned with the targeted face region in a case that the simulated face region is within the targeted face region and a ratio of a size of the simulated face region to a size of the targeted face region is greater than a second preset ratio; and determining that the simulated face region is not aligned with the targeted face region in a case that the simulated face region is not within the targeted face region or the ratio of the size of the simulated face region to the size of the targeted face region is less than or equal to the second preset ratio.

18. The method for face liveness detection according to claim 5, wherein determining whether or not the preset requirement of the image acquisition condition of the face to be verified is satisfied again in a case that the face to be verified moves during acquiring the illumination images and a moving distance is beyond an allowable range.

19. The method for face liveness detection according to claim 5, wherein number of times for performing the illumination liveness detection is increased by one for each performance of the illumination liveness detection, so as to obtain the number of times for performing the illumination liveness detection; and after the illumination liveness detection result is obtained, and in a case that the illumination liveness detection result indicates that the face to be verified fails to pass the illumination liveness detection, the method further comprises:

outputting second error information used for notifying a failure of the illumination liveness detection;

determining whether or not the number of times for performing the illumination liveness detection is greater than a second counting threshold; and determining whether or not the face to be verified passes the face liveness detection at least according to the illumination liveness detection result in a case that the number of times for performing the illumination liveness detection is greater than the second counting threshold, and determining whether or not the preset requirement of the image acquisition condition of the face to be verified is satisfied or performing the illumination liveness detection again in a case that the number of times for performing the illumination liveness detection is not greater than the second counting threshold.

20. The method for face liveness detection according to claim 1, further comprising:

outputting second prompt information during and/or before acquiring the illumination images, wherein the second prompt information is used for notifying the face to be verified to keep still within a preset time period of the illumination liveness detection.

21. A device for face liveness detection, comprising:

a processor, a memory and computer program instructions stored in the memory;

wherein upon the processor running the computer program instructions, the device for face liveness detection performs a following method comprising:

acquiring a plurality of illumination images of a face to be verified, wherein the plurality of illumination images are captured in a process of dynamically changing mode of illumination light irradiated on the face to be verified and are respectively corresponding to various modes of the illumination light;

obtaining an illumination liveness detection result according to a light reflection characteristic of the face to be verified in the plurality of illumination images; and determining whether or not the face to be verified passes the face liveness detection at least according to the illumination liveness detection result, wherein the method performed by the device for face liveness detection further comprises:

performing an action liveness detection before determining whether or not the face to be verified passes the face liveness detection; wherein performing of the action liveness detection comprises:

outputting an action instruction used for notifying the face to be verified to execute an action corresponding to the action instruction;

acquiring an action image of the face to be verified;

detecting the action executed by the face to be verified on the basis of the action image, so as to obtain an action detection result; and obtaining an action liveness detection result according to the action detection result and the action instruction;

and determining of whether or not the face to be verified passes the face liveness detection at least according to the illumination liveness detection result comprises:

determining whether or not the face to be verified passes the face liveness detection according to both of the illumination liveness detection result and the action liveness detection result.

22. A device for face liveness detection, comprising: a light source, an image acquisition device, a processing device and an output device, wherein the light source is configured to dynamically change mode of illumination light irradiated on a face to be verified;

the image acquisition device is configured to acquire a plurality of illumination images, which are respectively corresponding to various modes of the illumination light, of the face to be verified;

the processing device is configured to obtain an illumination liveness detection result according to a light reflection characteristic of the face to be verified in the plurality of illumination images, and is further configured to determine whether or not the face to be verified passes the face liveness detection at least according to the illumination liveness detection result; and the output device is configured to output an action instruction, wherein the action instruction is used for notifying the face to be verified to execute an action corresponding to the action instruction;

the image acquisition device is further configured to acquire an action image of the face to be verified;

the processing device is further configured to obtain an action detection result by detecting the action executed by the face to be verified on the basis of the action image, and obtain an action liveness detection result according to the action detection result and the action instruction; and the processing device is further configured to determine whether or not the face to be verified passes the face liveness detection according to both of the illumination liveness detection result and the action liveness detection result.

23. The device for face liveness detection according to claim 22, further comprising: a condition determination device, wherein the image acquisition device is further configured to acquire a real-time image;

the condition determination device is configured to determine whether or not an preset requirement of the image acquisition condition of the face to be verified is satisfied before acquiring the illumination images; and the image acquisition condition at least comprises one or more selected from a position of the face to be verified, a pose of the face to be verified and a size of the face to be verified, in the real-time image acquired by the image acquisition device.

* * * * *